(12) United States Patent
Sreetharan et al.

(10) Patent No.: US 10,710,118 B2
(45) Date of Patent: Jul. 14, 2020

(54) COMPLEX MASS TRAJECTORIES FOR IMPROVED HAPTIC EFFECT

(71) Applicant: Vibrant Composites Inc., Boston, MA (US)

(72) Inventors: Pratheev Sabaratnam Sreetharan, Cambridge, MA (US); Michael Karpelson, Newton, MA (US)

(73) Assignee: Vibrant Composites Inc., Boston, MA (US)

( * ) Notice: Subject to any disclaimer, the term of this patent is extended or adjusted under 35 U.S.C. 154(b) by 0 days.

(21) Appl. No.: 16/173,922

(22) Filed: Oct. 29, 2018

(65) Prior Publication Data

US 2019/0184428 A1 Jun. 20, 2019

Related U.S. Application Data

(63) Continuation of application No. PCT/US2017/029975, filed on Apr. 27, 2017,
(Continued)

(51) Int. Cl.
*B06B 1/12* (2006.01)
*B06B 1/16* (2006.01)
(Continued)

(52) U.S. Cl.
CPC .............. *B06B 1/12* (2013.01); *B06B 1/045* (2013.01); *B06B 1/16* (2013.01); *B06B 3/00* (2013.01); *H02K 33/18* (2013.01)

(58) Field of Classification Search
CPC .. B06B 1/12; B06B 1/16; B06B 1/045; H02K 33/18
(Continued)

(56) References Cited

U.S. PATENT DOCUMENTS 2,259,691 A 10/1941 Harris
3,140,092 A 7/1964 Hrubetz
(Continued)

FOREIGN PATENT DOCUMENTS

CN 1795488 A 6/2006
CN 203084648 U 7/2013
(Continued)

OTHER PUBLICATIONS

International Search Report and Written Opinion of the International Searching Authority, 7 pages, PCT/US2017/29975.

*Primary Examiner* — Hirdepal Signh
(74) *Attorney, Agent, or Firm* — Bergman LLC; Michael Bergman

(57) ABSTRACT

A haptic actuator includes mechanical links defining a first J-trajectory and mechanical links defining a second J-trajectory as well as a motor coupled to the mechanical links so as to synchronously accelerate a first mass over the first J-trajectory and a second mass over the second J-trajectory. During a first time interval, reactive forces of the first mass accelerating substantially balance reactive forces of the second mass accelerating and during a second time interval reactive forces of the first mass accelerating do not substantially balance reactive forces of the second mass accelerating. This un-balanced condition results in a tap signal being produced.

13 Claims, 40 Drawing Sheets

Related U.S. Application Data application No. 16/173,922, filed on Oct. 29, 2018, which is a continuation-in-part of application No. PCT/US2015/015509, filed on Feb. 11, 2015, which is a continuation-in-part of application No. 15/242,508, which is a continuation-in-part of application No. PCT/US2016/028185, filed on Apr. 18, 2016, and a continuation-in-part of application No. 15/242,508, filed on Aug. 20, 2016, now Pat. No. 10,315,220.

(60) Provisional application No. 62/328,524, filed on Apr. 27, 2016, provisional application No. 62/051,358, filed on Sep. 17, 2014, provisional application No. 61/938,613, filed on Feb. 11, 2014, provisional application No. 62/328,524, filed on Apr. 27, 2016, provisional application No. 62/148,732, filed on Apr. 16, 2015, provisional application No. 62/180,974, filed on Jun. 17, 2015, provisional application No. 62/289,147, filed on Jan. 29, 2016.

(51) Int. Cl.
*B06B 1/04* (2006.01)
*H02K 33/18* (2006.01)
*B06B 3/00* (2006.01)

(58) Field of Classification Search
USPC .................................................... 340/407.1
See application file for complete search history.

(56) References Cited

U.S. PATENT DOCUMENTS

| | | | |
|---|---|---|---|
| 6,905,620 B2 | 6/2005 | Silverbrook | |
| 7,919,945 B2 | 4/2011 | Houston et al. | |
| 7,979,797 B2 | 7/2011 | Schena | |
| 8,368,641 B2 | 2/2013 | Tremblay et al. | |
| 9,482,863 B2 | 11/2016 | Erlich et al. | |
| 9,505,032 B2 | 11/2016 | Ely et al. | |
| 9,607,491 B1* | 3/2017 | Mortimer | G08B 6/00 |
| 2002/0057152 A1* | 5/2002 | Elferich | G05G 1/08 335/220 |
| 2002/0191267 A1 | 12/2002 | Flanders et al. | |
| 2003/0029705 A1 | 2/2003 | Qiu et al. | |
| 2004/0093968 A1* | 5/2004 | Oster | G01D 11/16 74/10.2 |
| 2006/0274035 A1* | 12/2006 | Bailey | G06F 3/016 345/156 |
| 2007/0046214 A1 | 3/2007 | Pasch | |
| 2008/0055241 A1 | 3/2008 | Goldenberg et al. | |
| 2009/0160770 A1 | 6/2009 | Shahoian | |
| 2009/0303175 A1 | 12/2009 | Koivunen | |
| 2011/0132114 A1 | 6/2011 | Siotis | |
| 2011/0276878 A1 | 11/2011 | Sormunen | |
| 2012/0038471 A1 | 2/2012 | Kim et al. | |
| 2012/0217031 A1 | 8/2012 | Stalford | |
| 2012/0292438 A1 | 11/2012 | Sreetharan et al. | |
| 2013/0110128 A1* | 5/2013 | Schostek | A61B 1/00158 606/130 |
| 2014/0002248 A1* | 1/2014 | Zawacki | G06F 3/016 340/407.1 |
| 2014/0310914 A1 | 10/2014 | Erlich et al. | |
| 2015/0015117 A1* | 1/2015 | Lee | H02K 33/00 310/328 |
| 2016/0031079 A1 | 2/2016 | Meuleman | |
| 2016/0229635 A1* | 8/2016 | Summer | A61F 5/013 |

FOREIGN PATENT DOCUMENTS

| | | |
|---|---|---|
| EP | 1412820 B1 | 4/2004 |
| JP | 2010176290 A | 8/2010 |
| KR | 20150006661 A | 1/2015 |
| WO | WO20077086426 | 8/2007 |
| WO | WO2012-109559 | 8/2012 |
| WO | WO2015-123361 | 8/2015 |
| WO | WO2015123361 A1 | 8/2015 |

\* cited by examiner

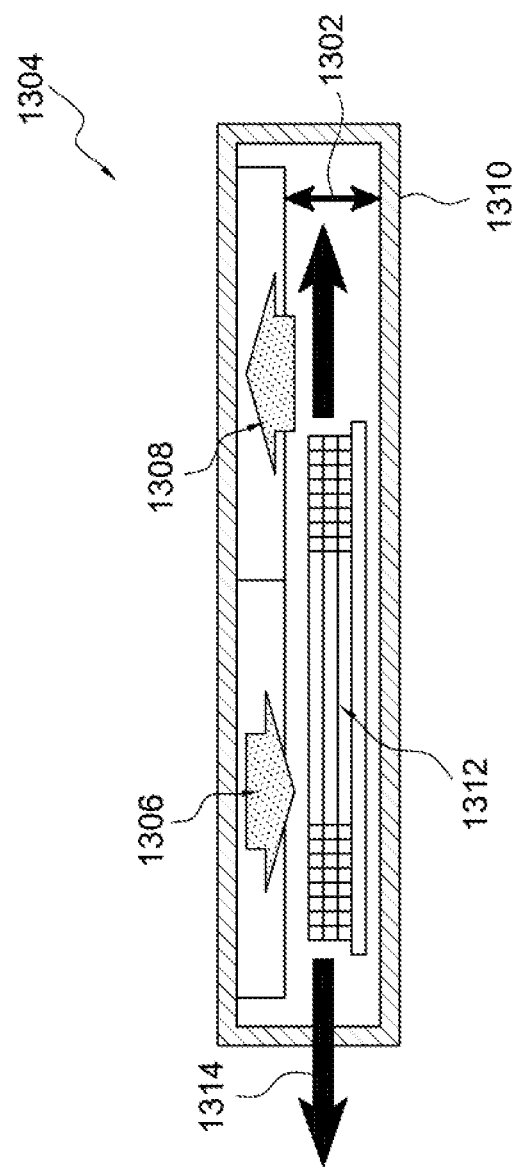

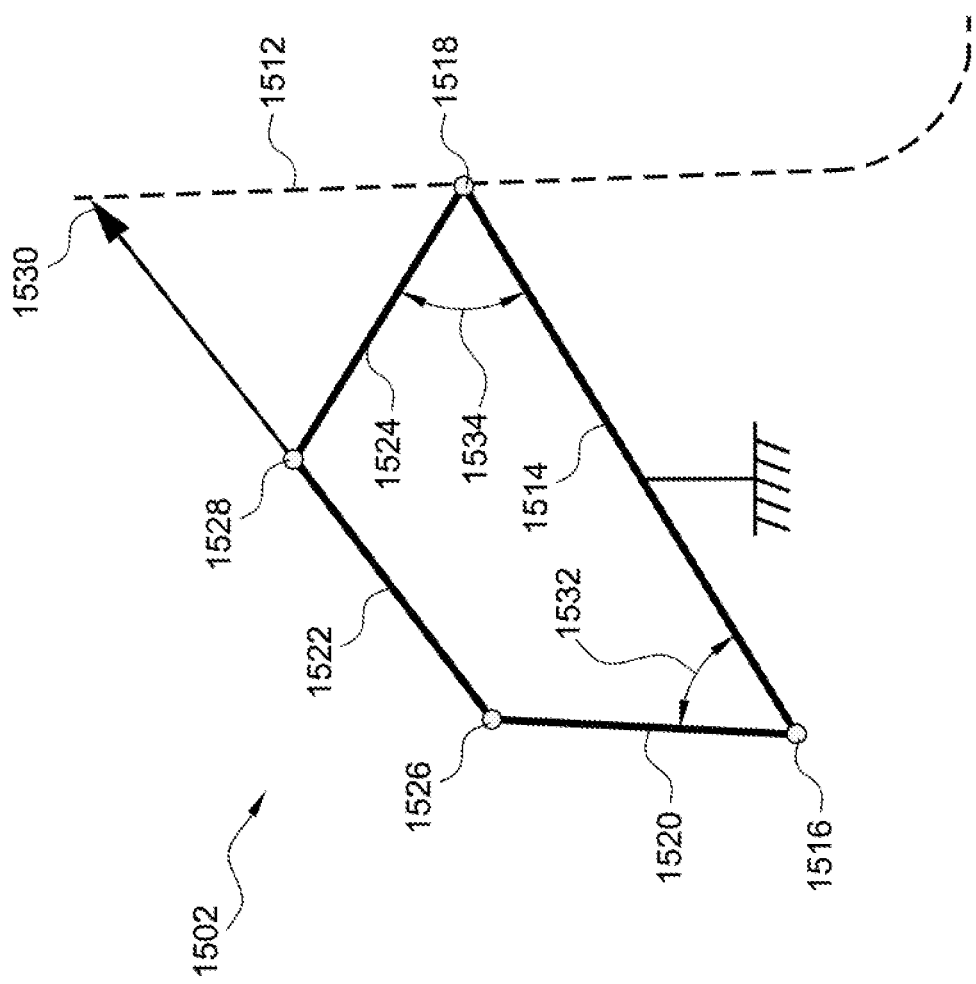

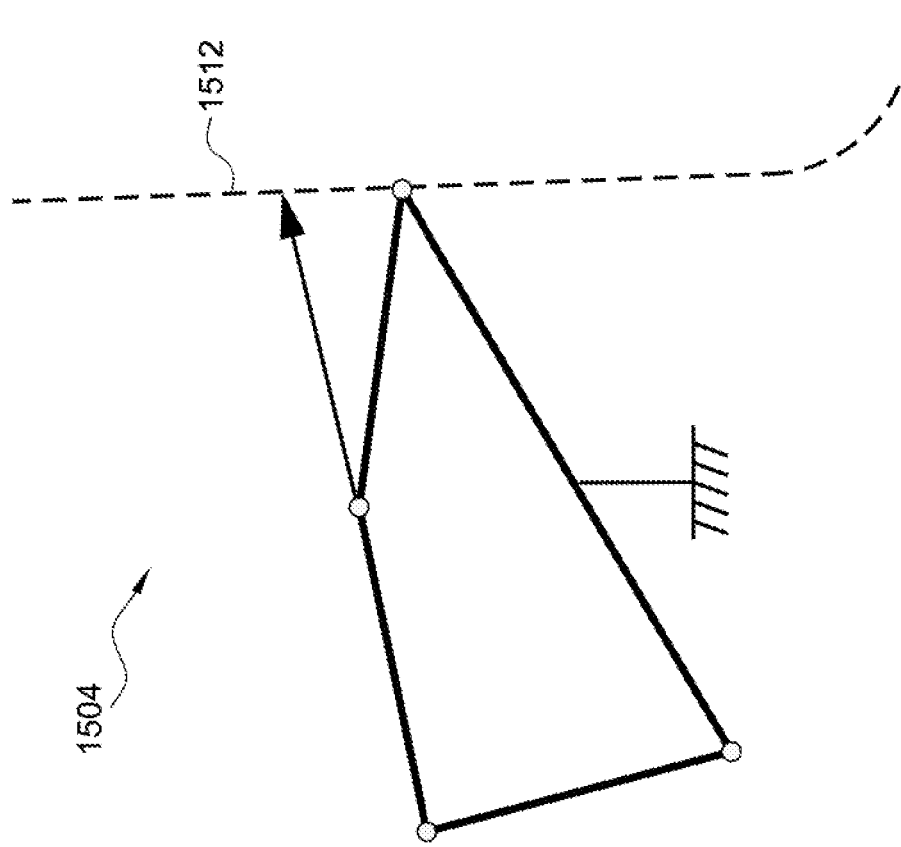

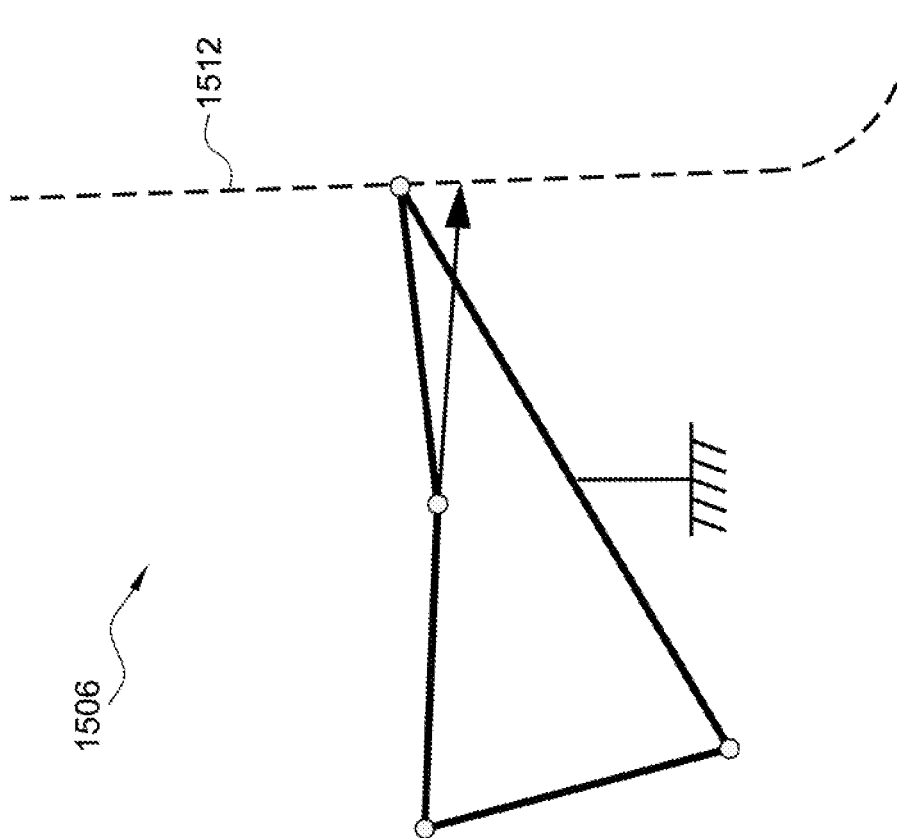

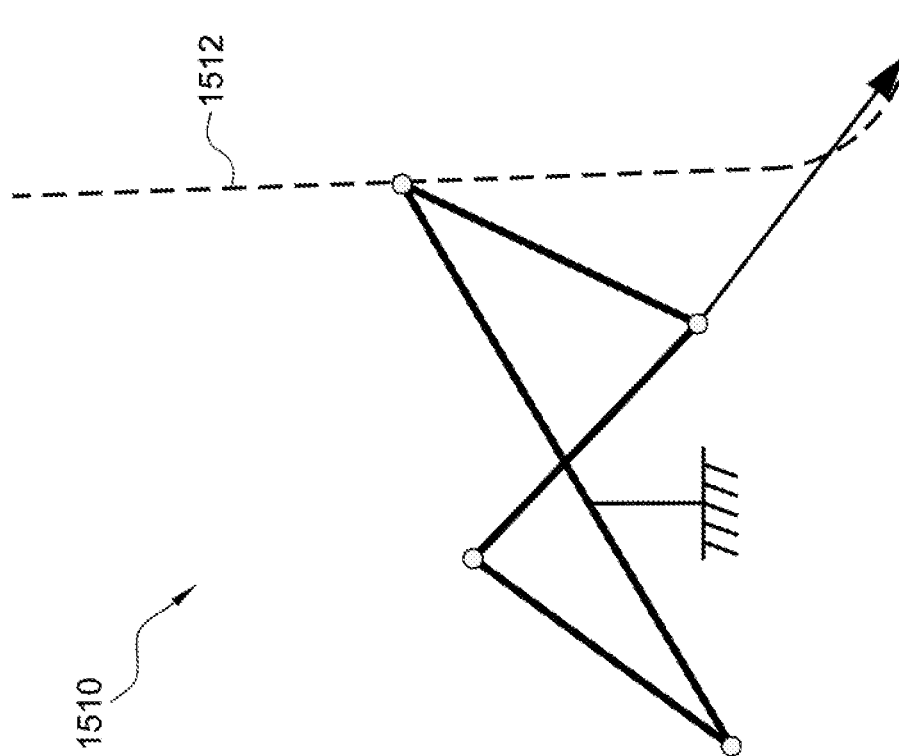

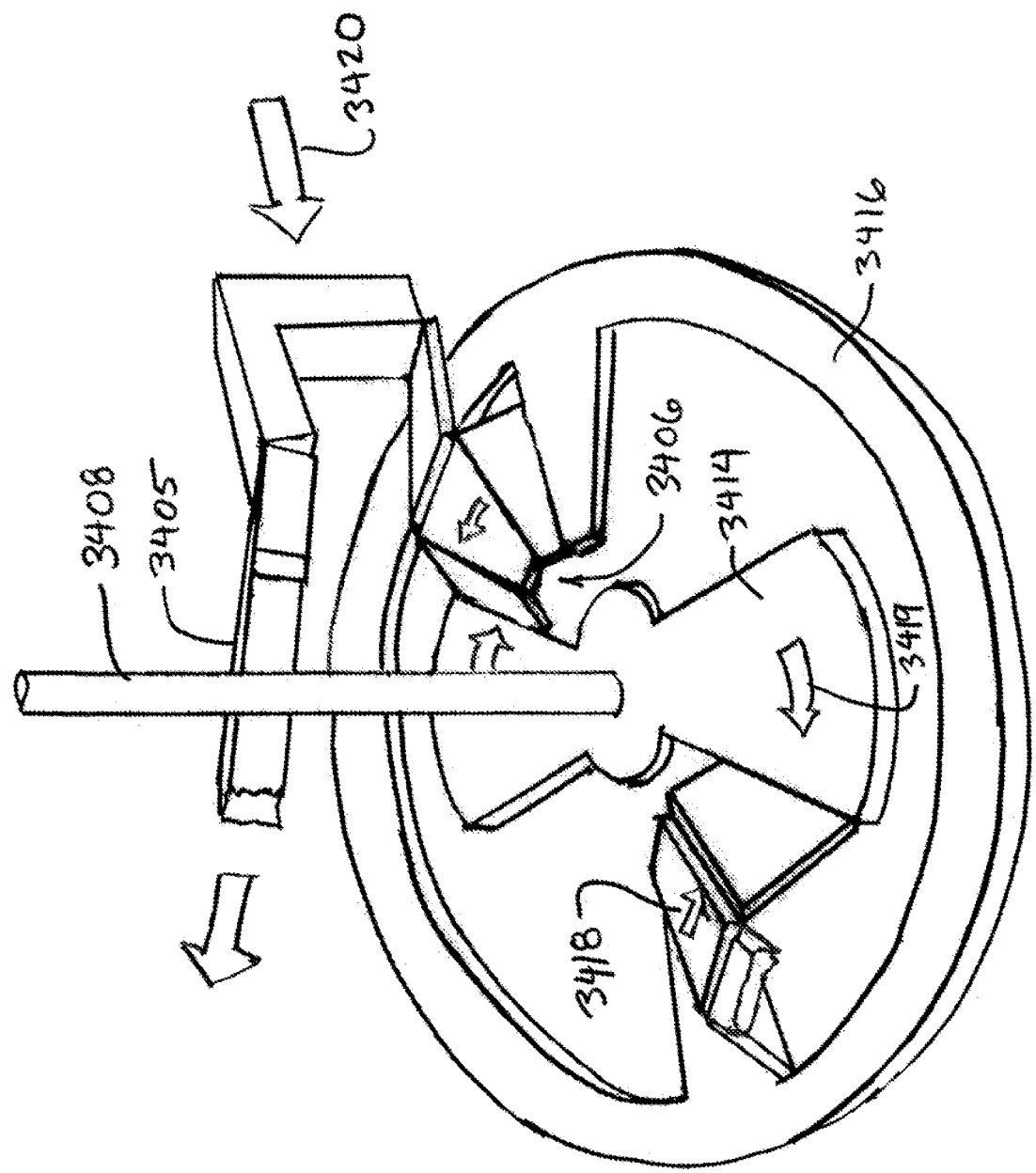
FIG. 34-F

COMPLEX MASS TRAJECTORIES FOR IMPROVED HAPTIC EFFECT

CROSS-REFERENCE TO RELATED APPLICATIONS

The present application claims the benefit of U.S. provisional patent application No. 62/328,524, filed on Apr. 27, 2016 the disclosure of which is incorporated in the present application by reference in its entirety.

FIELD OF THE INVENTION

The present invention relates to signaling apparatus and methods and more particularly to haptic signaling apparatus and methods.

SUMMARY

As consumer devices grow thinner and smaller, effectively communicating with the user becomes an increasing challenge. Many such devices (including, e.g., mobile phones and smart watches) rely on haptic feedback to provide non-visual cues and alerts to the user. These haptic components use moving masses to transfer momentum to the user; most commonly in the form of a vibration. While many haptic technologies exist, those targeting a thin (sub-5 mm) package height can be divided into two categories: linear resonant actuators (LRAs) and eccentric rotating masses (ERMs).

ERMs use a small electric motor that, when activated, rotates an eccentric mass about a shaft. The axis of rotation does not pass through the center of mass of the output mass; thus, when activated the ERM transfers a vibration through the motor mount. ERMs are characterized by a very high amplitude vibrational output relative to package size, but suffer from high ramp up and ramp down times and can only produce a single vibrational effect. The iPhone® 5, for example, uses an ERM.

LRAs use a linear magnetic actuator driving a mass coupled to a spring in a reciprocating, rather than rotating, motion. Typical LRAs have their axis of motion parallel to the thinnest package dimension. These LRAs are characterized by much reduced ramp up and ramp down times compared to ERMs, but still can typically only create a single vibrational effect.

One variant of LRA orients its axis of motion perpendicular to the thinnest package dimension. The increased range of motion allows this form of LRA to undergo non-resonant operation, enabling a much shorter output impulse (a 'tap') in contrast to a vibration. However, in all cases the output momentum is also oriented perpendicularly to the thinnest package dimension. After careful consideration, the inventors of the present invention has come to appreciate that, in most consumer electronics applications, this orientation is not ideal.

LRAs and ERMs are poorly adapted to produce anything approaching a 'tap' output oriented parallel to the thinnest package dimension in a package suitable for consumer electronics use (i.e. sub 5 mm thickness). Moreover, no known technology is capable of creating haptic effects along multiple axes in such a package.

The present invention concerns the use of complex mass trajectories within a haptic component. For the purposes of this disclosure, a simple trajectory is either a continuous rotation or a linear reciprocating motion. A complex mass trajectory is a trajectory that is not a simple trajectory.

Complex mass trajectories have the potential to offer great utility in creating improved haptic effects over the current state of the art. One valuable complex mass trajectory is a 'J' trajectory, in which the majority of the mass trajectory is more or less linear and perpendicular to the thinnest package dimension but, near one extreme of its motion, curves abruptly to travel parallel to the thinnest package dimension.

Combining two of these 'J' trajectories back-to-back creates a dual 'J' trajectory, a design that enables a multi-functional haptic component. By using only an end region of the stroke, a vertical vibration parallel to the thinnest dimension can be created. By using the entire stroke, a 'tap' can be created. By using only the flat region, driven anti-symmetrically, a lateral vibration perpendicular to the thinnest package dimension can be created.

An accelerometer integrated into the haptic component can provide force feedback for active control. Alternately, an accelerometer existing elsewhere in the device, e.g. a mobile handset, can be used as sensing for active control.

It will be appreciated that, in various embodiments, the mechanism can be expanded to include additional J-trajectories, further augmenting the set of signals that can be produced. That is, the term "J-trajectory," and the shape(s) illustrated in the various figures of the present disclosure, are intended to be merely exemplary of a wide variety of trajectories and accelerations, all of which are intended to fall within the present inventive disclosure and, subject to issuance of claims, within the scope of rights in the invention. Moreover, while several of the trajectories presented exhibit substantial mirror symmetry, it should be appreciated that these are merely exemplary of a wide variety of trajectories and arrangements. Thus, the various trajectories followed by opposing inertial masses will be configured according to the signaling and other requirements of a particular embodiment and may exhibit only local symmetries and/or partial symmetries and/or dynamic symmetries and/or no symmetries according to the requirements of a particular embodiment of the invention. Specifically, among other possibilities, the characteristics of the trajectory will, in certain embodiments, be modified during the course of using a device and/or during the course of a particular signaling operation.

Likewise, it should not be presumed that the inertial masses employed in a particular embodiment of the invention are equal in mass or other characteristics, or are otherwise specifically similar. In certain embodiments of the invention, a particular acceleration profile will be used to dynamically change the effective characteristics and relationship between the characteristics of the respective inertial masses. Moreover, in certain aspects of the invention, one large mass may be used in opposition to a plurality of smaller masses.

Furthermore, the characteristics of the inertial masses employed will be selected according to the requirements of a particular embodiment. For example, an inertial mass having more or less elastic characteristics will be beneficial in respective applications of the invention. Indeed in some applications a relatively "dead" i.e., inelastic, inertial mass will be employed. Such a mass will, in some embodiments, incorporate a plurality of smaller masses within an enclosure to produce a relatively inelastic response. In other embodiments, the material of the inertial mass will be selected for its elasticity and other characteristics. Thus, for example, metals, polymers, other organic materials, etc. will be employed in particular embodiments of the invention.

It should further be noted that, while for clarity of presentation, the embodiments presented here employ, for the most part, one or more mechanical links to define a J-trajectory, other means are capable of defining a J-trajectory and are contemplated to be within the scope of the invention. Thus, for example, sliding and rolling guides, and/or flexible and/or hinged apparatus, and combinations of the same, will be used in certain embodiments of the invention to define one or more trajectories to be followed by one or more inertial masses.

It should be noted that the terms "haptic alert device" and "haptic actuator" are used, and intended to be used, interchangeably in the present disclosure.

The following description is provided to enable any person skilled in the art to make and use the disclosed inventions and sets forth the best modes presently contemplated by the inventors of carrying out their inventions. In the following description, for purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the substance disclosed. These and other advantages and features of the invention will be more readily understood in relation to the following detailed description of the invention, which is provided in conjunction with the accompanying drawings.

It should be noted that, while the various figures show respective aspects of the invention, no one figure is intended to show the entire invention. Rather, the figures together illustrate the invention in its various aspects and principles. As such, it should not be presumed that any particular figure is exclusively related to a discrete aspect or species of the invention. To the contrary, one of skill in the art would appreciate that the figures taken together reflect various embodiments exemplifying the invention.

Correspondingly, reference throughout the specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout the specification are not necessarily all referring to the same embodiment. Furthermore, the particular features, structures, or characteristics may be combined in any suitable manner in one or more embodiments.

BRIEF DESCRIPTION OF THE DRAWINGS

FIG. 13 shows, in schematic view, a linear resonant actuator prepared according to principles of the invention;

FIG. 15A shows, in mechanical schematic form, a portion of a haptic actuator prepared according to principles of the invention including an Evans mechanism in a first instantaneous state;

FIG. 15B shows, in mechanical schematic form, a portion of a haptic actuator prepared according to principles of the invention including an Evans mechanism in a second instantaneous state;

FIG. 15C shows, in mechanical schematic form, a portion of a haptic actuator prepared according to principles of the invention including an Evans mechanism in a third instantaneous state;

FIG. 15E shows, in mechanical schematic form, a portion of a haptic actuator prepared according to principles of the invention including an Evans mechanism in a fifth instantaneous state;

FIG. 34F shows, in schematic perspective view, a further instantaneous operational states of the exemplary actuator of FIGS. 34A-34B.

DETAILED DESCRIPTION

The following description is provided to enable any person skilled in the art to make and use the disclosed inventions and sets forth the best modes presently contemplated by the inventors of carrying out their inventions. In the following description, for purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the substance disclosed.

Figure 1:
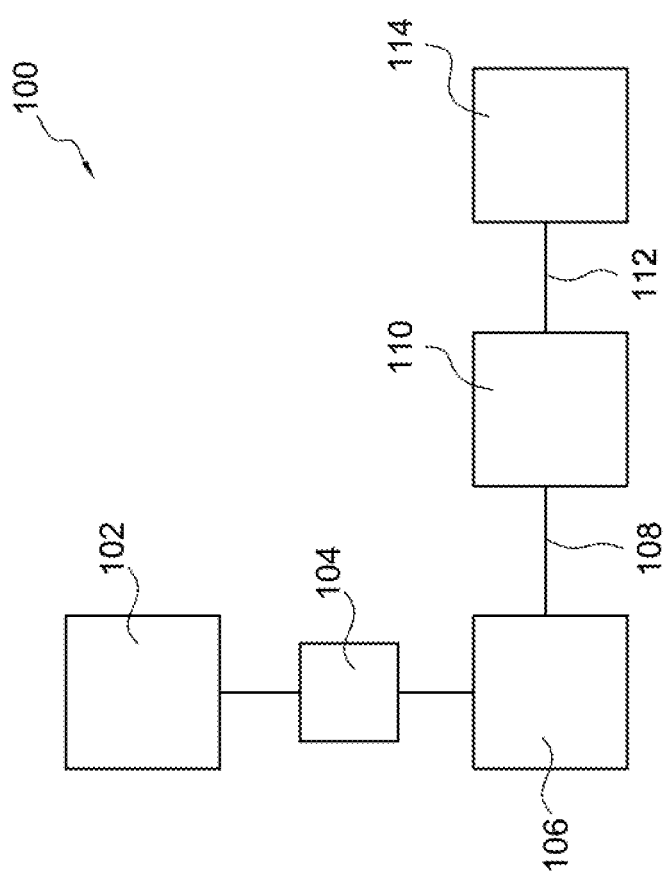
FIG. 1 shows, in schematic block diagram form, a portion of a haptic actuator prepared according to principles of the invention.

FIG. 1 shows, in schematic block diagram form, a portion of one embodiment of a haptic actuator 100 prepared according to principles of the invention. The haptic actuator 100 includes a power source 102 operatively coupled through a control device 104 to a motor portion 106. The motor portion 106 is mechanically coupled 108 to a transmission portion 110. The transmission portion 110 is further mechanically coupled 112 to an inertial mass portion 114.

The transmission portion 110 is configured to receive mechanical energy from the motor portion 106 and accelerate the inertial mass portion 114 in relation to a position of the motor portion 106 along a desired spatial path. In various embodiments, the inertial mass portion 114 will include one or more individual elements which, according to the particular design and application, are accelerated along respective paths in relation to the position of the motor portion 106. Similarly, in respective embodiments, the transmission portion 110 may include several more or less discrete portions and, likewise, certain embodiments will include one or more motor portions. Indeed, in certain embodiments, the illustrated haptic actuator 100 will be one of several more or less similar haptic actuator subsystems forming, together, a haptic actuator system.

Figure 2:
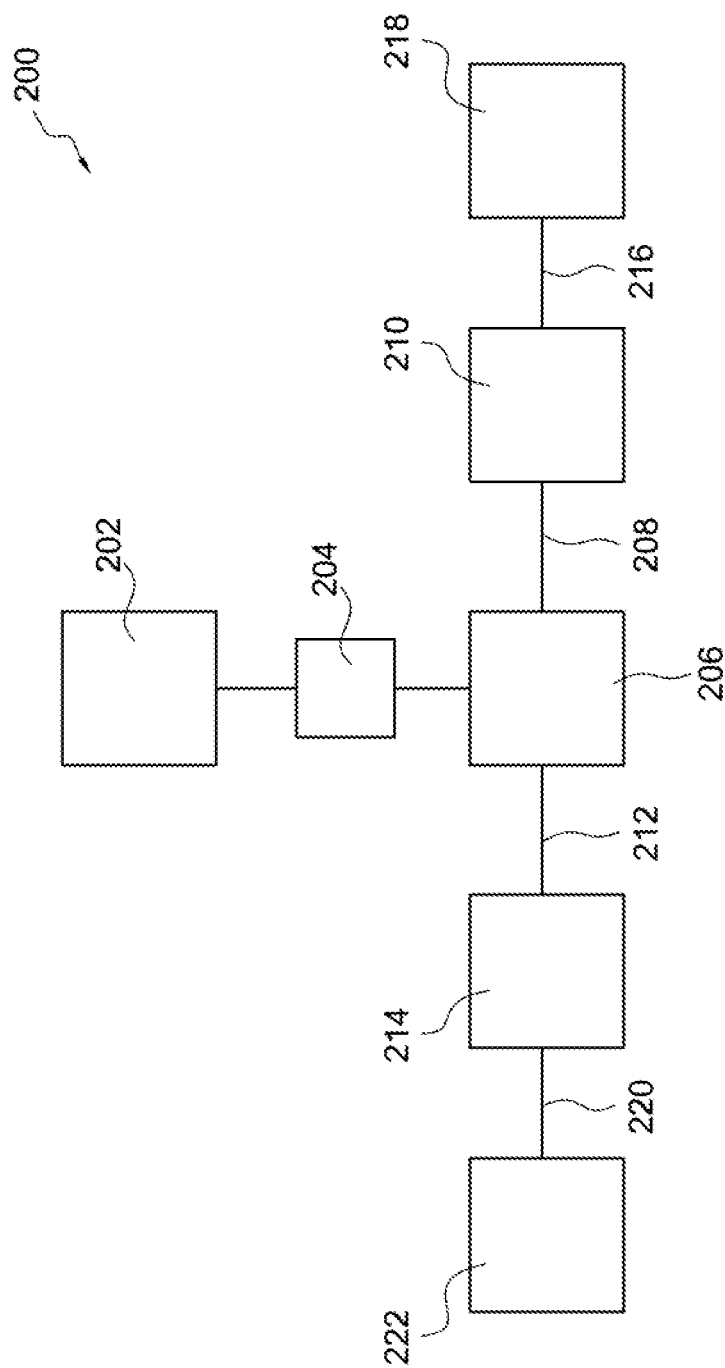
FIG. 2 shows, in schematic block diagram form, a portion of a haptic actuator prepared according to principles of the invention.

FIG. 2 shows, in schematic block diagram form, a portion of one such haptic actuator system 200. The haptic actuator system 200 includes a power source 202 operatively coupled through a control device 204 to a motor portion 206. The motor portion 206 is mechanically coupled 208 to a first transmission portion 210. The motor portion 206 is also mechanically coupled 212 to a second transmission portion 214. The first transmission portion 210 is further mechanically coupled 216 to a first inertial mass portion 218. Similarly, the second transmission portion 214 is further mechanically coupled 220 to a second inertial mass portion 222.

It will be clear to the practitioner of ordinary skill in the art that such a system can be arranged so that the first 210 and second 214 transmission portions receive mechanical energy substantially simultaneously from the motor portion 206. Moreover, depending on the requirements of a particular application, the first 210 and second 214 transmission portions can be arranged so that the first 218 and second 222 inertial mass portions diverge symmetrically from one another over at least a portion of their motion, such that the center of mass of the haptic actuator system 200 experiences little or no acceleration due to their motion.

In certain embodiments of the invention, the first 218 and second 222 inertial mass portions can be driven symmetrically in opposite directions as described above and thereafter accelerated in a common direction so as to provide an abrupt change in the center of mass of the haptic actuator system 200. The consequence of this change in direction is a sharp mechanical output signal, as conveyed through, in one example, the motor portion 206. In another example, the output signal is conveyed directly to a system case (not shown) through one or both of the transmission portions 210, 214.

Figure 3A:
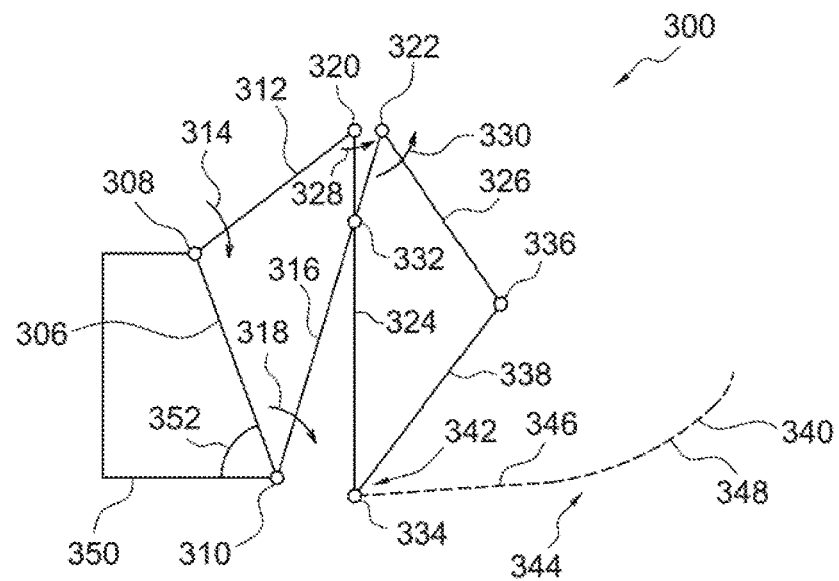
FIG. 3A shows, in mechanical schematic form, one instantaneous state of a portion of a haptic actuator prepared according to principles of the invention.
Figure 3B:
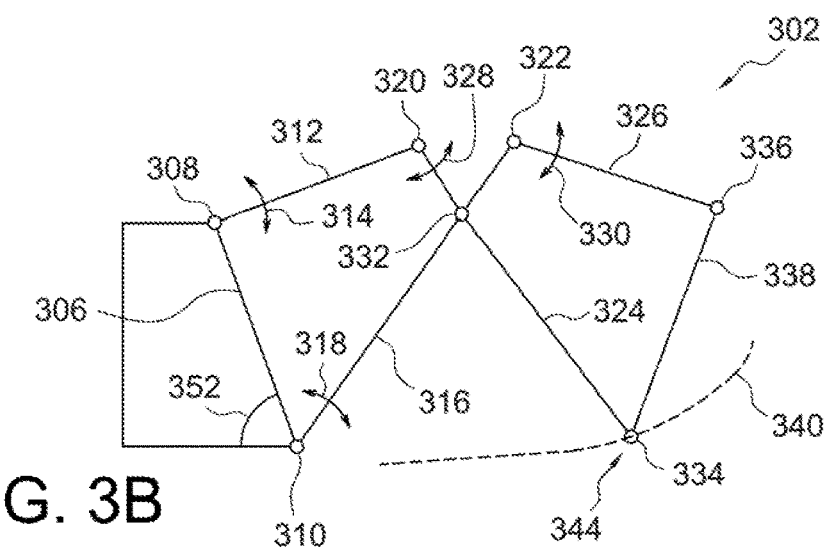
FIG. 3B shows, in mechanical schematic form, another instantaneous state of a portion of a haptic actuator prepared according to principles of the invention.
Figure 3C:
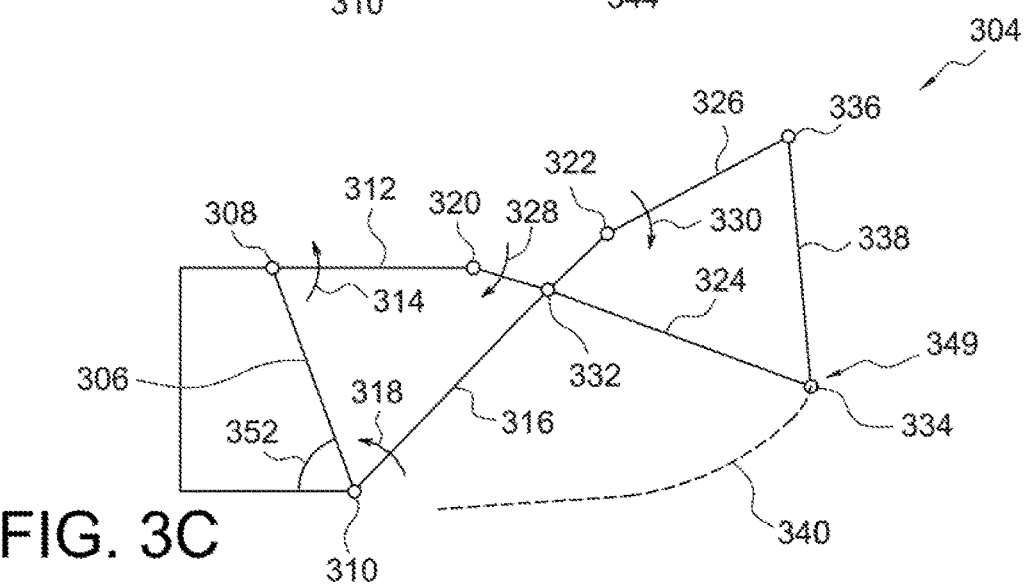
FIG. 3C shows, in mechanical schematic form, still another instantaneous state of a portion of a haptic actuator prepared according to principles of the invention.

FIGS. 3A, 3B, and 3C show, in mechanical schematic form, a subsystem of an exemplary haptic actuator system at three respective instantaneous states 300, 302, 304. The embodiment of FIGS. 3A, 3B, and 3C is notable for being implemented as a plurality of mechanical links including substantially rigid structural members and pivotal joints.

A first link 306 forms a mechanical ground for the illustrated subsystem. For purposes of discussion, first link 306 may be considered substantially stationary throughout the illustrated instantaneous states. In a practical example, first link 306 might be mechanically coupled to a case (not shown) of a consumer device such that a mechanical impulse transferred to link 306 would be readily detected by a user holding, or otherwise in tactile contact with, the case.

Link 306 supports first 308 and second 310 pivot points. In practice, these pivot points may be implemented as rotary hinges or flexible hinges, among other alternatives. In certain embodiments, and as further discussed below, it will be advantageous to implement these hinges, and the substantially rigid link elements through the use of a μMECS™ manufacturing technology.

Pivot point 308 supports a further link 312 so as to allow pivotal motion through 314, as indicated. Pivot point 310 supports a link 316 for pivotal motion 318, as indicated. Further pivot points 320, 322 are disposed at or near distal ends of link 312 and 316 respectively. Pivot point 320 supports a link 324 and pivot point 322 supports a link 326 so as to permit respective pivotal motions 328 and 330.

As indicated, links 316 and 324 are mutually pivotally coupled at a intermediate pivot point 332. Link 324 supports a further pivot point 334 at a distal end thereof. Link 326 supports a further pivot point 336 at a distal end thereof. A further link 338 is pivotally coupled at or near its ends between pivot points 334 and 336.

As noted above, FIGS. 3A, 3B and 3C illustrate three respective instantaneous states in the operation of the haptic actuator subsystem. In one embodiment, operation of the subsystem effects a transition from state 300 to state 302 and thereafter to state 304. Consistent with this transition, pivot point 334 is driven along a "J-trajectory" 340. Accordingly, when the subsystem is in state 300, pivot point 334 is located approximately at a proximal end 342 of J-trajectory 340. When the subsystem is in state 302, pivot point 334 is located at an intermediate location 344 on the J-trajectory 340. When the subsystem is in state 304, pivot point 334 is located approximately at a distal end 349 of the J-trajectory 340.

One of skill in the art will appreciate that the identified states 300, 302 and 304 are merely exemplary, and that at an arbitrary intermediate time, pivot point 334 will be found at a corresponding location along the J-trajectory. Moreover, the practitioner of ordinary skill in the art will understand that motion of the pivot point 334 along the J-trajectory need not start in any particular state, but will be selected to traverse the J-trajectory in any fashion appropriate to the requirements of a particular application. Moreover, motion along the J-trajectory will, in respective embodiments, be cyclical, proceeding on an ongoing basis or through any finite number of cycles (including fractional portions of one cycle, and any desirable multiples thereof), again according to requirements of a particular application.

It will also be appreciated that the characteristics of the J-trajectory will vary according to the details of a particular subsystem design. Thus, in the illustrated embodiment, the J-trajectory 340 includes a first portion 346 that is generally linear and a second portion 348 that is generally arcuate, the characteristics of these regions, including their length and degree of linearity, will vary from application to application.

In certain practical applications, for example, generally linear region 346, will as a practical matter, be somewhat nonlinear (for example somewhat arcuate). Nevertheless, the mechanical signal produced will be sufficiently within the requirements of a particular application so as to be completely acceptable and desirable. In like fashion, arcuate portion 348 will be, in certain embodiments, substantially circular. In other embodiments, arcuate portion 348 will be arranged to follow any curve appropriate to the requirements of a particular application.

Referring again briefly to FIG. 1, it will be appreciated that the subsystem described with respect to FIGS. 3A, 3B and 3C will, in certain embodiments, correspond to a portion of the transmission portion 110 of the haptic actuator 100. Moreover, one will understand that an inertial mass coupled to follow the J-trajectory (generally consistent with pivot point 334) may, in certain embodiments, correspond to inertial mass portion 114 of the haptic actuator 100. In practice, the precise coupling of the inertial mass (not shown) to the subsystem will depend on the requirements of a particular application, and may include coupling to one or more of link 324, link 338 and pivot point 334. Having been instructed in the requirements and benefits of the present invention, one of skill in the art will be able to ascertain the particular apparatus most beneficial for a particular application with a minimum of experimentation.

While the systems and apparatus disclosed herewith are novel and surprisingly desirable, having had the benefit of the present disclosure one of skill in the art will readily ascertain, with a minimum of experimentation, the particular characteristics necessary to provide a subsystem capable of producing a J-trajectory (or other trajectory) appropriate to the needs of a particular technical application.

Notwithstanding the foregoing, it should nevertheless be noted that in one exemplary embodiment link 306 and 338 have a length of approximately 49 units each, links 312 and 326, have a length of approximately 45 units each, and links 316 and 324 each have a length of approximately 89 units. Moreover, an exemplary length between pivot points 310 and 332 along link 316 is approximately 64 units and consequently an exemplary length between pivot points 332 and 322 is approximately 25 units. Similarly, an exemplary length between pivot points 334 and 332 is approximately 64 units and therefore an exemplary length between pivot points 332 and 320 is approximately 25 units.

It should also be noted that, in an exemplary embodiment, a reference line 350 is substantially coplanar with, or disposed in a plane parallel to, a plane containing, first generally linear portion 346 of J-trajectory 340. Moreover, in one exemplary embodiment, an angle 352 is substantially constant during operation of the subsystem, and has a value of, for example, approximately 70°.

It should be further noted that the proper selection of angle 352 allows the ready alignment of a subsystem, such as that shown in FIGS. 3A, 3B and 3C, with a further subsystem, so as to place the respective generally linear paths 346 of respective J-trajectory 340 in substantially direct opposition to one another. Consequently, the motion of an inertial mass coupled to one subsystem is offset by a corresponding motion of an inertial mass of the other subsystem. As previously noted, this offset results in a minimum of acceleration of a center of mass of the two subsystems considered together at a corresponding time. As a result, the risk of disturbing a user with a spurious signal resulting from motion over generally linear portions 346 of the J-trajectories is minimized.

Figure 4A:
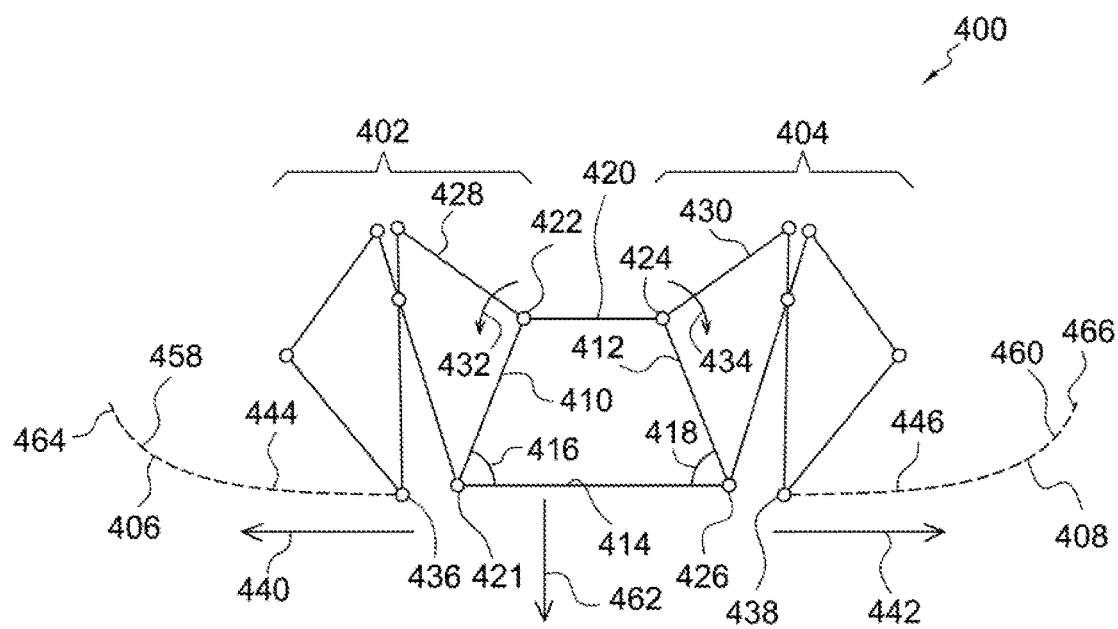
FIG. 4A shows, in mechanical schematic form, one instantaneous state of a portion of an exemplary haptic actuator prepared according to principles of the invention.
Figure 4B:
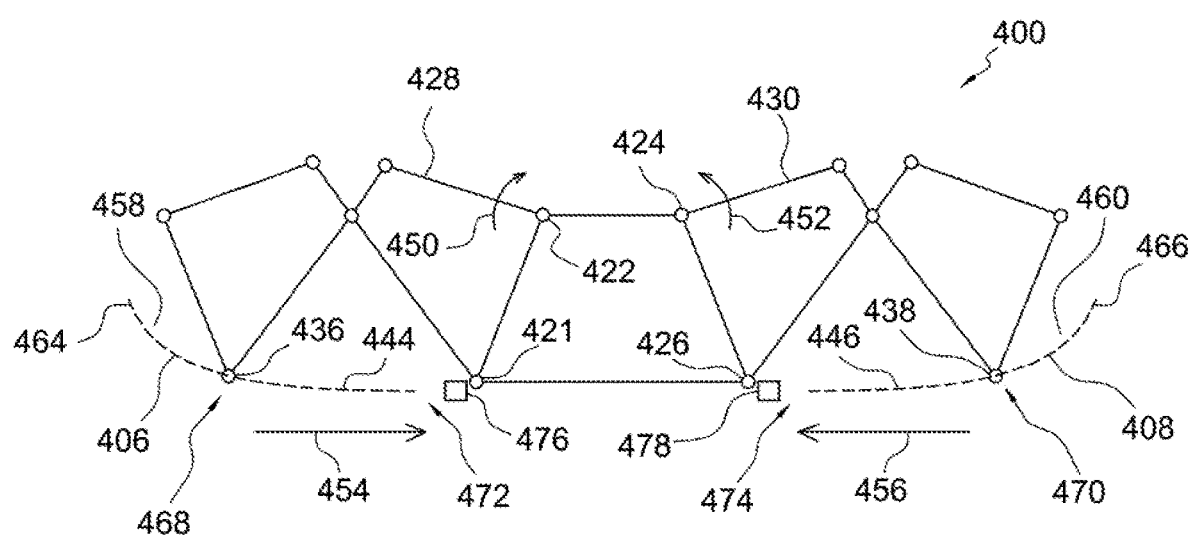
FIG. 4B shows, in mechanical schematic form, a further instantaneous state of a portion of an exemplary haptic actuator prepared according to principles of the invention.

A corresponding illustration of diametrically opposed motions of subsystems within a haptic actuator is illustrated in FIGS. 4A and 4B. Further reference is made to FIG. 2, and the foregoing description of the same. FIG. 4A shows, in mechanical schematic form, a portion 400 of a haptic actuator prepared according to principles of the invention. The illustrated portion 400 includes a first subsystem 402 and a second subsystem 404. The subsystems 402 and 404 are arranged and configured to produce motion of respective inertial masses (not shown) along respective J-trajectories 406, 408. Reference or "ground" links 410, 412 are disposed in substantially fixed spatial relation to one another and, mutually, to a common link 414. Each of links 410 and 412 is disposed at a respective angle 416, 418 to common link 414. In some embodiments, the respective angle 416 and 418 will be equal (although transformed through a mirror symmetry) so as to form an isosceles trapezoid in conjunction with further common link 420.

The reader will appreciate that, although represented schematically as individual line segments, each link discussed can be of any form appropriate to support the indicated pivot points in an operative space relationship to one another. Moreover, although indicated as forming the sides of an isosceles trapezoid, links 414 and 420 are purely optional, according to the needs of a particular embodiment. Again, these links merely represent for descriptive purposes any appropriate structure adapted to substantially maintain the operative pivot points in a desired spatial relationship to one another. Thus, for example, link 420 and/or link 414 may be omitted where links 410 and 412 are otherwise mechanically coupled in substantially fixed relation to one another.

Such coupling may be effected by their mutual coupling to, for example, a motor housing partially or wholly disposed within the perimeter of the indicated trapezoid. In other embodiments, links 410 and 412 are not discrete mechanical elements, but are integrally formed as part of a larger structure, again recognizing that the structure need only provide appropriate support for the indicated pivot points, e.g., 421, 422, 424, 426.

In one embodiment, as illustrated, further links 428 and 430 are coupled at proximal ends thereof to pivot points 422 and 424 respectively. Further apparatus (not shown) is arranged to urge link 428 pivotally 432 around pivot point 422, and to urge link 430 pivotally 434 around pivot point 424. Taken in view of the drawings and descriptions of FIGS. 3A, 3B and 3C, one of ordinary skill in the art will readily comprehend that such pivotal forces will result in pivotal rotation of link 428 about pivot point 422 and of link 430 about pivot point 424, and in corresponding motions of pivot point 436 along J-trajectory 406 and of pivot point 438 along J-trajectory 408 as indicated by arrows 440 and 442 respectively.

Naturally, according to Newton, the acceleration of the apparatus at pivot point 436 along the linear portion 444 of J-trajectory 406 must produce an equal reactive force in the direction opposite to arrow 440. Likewise, the acceleration of the apparatus at pivot point 438 must produce an equal reactive force in the direction opposite to arrow 442. To the extent that the rotations 432 and 434 of links 428 and 430 respectively proceeds substantially synchronously, and to the extent that the component and cumulative masses and accelerations of the two subsystems 402 and 404 are substantially equal these reactive forces will correspondingly tend to be equal. Moreover, to the extent that the links of the system are substantially rigid and that the pivot points are consequently substantially spatially fixed with respect to one another these forces will effectively balance and cancel one another; the result being no motion of a center of mass of the system as a whole. Naturally, a non-ideal system will exhibit some elasticity and some nonlinearity in the paths of the components. Nevertheless, a well-designed system will produce vibration during this opposed motion 440, 442 that is negligible for practical purposes.

Likewise, as shown in FIG. 4B, respectively urging links 428 and 430 pivotally in the opposite direction 450, 452 about pivot points 422 and 424 results in an inward acceleration in the direction of arrows 454, 456 respectively of pivot points 436 and 438 along the linear portions of J-trajectories 406 and 408. Again, acceleration of the apparatus adjacent to pivot points 436 and 438 produces reactive forces that are substantially equal and opposite to one another. To the extent that the apparatus as a whole is substantially rigid, any displacement of the overall system's center of mass is minimal.

It will be appreciated that pivot points 436 and 438 can oscillate repeatedly, and more or less indefinitely, within the linear regions 444 and 446 of J-trajectories 406 and 408 without a substantial output reaching the user. It will be apparent to one skilled in the art, however, that further rotation of link 428 in direction 432 and link 430 in direction 434 will drive pivot points 436 and 438 out of the linear regions 444 and 446 of J-trajectories 406 and 408 and into the respective arcuate regions 458 and 460.

Subject to rigidity of the links and pivot points, this transition will result in a rapid acceleration of apparatus mass at pivot points 436 and 438 into a direction more or less perpendicular to arrows 440 and 442. Again, according to Newton, there must be an equal and opposite reaction to this acceleration and the centripetal forces transferred through the linkage assemblies of the subsystems 402 and 404 result in this reaction being expressed as an acceleration of, for example, link 414 in the direction of arrow 462.

The characteristics of this acceleration will depend on the masses of the apparatus in general, and in particular at pivot points 436 and 438. Of particular importance will be the kinetic energy of the masses at pivot points 436 and 438 as acquired by their acceleration across linear regions 444 and 446 of the J-trajectories 406 and 408, along with any further energy applied to accelerate the masses during their passage across the arcuate portions 458, 460 of the J-trajectories 406 and 408.

In certain embodiments of the invention, the configuration of the links and pivot points of the subsystems 402 and 404 will result in an abrupt deceleration of pivot point 436 at a distal end 464 of J-trajectory 406 and a corresponding abrupt deceleration of pivot point 438 at distal end 466 of J-trajectory 408. Depending again on rigidity of the subsystem elements, these abrupt decelerations will be conveyed to the balance of the apparatus and, in particular, to link 414, which will then accelerate in a direction opposite to arrow 462.

One of skill in the art will appreciate that, were the entire apparatus in free space, the opposing accelerations along arrow 462 would result in a net return of the apparatus as a whole to its origin. To the extent, however, that the apparatus is part of a consumer electronic device, energy will be transferred to a user through a case of the device during each half of the cycle. Consequently, subject to system characteristics, one or both halves will be detectable as an output "tap." As noted above in relation to FIG. 1, the magnitude of this tap will be increased by coupling pivot points 436 and 438 to supplemental inertial mass portions, the masses of those portions being consistent with the available space, driving energy and structural strength of the apparatus as a whole. Notwithstanding the foregoing, in certain embodiments of the invention, J-trajectories and acceleration profiles will be selected to avoid rotation about a center of mass of the apparatus as a whole.

It should also be understood that, while the foregoing presentation assumed an initial configuration like that of FIG. 4A with an initial motion along the J-trajectories outwardly of pivot points 436 and 438, in alternative embodiments an initial position of the pivot points may be established anywhere along the J-trajectories, according to the requirements of that embodiment.

Hence, for example, one embodiment of the invention will include subsystems with an initial configuration like that of FIG. 4B and pivot points 436 and 438 at initial positions 468 and 470 respectively. In one such embodiment, for example, pivot points 436 and 438 would be initially driven inwardly in the direction of arrows 454 at 456 respectively, accumulating kinetic energy during this portion of the cycle. Arriving at proximal ends 472, 474 of the respective J-trajectories 406, 408, the pivot points 436 and 438 would rapidly decelerate and reverse direction.

To the extent that this deceleration and reversal can be done more or less elastically, kinetic energy acquired during the initial inward movement of the pivot points 436 and 438 can be returned to the apparatus and supplemented by further driving forces as the pivot points 436 and 438 move outwardly along the linear portions 444 and 446 of the I-trajectories 406 and 408. In such an arrangement, inertial masses coupled at or adjacent to the pivot points 436 and 438 might arrive at the distal ends 464 and 466 of the J-trajectories 406 and 408 with substantially more kinetic energy than might otherwise be the case.

The elastic reversal described above will be achieved, in various embodiments, by the placement of, for example, respective devices 476, 478, such as mechanical spring devices, adjacent to proximal ends 472, 474 of the J-trajectories 406 and 408 respectively. Appropriate mechanical features of the pivot points 436, 438 and/or corresponding inertial mass portions will be arranged to impinge on a receiving portion of the mechanical spring device so as to compress the spring and to thereby be accelerated reverse as the spring reaches its maximum compression and proceeds to expand.

In light of the foregoing disclosure, one of skill in the art will appreciate, that other elastic devices will also be employed in corresponding embodiments of the invention. Thus in certain embodiments of the invention, devices 476, 478 will be omitted. Instead, the intrinsic elasticity of one or more of the links and/or the pivot points of the subsystems 402, 404 will be used to store kinetic energy and return it to the inertial masses supported at or adjacent to pivot points 436, 438.

In certain further embodiments of the invention, permanent magnet devices employing attractive and/or repulsive magnetic forces will be applied to the storage and release of inertial mass kinetic energy in proximity to endpoints 472 and 474 of the J-trajectories 406 and 408. In still other embodiments of the invention, active energy storage will be achieved by applying electromagnetic devices which receive the kinetic energy at, for example, solenoidal or rotary electrical generators during deceleration of the inertial mass portion. The kinetic energy is converted to electrical energy which is stored capacitively and/or in an electrochemical battery, for example. The stored energy is thereafter returned to the moving masses by using the solenoid or rotary electric generators as electric motors.

Such active devices offer the benefit that they can be placed at both ends of the linear portions 444, 446 respectively i.e., at ends 472, 474 and initial positions 468, 470. In operation, the inertial masses at pivot points 436, 438 can be driven repeatedly back and forth across the linear portions 444 and 446 (preferably at resonant frequency) and acquiring additional energy with each cycle. Thereafter, at a desirable time and/or in response to a control signal, the elastic devices at initial positions 468 and 470 can be deactivated so as to allow the inertial masses including their entire accumulated energy to pass on to the arcuate portion 458, 460 of the J-trajectories 406 and 408 respectively.

The advantages of this resonant accumulation of energy will be evident to one of ordinary skill in the art. Accordingly, in certain embodiments of the invention, the intrinsic elasticity of the system will be employed, without active control, to accumulate energy in the moving inertial mass portions. Moreover, it should be noted that because motion along the linear portions is substantially symmetrical and balanced in opposition, little if any energy will leak into external acceleration of the overall system during resonant accumulation of kinetic energy in the moving masses.

Figure 5A:
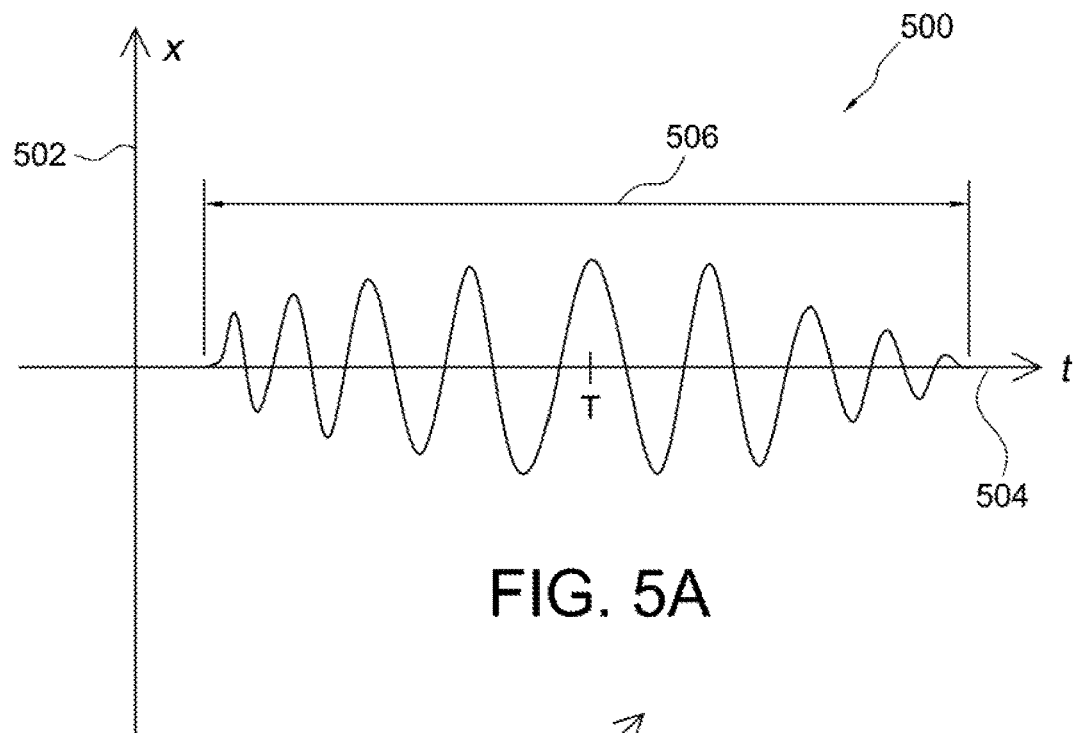
FIG. 5A shows, in graphical form, a representation of position as a function of time of a portion of a Linear Resonant Actuator.

FIG. 5A shows a generic graphical representation 500 of the motion 502 of a mass of an exemplary LRA with respect to time 504. As is evident from the graph, the LRA benefits from system resonance and the moving mass gradually accumulates energy to produce a maximum signal at about time T. The overall duration of the vibration signal 506, however, must be fairly large so as to overcome system inertia and accumulate significant resonant energy. Consequently, the user detects a buzz having significant duration. The system is not capable of generating a sharp tap.

Figure 5B:
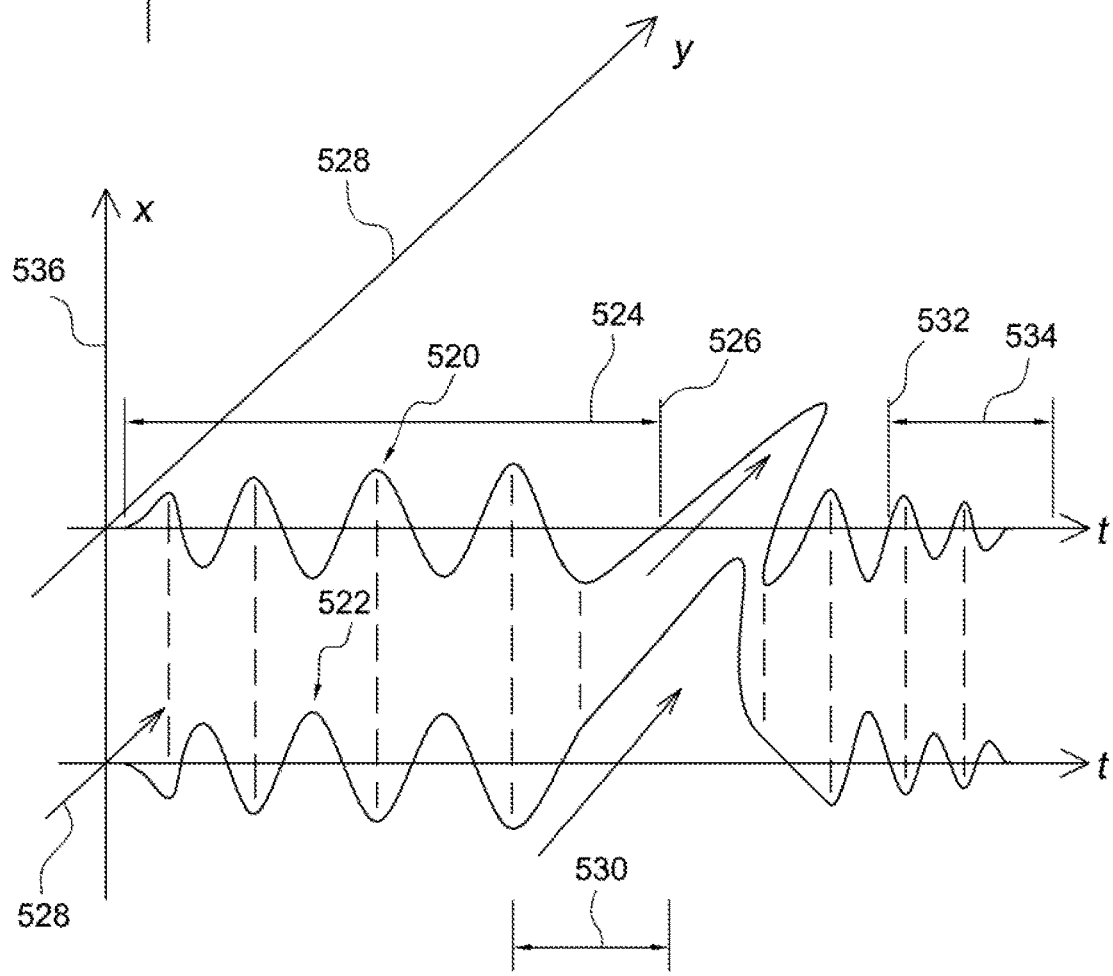
FIG. 5B shows, in graphical form, a representation of position as a function of time of two portions of a haptic actuator prepared according to principles of the invention.

In contrast, FIG. 5B shows the characteristics signals of two subsystems 520, 522 of a haptic actuator according to principles of the present invention. Like the LRA, the subsystems of the haptic actuator accumulate energy over a time period 524 through mechanical oscillation. The two subsystems, however, oscillate 180° out of phase with one another. Consequently, during the time period 524 no external signal is generated. When an external signal is desired, at time 526, the masses of both subsystems are diverted into a new spatial dimension 528. Because both masses move in the same direction in this new dimension 528, their reactive forces no longer oppose one another. Rather they add to produce a high-energy signal of short duration 530. At the conclusion 532 of the short duration 530, the masses of the two subsystems resume oscillating in opposite phase in the common dimension 536, thereby suppressing once again any appreciable external signal.

An optimal frequency for a vibrating LRA is approximately 40 Hz. The high-energy broad-spectrum tap signal of a haptic actuator according to the present invention is significantly better at attracting a user's attention than the limited 40 Hz signal of an optimal LRA.

Figure 6:
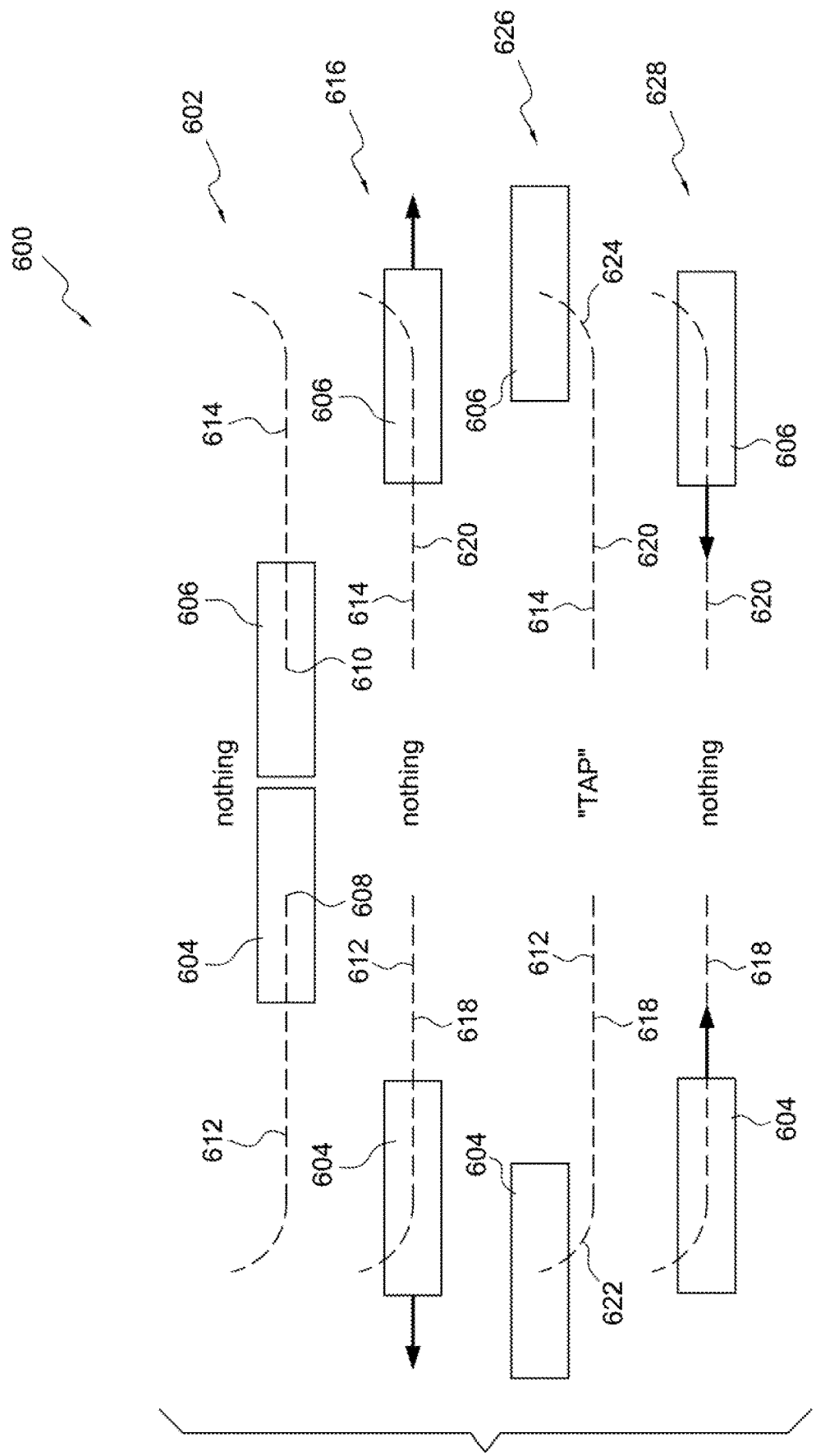
FIG. 6 shows a schematic representation of instantaneous states of a haptic actuator prepared according to principles of the invention.

FIG. 6 further schematically illustrates 600 the output signals associated with various phases in the operating cycle of a haptic actuator prepared according to principles of the invention. As indicated, when the two inertial mass portions 604, 606 of the haptic actuator system are static with respect to one another 602 at respective proximal ends 608, 610 of their J-trajectories 612, 614, no output signal is produced.

Similarly, when the two inertial mass portions 604, 606 are moving symmetrically away from one another 616 along respective linear portions 618, 620 of J-trajectories 612, 614 no output signal is produced. It should be noted that this is true whether the motion of the masses is uniform or accelerated, as long as both masses experience acceleration profiles that are symmetrically opposed.

When the masses proceed beyond the linear regions 618, 620 of the J-trajectories 612, 614 into respective arcuate regions 622, 624, the inertial mass portions 604, 606 produce a tap signal 626. Finally 628, as the inertial mass portions 604, 606 reenter the linear regions 618, 620 and resume symmetrically opposed motion profiles, no further signal is produced.

In certain embodiments of the invention, respective lengths of the linear regions 618, 620 of the J-trajectories 612, 614 will be substantially longer than the length of the arcuate regions 622, 624 of the J-trajectories. Consequently, the inertial mass portions 604, 606 are able to acquire substantial kinetic energy over a relatively long time and then release that energy rapidly to the balance of the system over the short time during which the inertial mass portions 604, 606 traverse the arcuate regions 622, 624. This rapid release of energy produces the characteristic tap signal of the haptic actuator of the present invention when operated in tap mode.

With a large spring constant, an electromagnet or other motor portion can draw both inertial mass portions 604, 606 to the respective proximal ends 608, 610 of the J-trajectories 612, 614 against the spring. Thereafter, the electromagnet or other motor portion can be released so that both spring and magnet/motor portion are operating together to accelerate the mass. This mode of operation results in a good single cycle tap.

Alternately, a linear in-plane vibration can be built up, which will have minimal impact on the outside world due to motion being equal and opposed. Thereafter, additional action is taken to make both inertial masses turn the "J" corner into respective arcuate regions 622, 624. In certain embodiments, the additional action includes reconfiguring the linkage, or simply surging current to increase amplitude.

In another mode of operation, vibration is built up in oscillations in linear regions 612 and 614. Thereafter, a surge in current takes the inertial masses 604, 606 past a bi-stable point so they can be latched and stored in a cocked position, similar to the operation of a compound bow. This state is maintained until an output of a tap signal is desired, at which point an opposing current surge is applied to the system. This surge of current overcomes the latching force and brings the inertial mass portions 604 and 606 out of storage. The inertial mass portions 604 at 606 proceed through the arcuate regions 622, 624 with extreme velocity, producing a desirable tap signal.

It should be further noted that tap mode is only one of the available modes of operation of a system and apparatus prepared according to the present invention. Indeed, one of the benefits of the present invention is that a single device can be employed to produce output signals having a wide variety of different characteristics. For example, it should be clear that, while various resonant oscillating modes of operation are beneficially employed in respective embodiments of the invention, in certain other embodiments a single cycle or half-cycle is sufficient to produce the desired tap signal. In addition, other modes of operation are available to produce a variety of other signals.

In a still further embodiment, a haptic actuator according to principles of the invention will be arranged to produce a tap in a first mode by having the inertial mass portion, e.g., 606 stop just short of a distal end of the J-trajectory. In a second mode, the inertial mass portion, e.g., 606 will be allowed to proceed past the stopping point so that the weight impacts a drum, and anvil, or other resounding device or portion of a device, producing an additional audible output to accompany the tap signal.

Figure 7A:
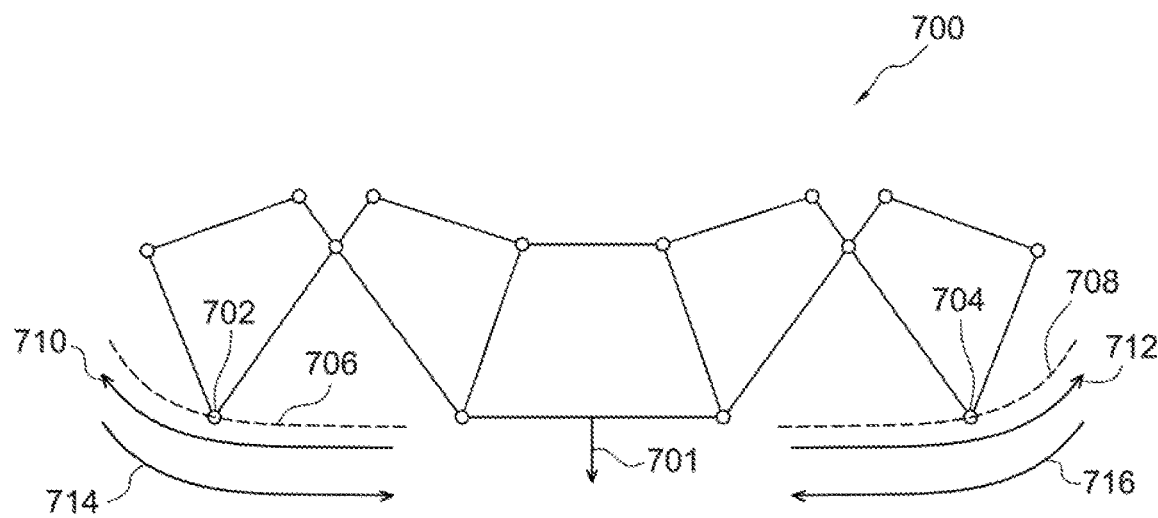
FIG. 7A illustrates, in mechanical schematic form, one instantaneous state of a portion of a haptic actuator prepared according to principles of the invention.

FIG. 7A illustrates, in mechanical schematic form, aspects of one embodiment of a haptic actuator 700, prepared according to principles of the invention. The haptic actuator 700 is shown operating in a mode to produce a single tap or a plurality of taps 701 as described above. That is, the illustrated operational mode includes having pivot points 702 and 704 traverse both linear and arcuate portions of respective J-trajectories 706, 708 while maintaining symmetrically opposed velocity profiles 710, 712 and 714, 716.

Figure 7B:
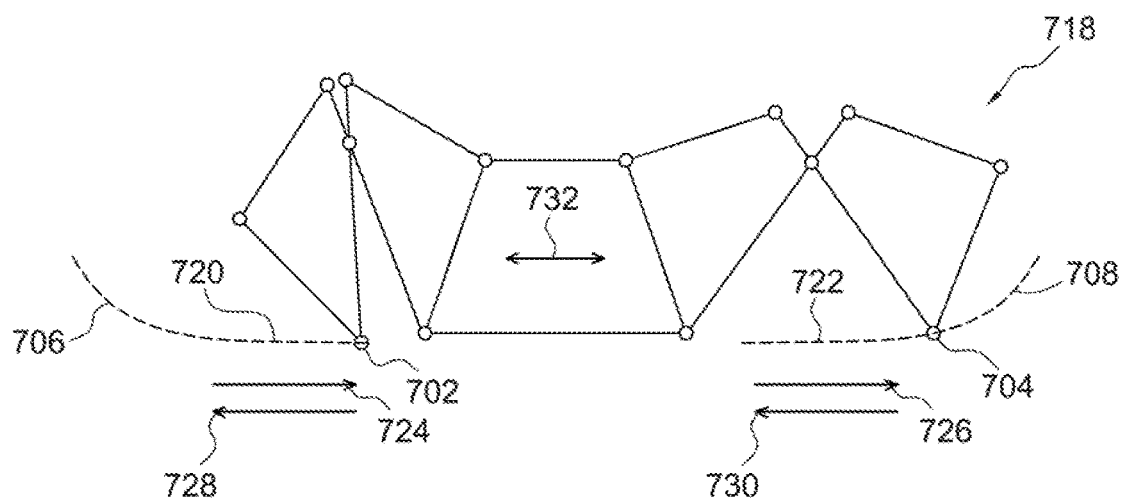
FIG. 7B illustrates, in mechanical schematic form, another instantaneous state of a portion of a haptic actuator prepared according to principles of the invention.

FIG. 7B shows an alternative mode of operation 718 in which pivot points 702, 704 traverse only the linear portions 720, 722 of J-trajectories 706, 708. Further, the pivot points 702, 704 move synchronously in the same direction. That is, both move together in a first direction 724, 726 and, thereafter, both move together in a second direction 728, 730. Repeating these motions in cyclical fashion results in a lateral vibration 732 of the system as a whole similar to that produced by a conventional LRA.

Figure 7C:
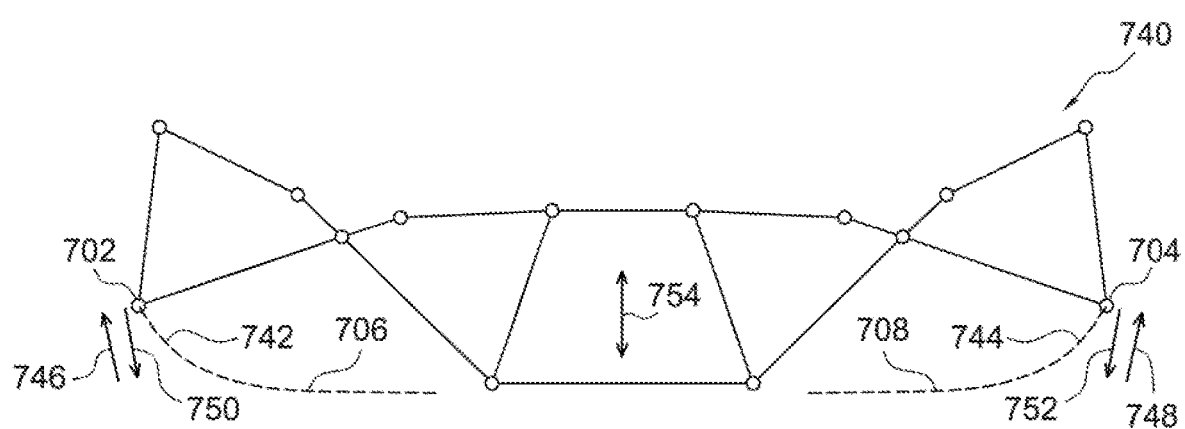
FIG. 7C illustrates, in mechanical schematic form, still another instantaneous state of a portion of a haptic actuator prepared according to principles of the invention.

FIG. 7C shows a further alternative mode of operation 740 in which pivot points 702, 704 traverse only the arcuate portions 742, 744 of J-trajectories 706, 708. Further, the pivot points 702, 704 move synchronously in the same direction. That is, both move together in a first direction 746, 748 and, thereafter, both move together in a second direction 750, 752. Repeating these motions in cyclical fashion results in a transverse vibration 754 that is substantially normal to the vibration 732 described above. In a typical application, transverse vibration 754 will be oriented across a smaller dimension of the apparatus as a whole whereas vibration 732 will be oriented across a larger dimension of the apparatus as a whole.

Figure 8:
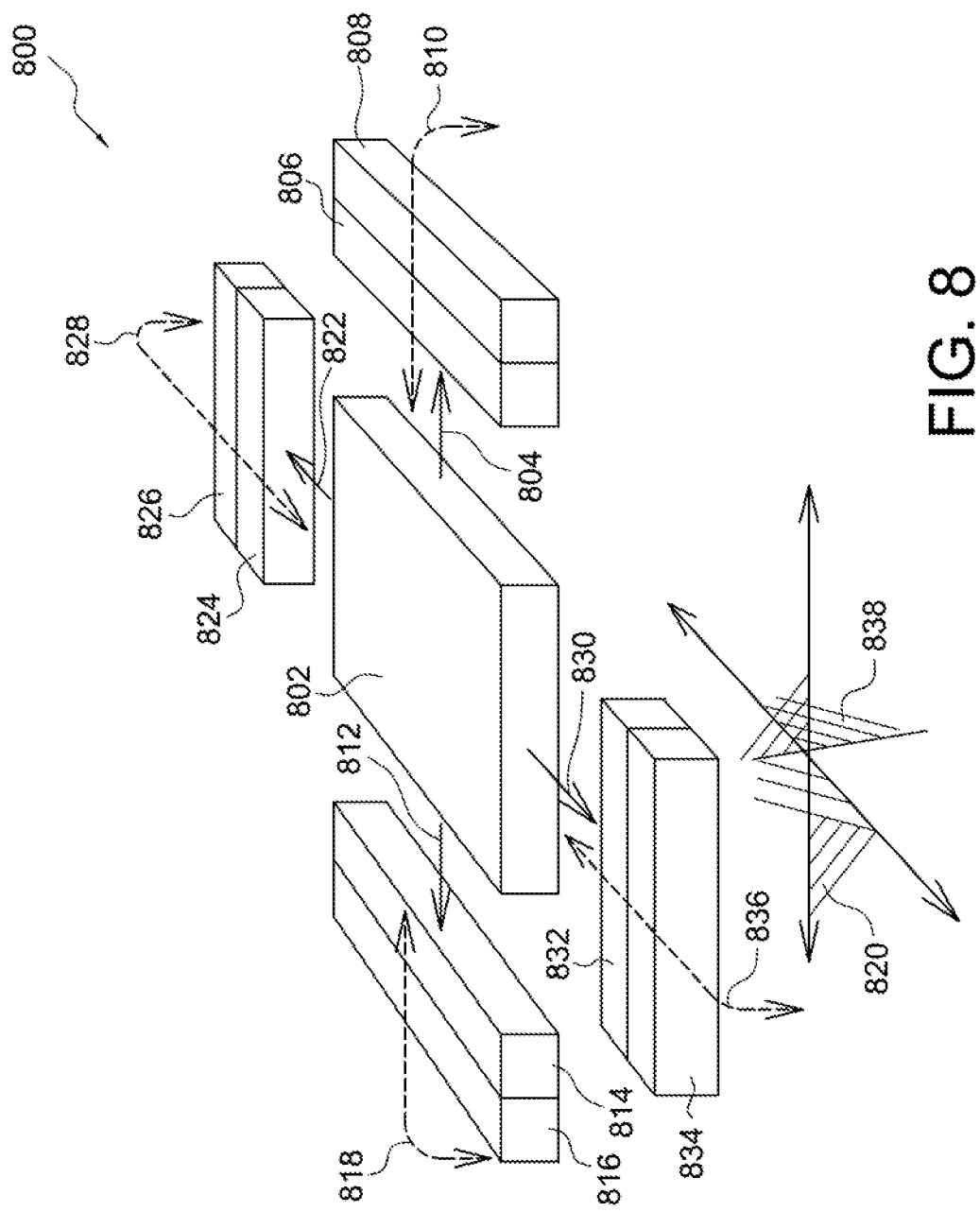
FIG. 8 represents, in perspective block diagram form, one configuration of a haptic actuator prepared according to principles of the invention.

FIG. 8 shows, in schematic perspective form, a block diagram illustrating a further haptic actuator 800 prepared according to principles of the invention. The haptic actuator 800 is configured to provide J-trajectories disposed within two planes oriented substantially normal to one another. Thus, for example a motor portion 802 is mechanically coupled 804 to a first transmission portion 806 and through transmission portion 806 to a first inertial mass portion 808. First transmission portion 806 is adapted to receive mechanical energy from the motor portion 802 and drive the inertial mass portion 808 through part or all of a first J-trajectory 810.

Motor portion 802 is also mechanically coupled 812 to a second transmission portion 814 and through the second transmission portion 814 to a second inertial mass portion 816. Second transmission portion 814 is adapted to receive mechanical energy from the motor portion 802 and drive the second inertial mass portion through part or all of a second J-trajectory 818. In certain embodiments, and as illustrated, first J-trajectory 810 and second J-trajectory 818 both lie within a common geometric plane 820.

Motor portion 802 is also mechanically coupled 822 to a third transmission portion 824 and through the third transmission portion 824 to a third inertial mass portion 826. Third transmission portion 824 is adapted to receive mechanical energy from the motor portion 802 and drive the third inertial mass portion through part or all of a third J-trajectory 828.

Motor portion 802 is also mechanically coupled 830 to a fourth transmission portion 832 and through the fourth transmission portion 832 to a fourth inertial mass portion 834. Fourth transmission portion 832 is adapted to receive mechanical energy from the motor portion 802 and drive the fourth inertial mass portion through part or all of a fourth J-trajectory 836. In certain embodiments, and as illustrated, third J-trajectory 828 and fourth J-trajectory 836 both lie within a common geometric plane 838. In some embodiments, and as illustrated, planes 820 and 838 are disposed substantially normal to one another.

In some embodiments, motor portion 802 will drive the inertial masses 808, 816, 826 and 834 synchronously through their respective J-trajectories such that, over the respective linear portions of the J-trajectories, the velocities and accelerations of masses 808 and 816 are symmetrically opposed and the velocities and accelerations of masses 826 and 834 are also symmetrically opposed. In this mode of operation, reactive accelerations will balance and the system 800 will produce a tap signal if and when the inertial masses 808, 816, 826 and 834 are allowed to proceed through the arcuate regions of the respective I-trajectories.

In such an event, the signal produced will reflect the cumulative effect of rapid acceleration of all four masses around the arcuate regions of the I-trajectories. This arrangement allows a larger spatial distribution of the inertial masses, as compared with a system having only two inertial masses, that will be beneficially employed in certain applications.

Furthermore, by changing the amplitudes and phase relationships of the mechanical signals delivered by the motor portion 802 to the four transmission portions 806, 814, 824 and 832 a wide variety of output signals can be impressed on the system as a whole. For example, by properly phasing the signals and limiting travel of the inertial masses to the respective linear portions of the respective J-trajectories a cyclical elliptical displacement of the center of mass of the haptic actuator 800 can be achieved. Where the transmission portions are configured symmetrically about the motor portion, as shown, this elliptical motion will take place in a plane perpendicular to both plane 820 and plane 838.

The practitioner of ordinary skill in the art will appreciate that one is not limited to one or two axes, but that devices having hexagonal symmetry, octagonal symmetry or other symmetries will also provide corresponding benefits. Likewise, in particular applications, it will be desirable to produce devices having odd numbers of subsystems with respective odd numbers of J-trajectories. Such systems, of course, will not enjoy the same cancellation of some reactive forces available in systems having even numbers of subsystems. Nevertheless, in particular applications, the same may be beneficial. The various trajectories, and portions thereof, can be employed in whole and in part, and in various combinations, to produce a large complement of accelerative elements. It will be apparent to one of skill in the art, in light of the foregoing, that these accelerative elements can be combined, with appropriate synchronization and/or time delays. Such combinations will produce, within a small form factor, many more signals than are available from conventional signaling devices.

One of skill in the art will further appreciate that while the foregoing discussion suggests that the linear portions of the J-trajectories are substantially linear and the arcuate portions are substantially arcuate, the requirements of a particular application will determine the degree to which the mechanical systems must be engineered to approach these ideals. In many practical systems, substantial deviations from these characteristics will be entirely acceptable.

One of skill in the art will also appreciate that, in some embodiments, motor portion 802 will include a plurality of individually controllable motors, and/or individually controllable transmission elements so that desirable signals can be coupled to the respective transmission portions 806, 814, 824 and 832. Having possession of the foregoing disclosure, a practitioner of ordinary skill in the art will readily configure individual embodiments of the invention to produce any of the very large variety of signals that can be achieved in corresponding arrangements.

As noted above, the motor portion 802 may include any of a variety of rotary and/or solenoidal electromagnetic motors. In addition, electrocapacitive, piezoelectric, pneumatic motors, hydraulic motors, electroactive polymer fibers and other artificial muscle devices, and any other motive apparatus that is known or becomes known in the art will be applied in respective embodiments, and are contemplated to be within the scope of the invention as defined by the claims.

Figure 9:
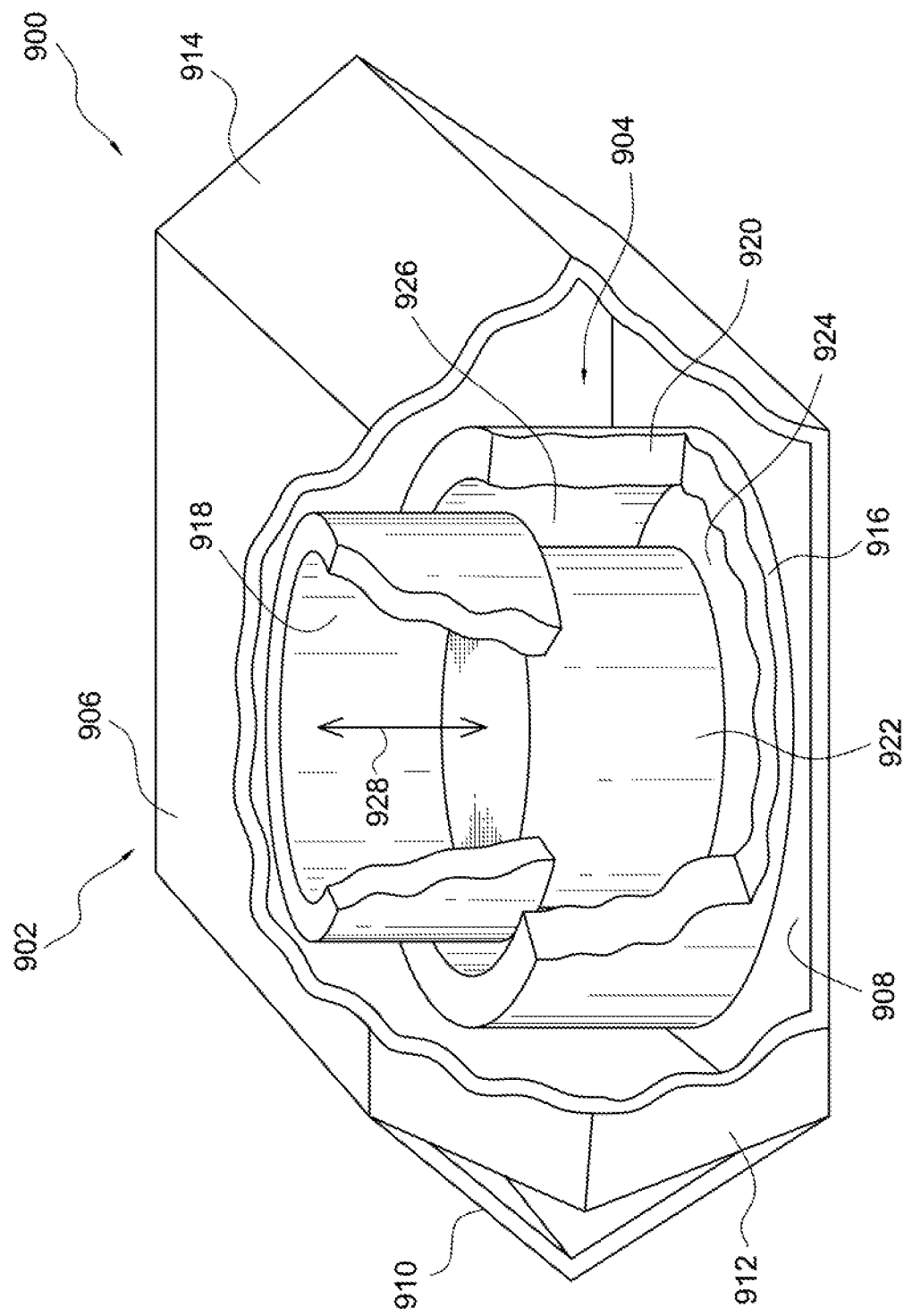
FIG. 9 shows, in cutaway perspective view, a portion of a haptic actuator prepared according to principles of the invention.

FIG. 9 shows, in cutaway perspective view, a portion of one exemplary motor portion 900 according to principles of the invention. The motor portion 900 includes a Sarrus linkage portion 902 and a voice coil portion 904. A Sarrus linkage is a known mechanical arrangement that includes an upper member 906, a lower member 908 and peripheral hinges, e.g., 910, 912, 914. It is characteristic of a Sarrus linkage that the peripheral hinges serve to maintain the upper and lower members substantially parallel to one another while allowing them to move towards and away from each other. It will be appreciated that the illustrated Sarrus linkage is one of many possible arrangements including arrangements in which the hinges fold inwardly, etc.

A voice coil 904 includes, e.g., a permanent magnet portion 916 and a coil portion 918. The magnet portion 916 includes an outer pole piece 920 and an inner pole piece 922, coupled to one another at one end by a disk 924 of magnetic material so as to provide axial cylindrical slot 926 between the outer pole piece 920 and the inner pole piece 922. Generally, the outer pole piece, disk and inner pole piece are formed as an integrated unit.

Magnetization of the permanent magnet portion establishes lines of flux within the cylindrical slot 926. The coil portion 918 includes a coil including many turns of fine wire wound so as to fit tightly within slot 926. When the coil is energized by passing an electric current through it, a solenoidal magnetic force acts on the coil in an axial direction 928 such that the coil portion 918 is either ejected from the slot 926 or drawn into it, according to the direction of the electric current flow and the polarity of the permanent magnet portion 916. Electrical energy is thus converted to mechanical energy for use within a mechanical system.

One of skill in the art will appreciate that a motor portion like exemplary motor portion 900 can be placed adjacent a supporting structure. Appropriate linkages can be provided between, e.g., the upper member 906 of the Sarrus linkage and the supporting structure so as to convey the mechanical energy developed by the motor portion 900 into the linkages of a transmission portion like, e.g., those illustrated 700 in FIG. 7A above. Motor portion 900 can thus be used to energize the pivot points 702, 704 and drive them through the respective J-trajectories 706, 708.

Figure 10A:
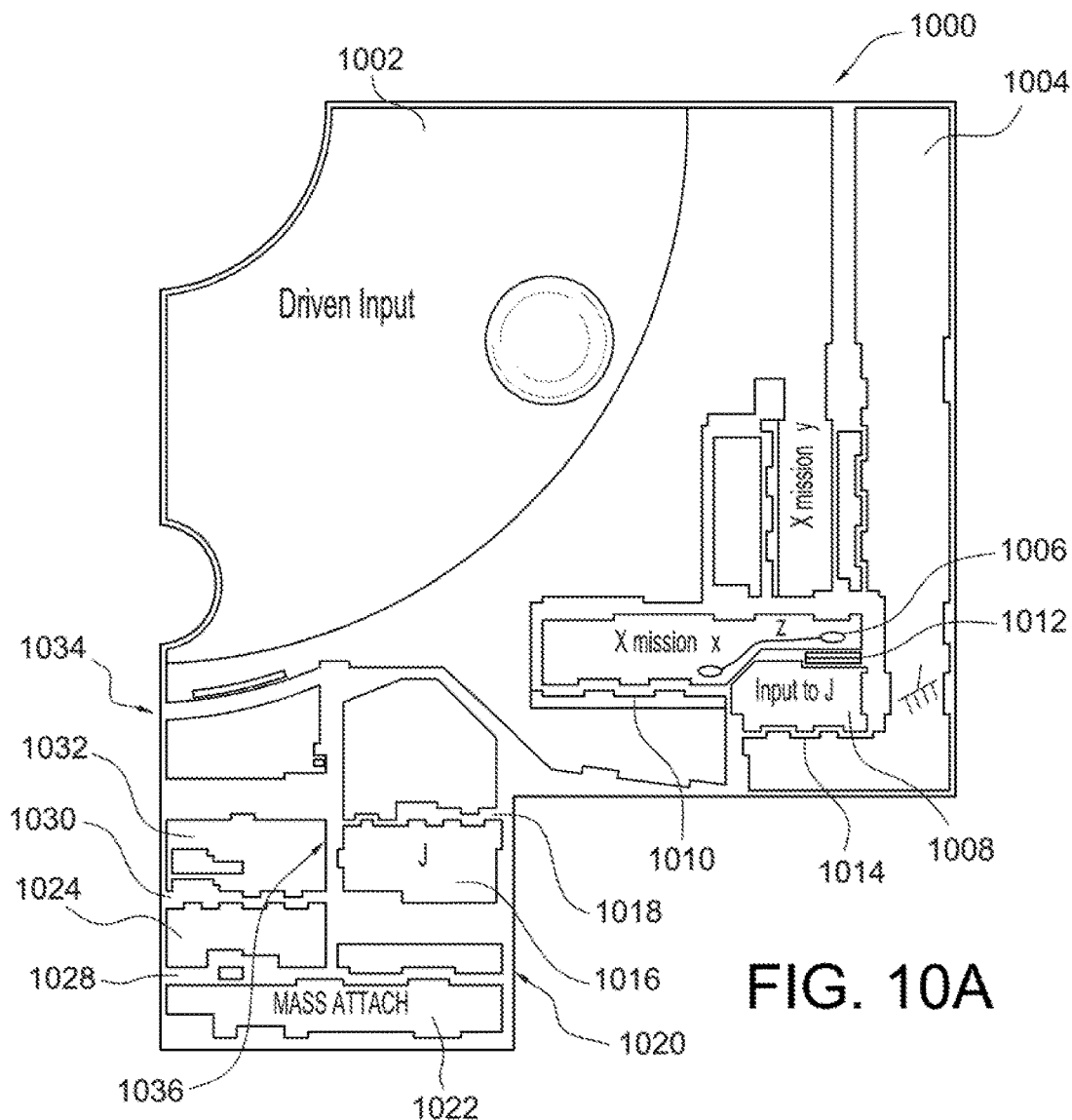
FIG. 10A shows, in schematic plan view, a portion of haptic actuator prepared according to principles of the invention.

FIG. 10A shows a portion of an exemplary Sarrus linkage and further linkages 1000 according to principles of the invention. A first member 1002 forms a substantially flat plate corresponding to an upper member of a Sarrus linkage, the balance of which is omitted for clarity. This first member 1002 serves as a driven input for the balance of the linkage subsystem. In the illustrated embodiment, it would be substantially fixedly coupled to a mechanical power source, e.g., a moving coil like voice coil 904 described above.

A second member serves as a link ground member 1004. Member 1004 would, in an exemplary embodiment, be substantially fixed in space with respect to, e.g., the magnet portion of the voice coil 904 and, typically, a case of a broader system such as a consumer electronic device. During operation of the haptic actuator, there is relative motion between first member 1002 and linkage ground member 1004. This motion is substantially perpendicular to the visible planes of both the first member 1002 and the linkage ground member 1004 (i.e., out of the paper). As discussed above, this perpendicular relationship is maintained by the characteristics of the Sarrus linkage.

A third transmission link member 1006 is mutually coupled between first member 1002 and linkage ground member 1004 through a fourth input member 1008. Accordingly, transmission link member 1006 is pivotally coupled at a first pivot point 1010 to first member 1002 and at a second pivot point 1012 to fourth input member 1008. Fourth input member 1008 is also coupled to link ground member 1004 at a further pivot point 1014 and, adjacent an opposite end thereof to a further link member 1016 at a further pivot point 1018. Link member 1016 is further coupled at a further pivot point 1020 to a proximal end of a still further link member 1022.

Link member 1022 is (or is coupled to) an inertial mass portion and is also pivotally coupled to a further link member 1024 at a pivot point 1028. An opposite end of link member 1024 is pivotally coupled at a pivot point 1030 to a distal end of a further link member 1032.

A proximal end of link member 1032 is pivotally coupled at pivot point 1034 to the ground link member 1004. In addition, link member 1032 is pivotally coupled to link member 1016 at a mutual intermediate pivot point 1036 (obscured).

Figure 10B:
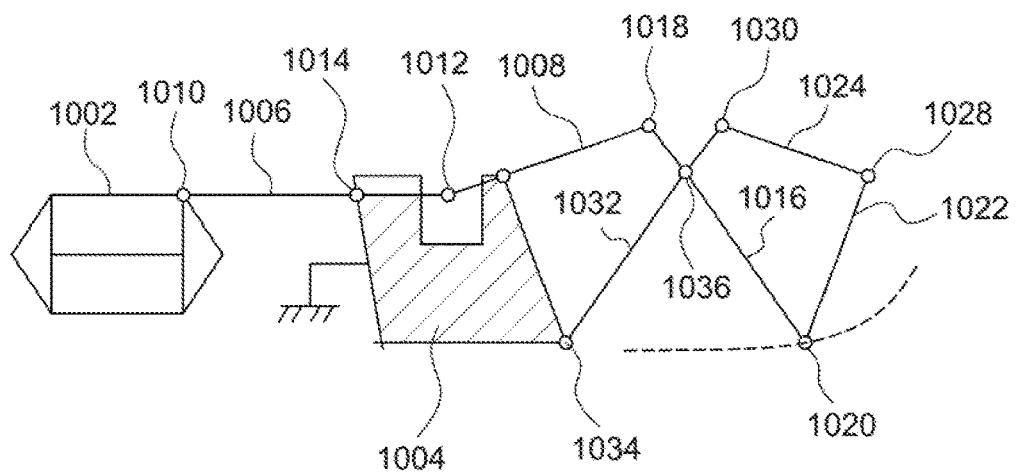
FIG. 10B shows, in mechanical schematic view, a portion of haptic actuator prepared according to principles of the invention.

FIG. 10B illustrates the same structure as FIG. 10A in mechanical link schematic form using identical element numerals. It is noted that pivot point 1012 in FIG. 10B appears to be placed in tension by normal operation. As will be evident to one of skill in the art in view of FIG. 10A, this is merely an artifact of the schematic representation and is readily avoided in practice.

A haptic actuator, according to principles of the invention requires the effective and repeated interaction of small components. As such, it is well adapted to being manufactured employing a novel manufacturing technology known as μMECS™.

The μMECS™ manufacturing technology has been described in detail in PCT patent application number PCT/US 2014/018096 with an international filing date of Feb. 24, 2013, the disclosure of which is incorporated herewith in its entirety. As disclosed in that application and described here, the μMECS™ process allows the preparation of complex passive and active mechanical, electromechanical, and optical components, among others, by laminating patterned layers of more or less flexible and more or less rigid materials in an integrated assembly.

Figure 11:
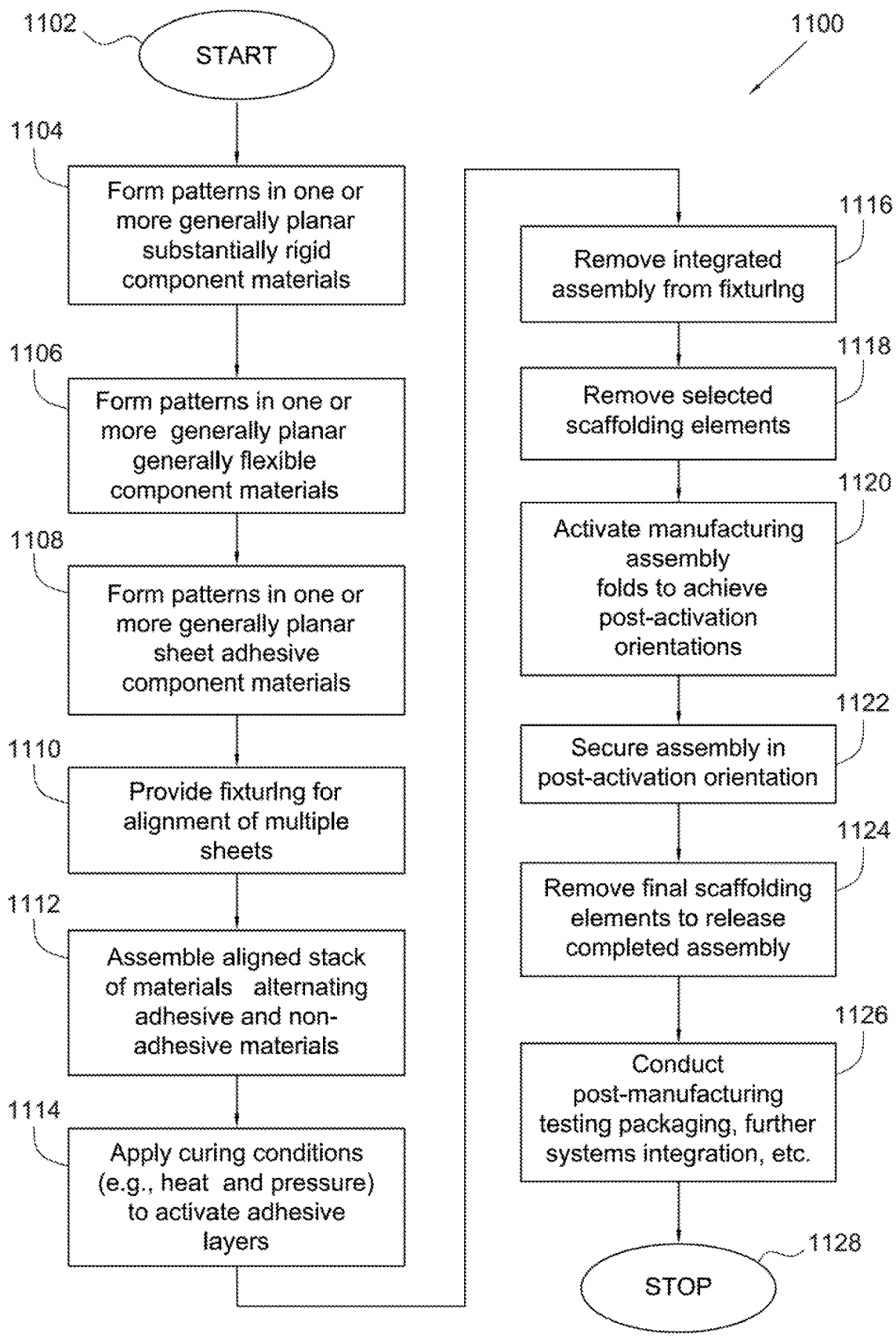
FIG. 11 shows, in flow diagram form, a manufacturing process for preparing a haptic actuator according to principles of the invention.

FIG. 11 shows a block diagram corresponding to the steps of an exemplary manufacturing process 1100 that can be employed to form a device according to principles of the invention. Beginning at step 1102, the process involves forming 1104 a pattern in one or more generally planar sheets of a more or less rigid material. In a typical application, at least one of the sheets will be substantially rigid. In certain applications, the generally rigid material may have an anisotropic characteristic such that it is more or less rigid along one axis than along another.

In various applications, the sheet will include a material such as, for example, fiberglass reinforced polyester, carbon reinforced polyester, or any other filled or reinforced polymer material. Alternately or in combination, the generally rigid material may include a metallic material such as any appropriate metal or metallic alloy. The forming of a pattern in such a sheet of material will include, in certain exemplary applications, the removal of material by photolithographic etching, the removal of material by laser machining, patterning of the material by the application of a die and/or the removal of material by the application of a cutting tool. In addition, additive processes may be used in forming the patterned sheet.

At step 1106, a pattern is formed in one or more sheets of a generally planar flexible component material. In various applications, the generally flexible material may be substantially flexible. In certain applications, the flexible material may have an anisotropic characteristic such that it is more or less flexible along one axis than along another. Patterning of the generally flexible material will proceed in any manner appropriate to the material including, among others, any of the processes identified above with respect to the rigid material.

At step 1108, a pattern is formed in one or more sheets of an adhesive component material. In various cases, the adhesive material may be substantially flexible. In other cases, the adhesive material will be substantially rigid. In certain cases, the adhesive material may have an anisotropic characteristic such that it is more or less flexible or rigid along one axis than along another. Patterning of the adhesive material will proceed in any manner appropriate to the adhesive material including, among others, any of the processes identified above with respect to the rigid and flexible materials.

As indicated at step 1110, fixturing apparatus is provided for alignment of the various sheets of rigid, flexible and adhesive material prepared in steps 1104-1108. In certain embodiments, the fixturing apparatus will include alignment pins such as are known in the art. In other embodiments the fixturing apparatus will include active alignment actuators and/or optical alignment devices.

As indicated in step 1112, an assembly is thereafter prepared by applying the previously prepared and patterned (and in some cases unpatterned sheets of material) to the fixturing apparatus. It will be appreciated that the patterns and materials will, in certain embodiments, differ from sheet to sheet according to the requirements of a particular application. Moreover, in certain cases, one or more sheets of adhesive material may be omitted in favor of applying adhesive to individual sheets and/or surface regions. The adhesive material will be applied, in any manner that is known, or becomes known, in the art. By way of example only, the adhesive material may be applied in liquid, powder, aerosol or gaseous form as individual sheets are added to the assembly.

As will be understood by one of ordinary skill in the art in light of the totality of the current presentation, the characteristics of the various layers and patterns will be chosen and applied according to the requirements of a particular assembly being prepared. Thus, for example, where a joint feature is required, a prepared void in substantially rigid sheets above and below a flexible layer will leave a portion of an intervening flexible layer exposed and ultimately able to flexibly support the adjacent more rigid materials.

As indicated in step 1114, curing conditions are then applied to the assembled materials and/or fixturing apparatus. In certain embodiments, the curing conditions will include the application of heat and/or pressure to the assembly of layers. In other embodiments, the curing conditions will include the application of physical or chemical additives such as, for example, catalytic chemicals, reduced temperatures, gaseous chemical components, or any other condition appropriate to secure a desirable unification of the various layers into an integrated assembly.

As per step 1116, the integrated assembly is, in certain embodiments, then removed from the fixturing apparatus. In some embodiments the integrated assembly is transferred thereafter to additional fixturing equipment. In other embodiments, and as will be understood by one of skill in the art, the integrated assembly remains on the fixturing apparatus for further processing.

In step 1118, a method according to certain embodiments of the invention will include the removal of certain portions of one or more of the rigid and/or flexible layers. These portions ("referred to as scaffolding") will have served to support particular regions of the corresponding layer during the preceding processing steps. Their removal will allow one or more of the remaining portions to translate, rotate, or otherwise reorient with respect to some additional portion of the assembly. This step may include the removal of individual assemblies from a larger sheet/assembly on which multiple assemblies of similar or different configurations have been prepared.

In certain embodiments, the removal of particular support regions will be effected by laser machining. In various other embodiments, the removal of support regions will be effected by mechanical machining, wet chemical etching, chemical vapor etching, scribing, cutting, die cutting, punching, and/or tearing, among others. One of skill in the art will appreciate that any combination of these methods (or other methods that are known or become known in the art) will be beneficially applied and will fall within the scope of the invention.

Once the removal of identified portions of the one or more rigid and/or flexible layers is complete, the assembly is activated, as per step 1120 to transition from its existing status to a post-activation configuration. This activation will, in certain embodiments, include reorientation of certain portions of one or more regions of one or more of the sheets of material. Thus, for example, in certain embodiments, a portion of the assembly will fold up out of its initial plane to form a three-dimensional assembly in the manner of a pop-up book.

The activation will incorporate various motions in corresponding embodiments of the invention including various translations and rotations along and about one or more axes. In respective embodiments, the activation will be effected by active fixturing apparatus, by the action of an individual worker, by a robotic device, by a device integrated within the assembly itself such as, for example, a spring, a motor, a piezoelectric actuator, a bimetal/bimorph device, a magnetic actuator, electromagnetic actuator, a thermal expansive or contractive device, chemical reaction including, for example, a gas generating process, a crystallization process, a dehydration process, a polymerization process, or any other processor device appropriate to the requirements of a particular application.

In certain embodiments, and as indicated at step 1122, a further process step will secure the apparatus in its activated configuration. Among other methods that will be evident to one of skill in the art in light of the present disclosure, this step of securing the apparatus in its activated configuration will include, in certain embodiments, point soldering, wave soldering, tip soldering, reflow soldering, wire bonding, electrical welding, laser welding, ultrasonic welding, thermal bonding, chemical adhesive bonding, the activation of a ratchet and pawl device, the activation of a helical unidirectional gripping device, the application of a snap, a hook and loop fastener, a rivet, or any other fastener or fastening method that is known or becomes known to those of skill in the art.

Of course it will be understood by the reader that in certain embodiments, the process or mechanism that reorients the apparatus into its activated configuration will serve to maintain that configuration without any additional step 1122 process or action. Moreover, while the securing indicated at step 1122 is generally anticipated to be permanent, in certain applications it will be beneficially temporary and/or repeatable.

At step 1124 additional scaffolding elements will be removed or severed to release the activated device and separate it from any remaining scaffolding. One of skill in the art will appreciate that this step will be unnecessary where the device was completely released from any associated scaffolding prior to activation. Moreover, in other embodiments and applications the activated device will remain coupled to surrounding scaffolding for additional processing steps. To the extent that step 1124 is applied, any of the approaches and methodologies identified above at, for example, step 1118 will be advantageously applied according to the instant circumstances.

Thereafter, again depending on the requirements of a particular apparatus or embodiment, various testing, packaging, systems integration and other manufacturing or application steps will be applied as indicated in step 1126 after which the operation concludes with step 1128.

Figure 12A:
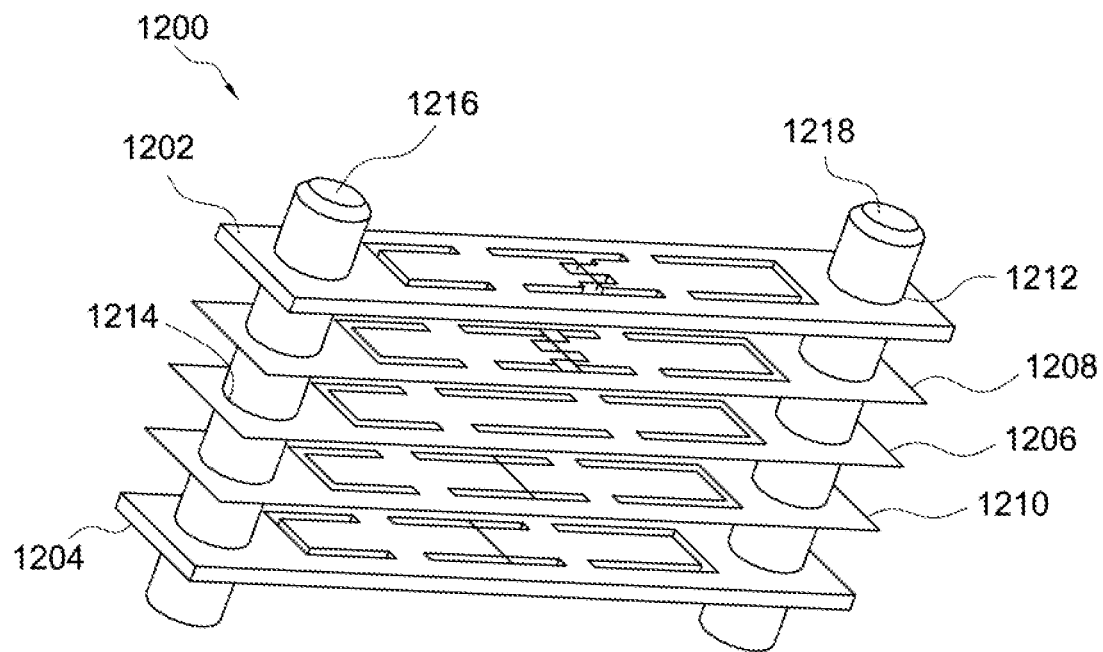
FIG. 12A shows, in schematic perspective view, a portion of a manufacturing process adaptable for preparing a haptic actuator according to principles of the invention.

FIG. 12A shows certain elements 1200 of an assembly consistent with, for example, process 1100. The elements include a first patterned substantially rigid layer 1202, a second patterned substantially rigid layer 1204, a patterned substantially flexible layer 1206, and first 1208 and second 1210 patterned adhesive layers.

As shown, the pattern of each exemplary layer includes apertures, e.g., 1212, 1214 for receiving corresponding fixturing pins or dowels, e.g., 1216, 1218. These fixturing dowels serve to maintain a desirable alignment of the various patterns while the assembly is compressed and curing of the adhesive layers 1208, 1210 is accomplished. It will be appreciated that other alignment methods and technologies (e.g., optical alignment) will also be used in certain applications and embodiments of the invention.

Figure 12B:
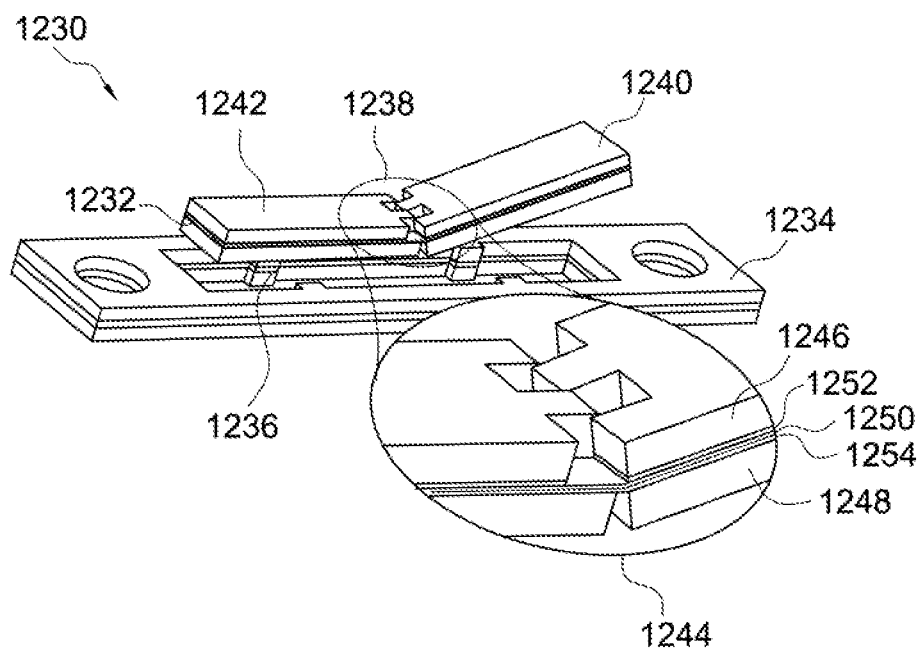
FIG. 12B shows, in schematic perspective view, an exemplary device prepared according to a manufacturing process adaptable for preparing a haptic actuator according to principles of the invention.

The result, as shown 1230 in FIG. 12B is an exemplary hinged assembly 1232 that has been released from a surrounding scaffolding material 1234 by the severing of various support regions, e.g., 1236. As is readily apparent, the released assembly includes a hinge feature 1238 coupled between first 1240 and second 1242 substantially rigid members. As further shown in the magnified region 1244, each substantially rigid member includes an upper rigid portion 1246 and a lower rigid portion 1248 coupled to respective sides of the flexible portion 1250 by respective layers of cured, or otherwise activated, adhesive material 1252, 1254. It will be further appreciated that, while no securing step is apparent in relation to the hinged assembly 1232, other assemblies will benefit from such further processing.

Having described in some detail the µMECS™ manufacturing process, it is worth noting that the foregoing descriptions of various embodiments of a haptic actuator according to principles of the invention should not be considered in any way limiting. Other novel configurations of actuator are contemplated, and are described as follows.

In one such embodiment is shown in FIG. 13 a magnetic field is created in a narrow, transverse air gap 1302 of a haptic actuator device 1304 by a stationary, thin permanent magnet 1306, 1308 and a closed-circuit, magnetically-soft structure 1310. A plane, current-carrying coil 1312 is immersed in the magnetic field and constrained to move in a transverse, linear trajectory 1314. Because the current in the coil has a return path with equal current density and opposing direction, the magnetic field direction in half of the air gap must be reversed in order to ensure that the net force on the coil is in one direction.

Flexure-based mechanisms and linkages are used to maintain the linear trajectory, as well as to suspend the coil in the air gap and prevent it from contacting the interior of the surrounding structure. Actuation output is taken from the moving slider element on which the coil is mounted. The slider is also attached to the flexure linkage. By ensuring that the flexural elements have good off-axis stiffness, the coil can maintain constant distance from the air gap interior by orienting the rotation axes of the mechanism normal to the plane of the device. Mechanical springs are attached to the slider and grounded to the device structure to increase the resonant frequency of the actuator. Electrical connections to the coil can be through electrically conductive springs. Alternatively, electrical connection can be achieved through flexible cables to the coil slider assembly.

Figure 14:
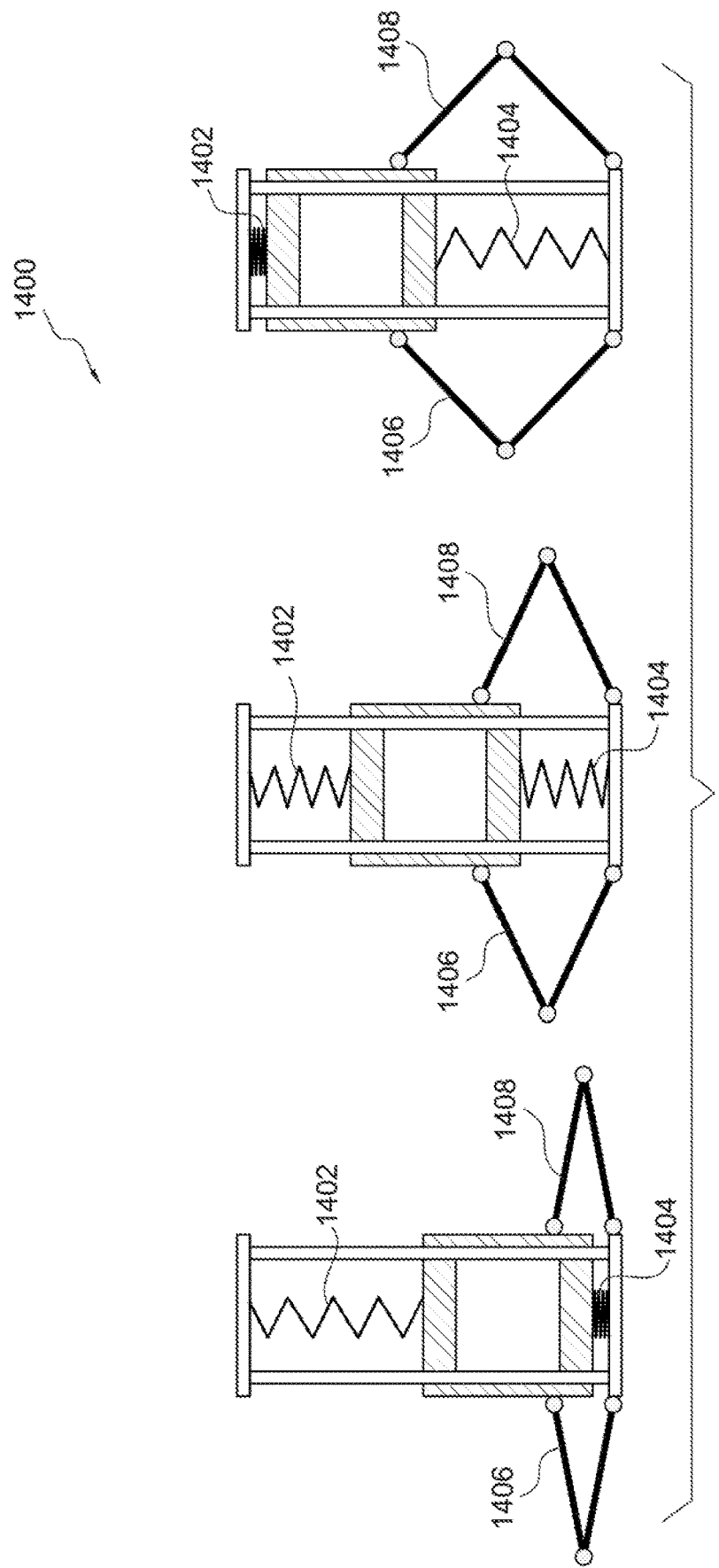
FIG. 14 shows a schematic representation of instantaneous states of a linear resonant actuator prepared according to principles of the invention.

As shown in FIG. 14, a further embodiment 1400 is similar to the linear actuator except the trajectory of the moving coil is constrained to an arc segment. The coil and magnet would ideally also be reshaped into arc-like segments to improve energy density of the device. The mechanical springs 1402, 1404 would also be reshaped to provide equivalent torsional stiffness around the slider's axis of rotation. Flexure-based mechanisms 1406, 1408 serve as the kinematic constraints on the slider's motion.

In still further embodiments it will be possible to construct the coil slider in the linear actuator using high density material or adding bulk to the moving slider element, the motion of the slider will generate larger vibrations in the device. Alternately, by constructing the coil slider in the rotary actuator using high density material or adding bulk to the moving slider element, the motion of the slider will generate larger vibrations in the device.

In another approach, the coil slider motion of either the linear or rotary actuators can serve as input to a linkage or mechanism that has a mechanical advantage or amplifies the motion to increase acceleration on a larger vibrating mass and generate larger vibrations. In its simplest form, the rotation axis of the rotary actuator acts as the fulcrum of a simple lever—the distance from the coil to fulcrum is the effort arm—and a larger vibrating mass is attached to the output of the lever. If the mass is attached to the lever on the same side of the fulcrum as the coil, the mass of the coil contributes to the total vibrating mass in the device. The output motion of the linear actuator can also serve as input to a lever mechanism, resulting in rotary motion of a larger vibrating mass.

A piezoelectric actuator drives a simple lever mechanism that amplifies the motion of the actuator output, resulting in a large output sweep angle for a large, rotating, and moving mass. The piezoelectric actuator just has to provide a high force, low displacement input to the mechanism.

Two rotary vibrating masses, either coupled to a single linear actuator or decoupled and driven with two separate actuators (linear or rotary, piezoelectric or electromagnetic), moving in-plane and driven in phase can provide a strong vibration amplitude in one direction while cancelling out vibrations in another direction due to symmetry of the moving masses, effectively creating a unidirectional vibration motor. If decoupled with two separate actuators and driven out of phase, the moving masses can also generate torques.

A linkage can be added to augment to the trajectory of vibration mass that would otherwise stay in plane. The centripetal force required to bring the moving mass out of plane would generate out-of-plane vibrations.

Figure 15D:
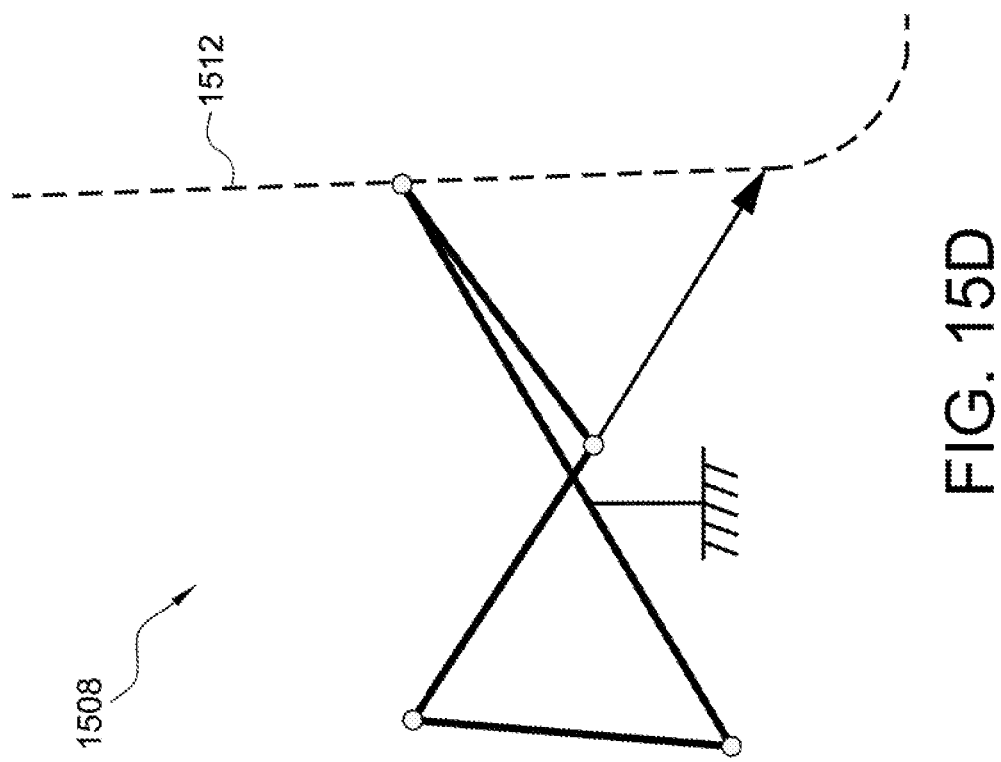
FIG. 15D shows, in mechanical schematic form, a portion of a haptic actuator prepared according to principles of the invention including an Evans mechanism in a fourth instantaneous state.

In a further aspect, a haptic actuator according to principles of the invention can be prepared including an Evans mechanism configuration of links. FIGS. 15 A-E show various instantaneous states 1502-1510 of the Evans mechanism as it traverses a J-shaped pathway 1512. A first link of the Evans mechanism linkage corresponds to a ground link 1514 of the mechanism and serves to locate first 1516 and second 1518 pivotal joints of the mechanism in substantially fixed relation to one another. Further links 1520, 1522 and 1524 are mobile with respect to the ground link 1514. Link 1520 is disposed between pivotal joint 1516 and a further pivotal joint 1526. Pivotal joint 1526 couples a proximal end of link 1522 to a corresponding end of link 1520. A further pivotal joint 1528 is disposed at an intermediate location between the ends of link 1522. Link 1524 is disposed between this pivotal joint 1528 and previously identified pivotal joint 1518. A distal end 1530 of link 1522 traverses J-shaped pathway 1512 in oscillatory fashion as links 1520 and 1524 pivot 1532, 1534 about pivotal joints 1516 and 1518 respectively.

In light of the foregoing disclosure, it will be clear that the J-shaped pathway (or trajectory) can be applied to produce a "tap" according to principles of the invention. In particular, it will be understood that an Evans mechanism, as illustrated, can be employed in conjunction with a further symmetrically opposed Evans mechanism (not shown) where the two Evans mechanisms are substantially rigidly coupled at respective ground links 1514. Consequently, the acceleration of respective masses located at respective ends 1530 of links 1522 of the two Evans mechanisms will result in opposing forces so as to minimize overall acceleration of the mutual ground links 1514 during the linear portion of the J-trajectory 1512, whereas ground links 1514 will be accelerated in opposition to the moving masses during the respective arcuate portions of the J-shaped trajectories.

It will be understood that other trajectories beside J-shaped trajectories will also be beneficially employed in corresponding embodiments of the invention.

Figure 16:
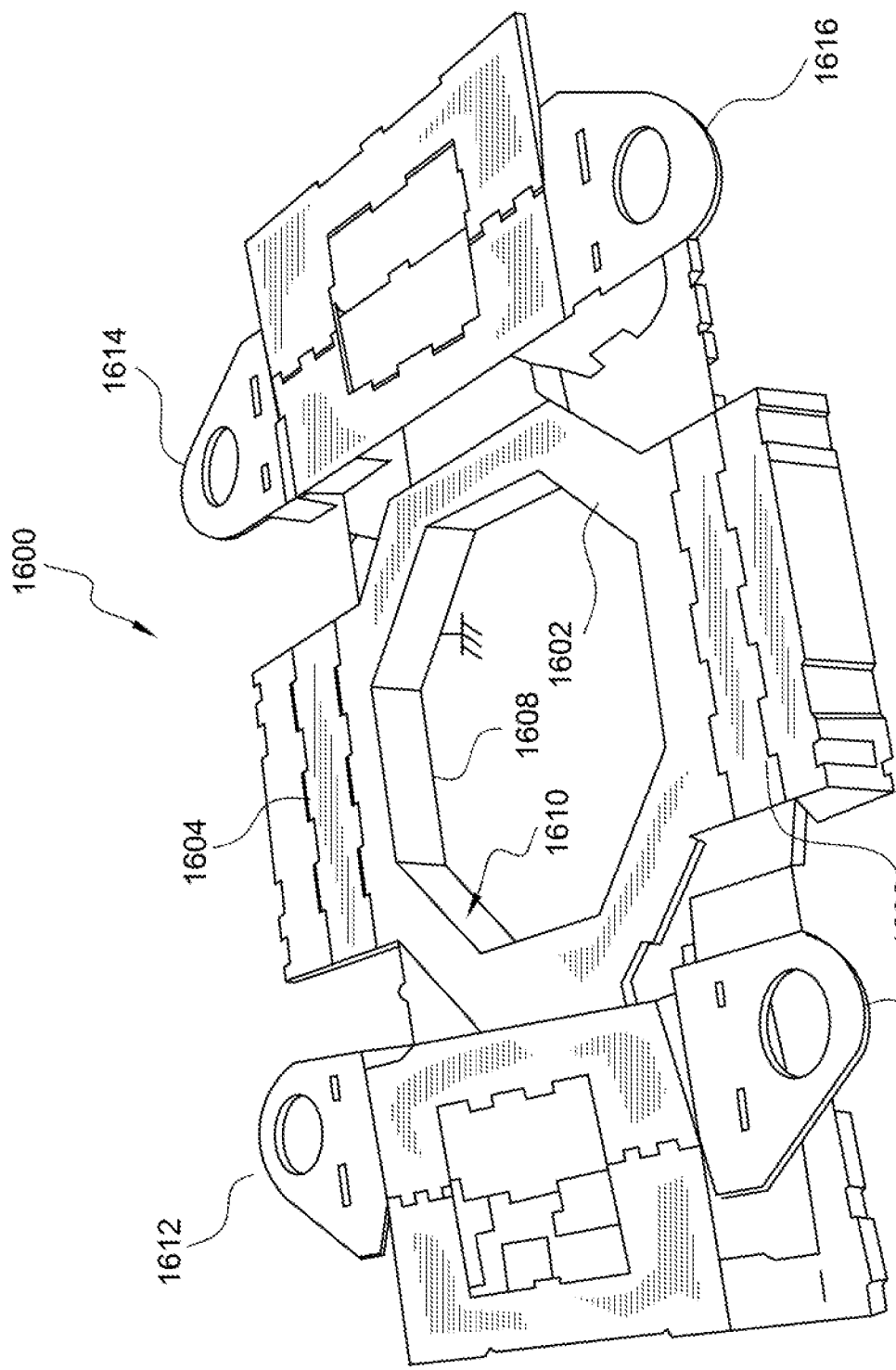
FIG. 16 shows, in perspective view, a portion of a prototype model of a haptic actuator prepared according to principles of the invention.

FIG. 16 shows, in perspective view, a portion of a prototype model of a haptic actuator 1600 prepared according to principles of the present invention. It will be understood that the prototype model includes two Evans mechanism linkages mutually coupled to a common ground member and arranged to provide respective substantially opposed J-trajectory portions along with respective arcuate portions that together tend to act in concert to accelerate the common ground member. Actuator 1600 includes an input member 1602 disposed between supporting Sarrus hinges 1604, 1606.

A further member 1608 defines a mechanical ground. One of skill in the art will appreciate that the input member 1602 and the ground member 1608 define a region therebetween 1610 into which may be disposed and actuating device such as, for example, a voice coil actuator. In the actuating device (not shown) will be coupled, in certain embodiments, at a first end to the ground member 1608, and at a second end to the input member 1602. Actuation of the actuating device will thus result in a relative substantially linear motion between the input member 1602 and the ground member 1608.

Output members 1612, 1614, 1616, and 1618 are provided for coupling to respective inertial masses (not shown). As will be understood in light of the foregoing description, in certain embodiments, a single inertial mass will be mutually coupled between output member 1612 and 1618. Likewise, a single inertial mass will be coupled between output members 1614 and 1616. Accordingly, the two output masses will be motivated by operation of the actuating device between members 1602 and 1608 to follow opposed "J" trajectories with a mutual pivot at the end of the J into a common direction.

Figure 17:
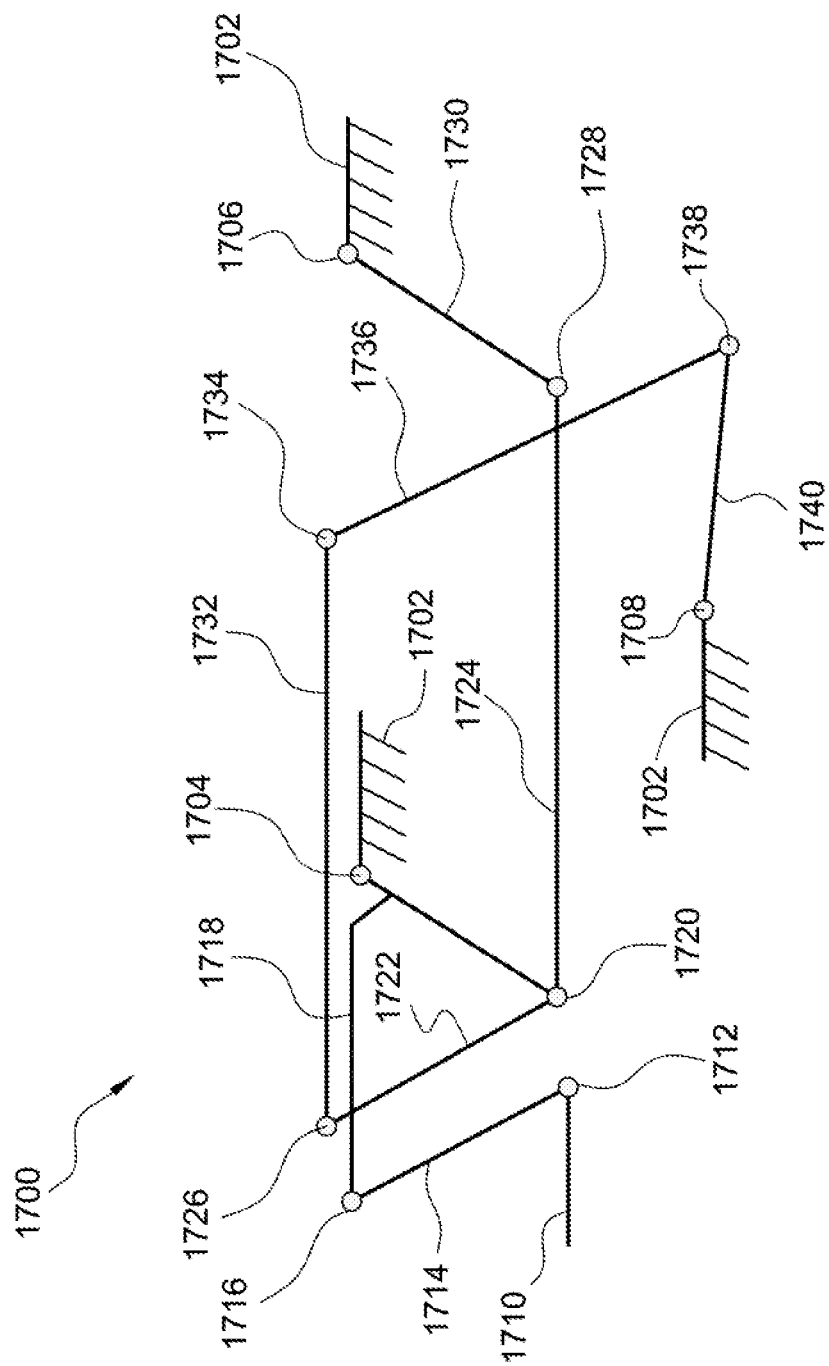
FIG. 17 shows, in mechanical schematic form, a portion of a haptic actuator, including dual Evans mechanisms, prepared according to principles of the invention.

FIG. 17 shows, in mechanical schematic linkage view, a further haptic actuator 1700 prepared according to principles of the invention. The actuator 1700 employs dual Evans mechanisms, and defines a mechanical ground 1702 pivotally coupled to the mechanism at three pivotal hinges 1704, 1706 and 1708. An input member 1710 is coupled to a pivotal hinge 1712 which is coupled to a first end of a substantially rigid intermediate member 1714. Member 1714 is coupled at a second end to a further pivotal hinge 1716. Pivotal hinge 1716 is coupled to a first end of a further substantially rigid member 1718. Substantially rigid member 1718 is coupled at an intermediate point to pivotal hinge 1704, and at its opposite end to a further pivotal hinge 1720. Pivotal hinge 1720 is also coupled to two further substantially rigid members 1722 and 1724.

At a further end of substantially rigid member 1722, is disposed another pivotal hinge 1726. Coupled at a far end of substantially rigid member 1724 (from pivotal hinge 1720) is a further pivotal hinge 1728, and, thereafter, a further substantially rigid member 1730. Substantially rigid member 1730 is, at its far end, coupled to hinge 1706. Likewise, coupled in series between pivotal hinge 1726 and pivotal hinge 1708 are a further substantially rigid member 1732 another pivotal hinge 1734, a further substantially rigid member 1736, another pivotal hinge 1738 and still another substantially rigid member 1740. One of skill in the art will appreciate that the application of a linear input force and motion at member 1710 will result in an output motion along a J trajectory of substantially rigid member 1732.

Figure 18:
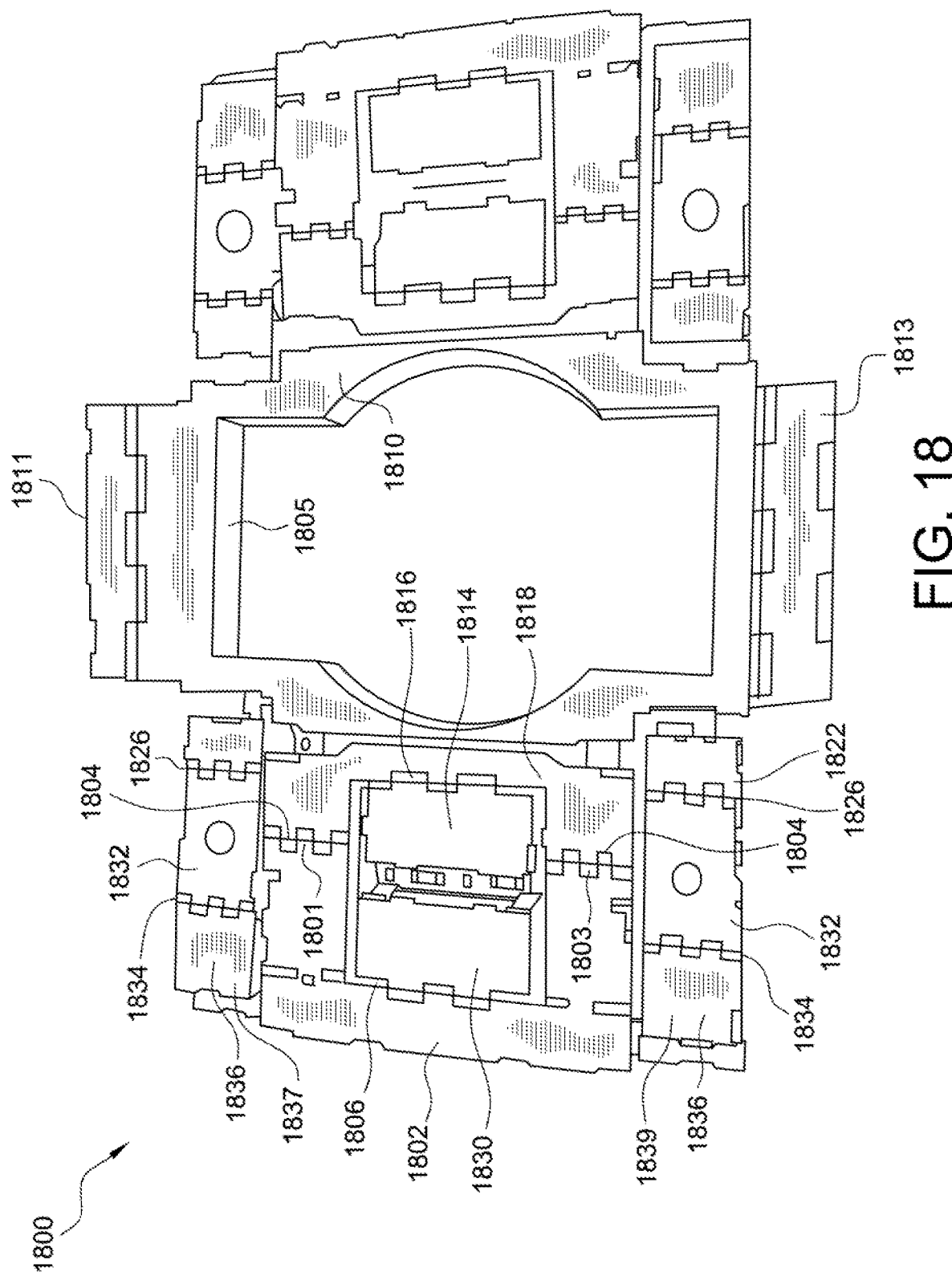
FIG. 18 shows, in perspective view, a portion of a prototype model of a haptic actuator including dual Evans mechanisms, prepared according to principles of the invention.

FIG. 18 shows, in perspective view, a portion of a haptic actuator 1800 prepared according to principles of the invention. As further described below, actuator 1800 includes linkages similar to those presented with respect to haptic actuator 1700 above. Accordingly, mechanical ground 1702 in FIG. 17 corresponds to member 1802, and to member 1805 (member 1805 being fixedly coupled to member 1802, all of these being mechanical ground regions of the actuator 1800). Hinge 1704, of actuator 1700, corresponds to hinge 1804 of actuator 1800. It will be noted that hinge 1804 consists of two parts 1801, 1803, both having a common axis and operation.

The hinge corresponding to hinge 1708 of actuator 1700 is not visible in FIG. 18. In particular, one of skill in the art will appreciate that the hinge of actuator 1800 corresponding to hinge 1708, being coupled to member 1805, is on the opposite side of the apparatus from the viewer as pictured. The input member 1710 of actuator 1700 corresponds to input member 1810 of actuator 1800. Accordingly, a spatial region is defined between member 1805 and member 1810 within which actuating apparatus may be disposed. For example, a voice coil will be disposed, in certain embodiments, with a first end coupled to member 1805, and a second end coupled to member 1810.

Causing linear reciprocal operation of the voice coil will tend to drive members 1805 and 1810 away from each other and back toward each other, and thereby activate the actuator 1800. One of skill in the art will observe that Sarrus joints 1811, 1813 are mutually coupled between members 1805 and 1810, serving to enforce parallelism of these two members throughout the cycle.

The hinge of actuator 1800 corresponding to hinge 1712 is not visible in FIG. 18, being located within the device and beneath member 1814. Hinge 1816, however, is visible and corresponds to hinge 1716 of actuator 1700. Likewise, member 1818 corresponds to member 1718 of actuator 1700. As previously noted, member 1818 is coupled at an intermediate point of member 1818 and at the back of the apparatus to a hinge (not visible) corresponding to hinge 1704.

Member 1832 of the actuator 1800 corresponds to member 1732 of actuator 1700. Below member 1832, and hence not visible as being within the apparatus, is a hinge corresponding to hinge 1720 of actuator 1700. This hinge is coupled between member 1818 and member 1822, which corresponds to member 1722 of actuator 1700.

At the other end of member 1822, is a further hinge 1826, which appears in two parts, and which corresponds to hinge 1726 of actuator 1700. It should be noted that member 1832 is repeated in two parts symmetrically across the device, and is an output member of the device. Accordingly, in operation, an inertial mass (not illustrated) is disposed in substantially fixed relation with respect to member 1832, and moves in conjunction with that member, with respect to the mechanical ground 1802. Moreover, in certain embodiments, the unity of the two portions of member 1832 is enforced by their mutual and substantially fixed coupling to a common and substantially rigid inertial mass.

Hinge 1834 also appears in two parts, and corresponds to hinge 1734 of actuator 1700. Hinge 1834 is coupled between member 1832 and member 1836, two portions of which are visible at locations 1837 and 1839. Member 1836 corresponds to member 1736 of actuator 1700.

A member corresponding to member 1724 of actuator 1700 is located within actuator 1800 and is not visible in FIG. 18. Likewise, hinge 1828 is located within actuator 1800 and is not visible in FIG. 18. Hinge 1806, corresponding to hinge 1706 of actuator 1700, is visible, however. Also visible, coupled to hinge 1806, is member 1830 which corresponds to member 1730 of actuator 1700.

The hinge corresponding to hinge 1738 and the member corresponding to member 1740 are both disposed at the rear of actuator 1800, and are hence not visible in the present figure. Nevertheless, one of skill in the art will appreciate that these hinges exist and form a doubly pivotal coupling between member 1836 and member 1805.

The left-right mirror symmetry of actuator 1800 will be evident to the reader, who will understand that corresponding elements are present on the opposite side of the device.

Accordingly, upon review of FIGS. 17 and 18 it will be apparent to one of skill in the art that just as actuator 1700 produces a J-shaped motion of member 1732 by the application of linear forces to and between members 1710 and 1702, so the application of linear forces between members 1805 and 1810 will produce a corresponding J-shaped motion of member 1832.

Figure 19B:
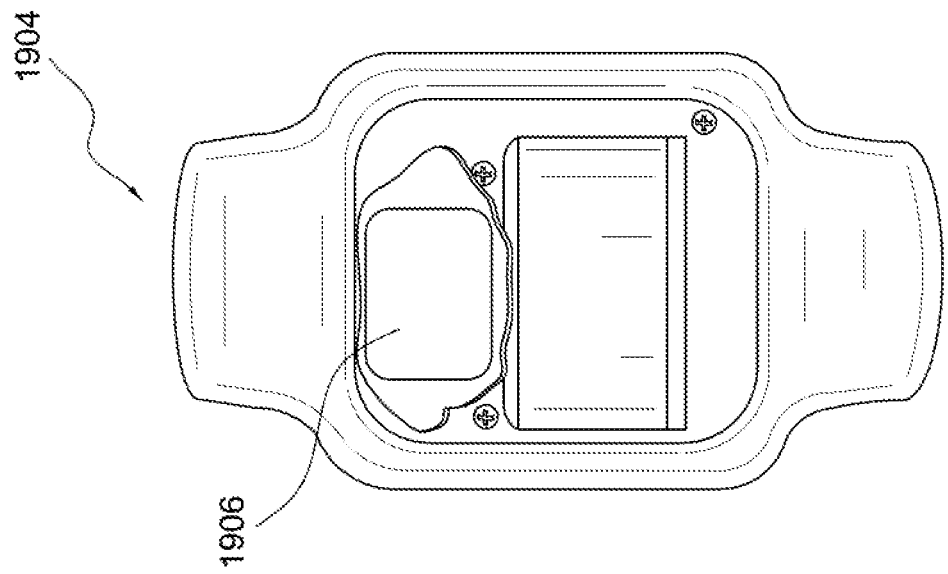
FIG. 19B shows, in cutaway view, a portion of a smart watch including a haptic actuator prepared according to principles of the invention.
Figure 19A:
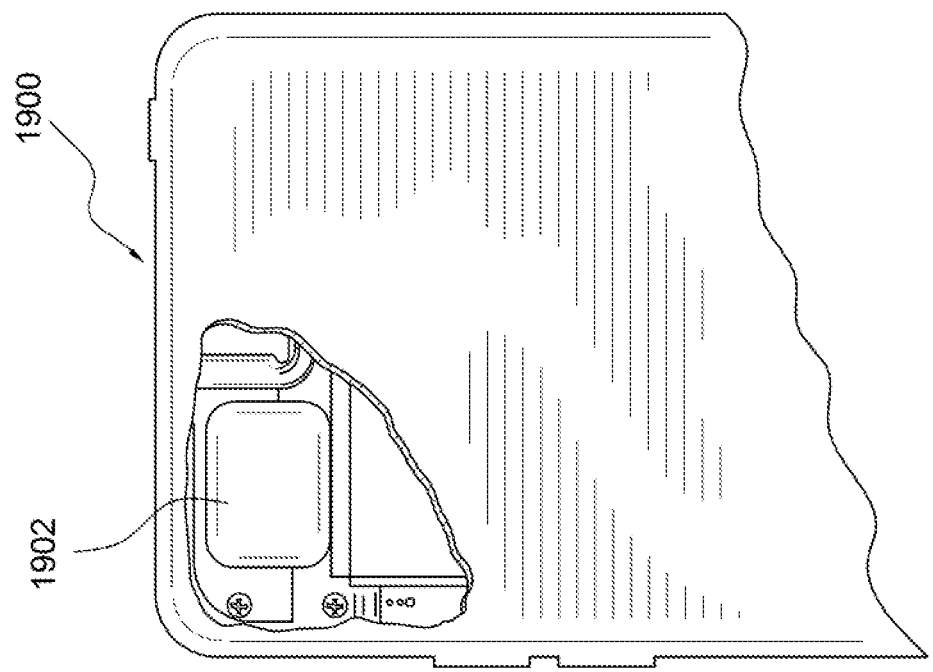
FIG. 19A shows, in cutaway view, a portion of a smart phone including a haptic actuator prepared according to principles of the invention.

FIG. 19A shows, in cutaway view, certain portions of a smart phone 1900 including a haptic actuator 1902 prepared according to principles of the invention. FIG. 19B shows, in cutaway view, certain portions of a smart watch 1904 including a haptic actuator 1906 prepared according to principles of the invention.

Figure 20:
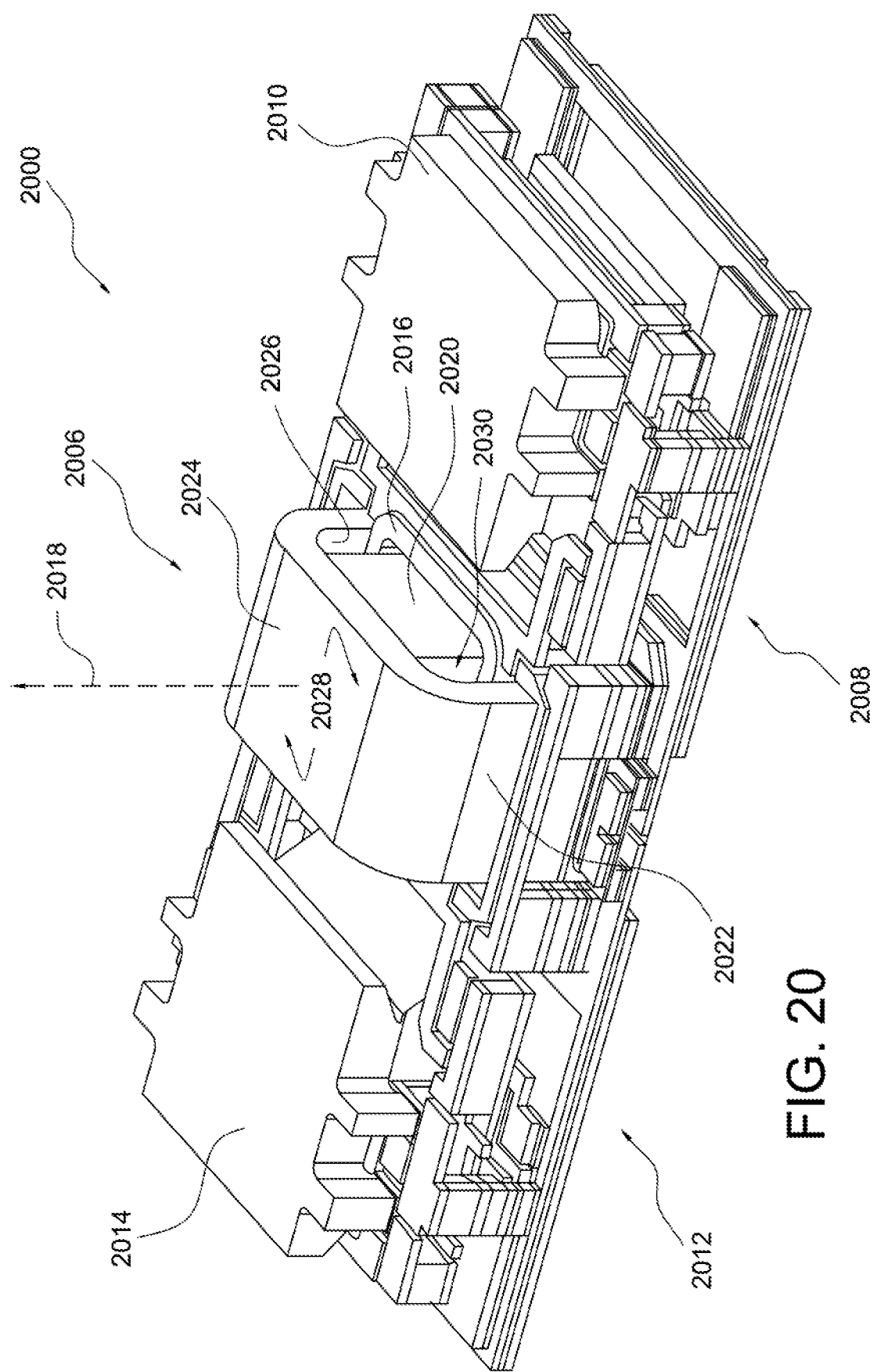
FIG. 20 shows, in perspective view, a portion of a further haptic actuator prepared according to principles of the invention.

With further reference now to FIG. 2, FIG. 20 shows, in perspective view, a portion of a further haptic actuator 2000, prepared according to principles of the invention. Haptic actuator 2000 includes, inter alia, a motor portion 2006. Motor portion 2006 is coupled through a first transmission portion 2008 to a first inertial mass 2010. Motor portion 2006 is also coupled through a second transmission portion 2012 to a second inertial mass 2014.

In the illustrated embodiment, the motor portion 2006 includes a linear motor apparatus having a movable armature coil 2016. The movable armature coil 2016 is arranged generally concentrically about a longitudinal axis 2018 of a stator element 2020. The apparatus is arranged such that, during operation of the haptic actuator 2000, the movable armature coil 2016 moves substantially linearly in a direction substantially parallel to longitudinal axis 2018.

A keeper element, 2022 includes an external surface region 2024 and an internal surface region 2026. A portion 2028 of external surface region 2024 is disposed substantially normal to longitudinal axis 2018. Internal surface region 2026 defines an internal spatial region 2030 of the keeper element 2022, within which is disposed, at least, respective portions of stator element 2020 and armature coil 2016.

In certain embodiments of the invention, stator element 2020 includes a permanent magnet. In some embodiments of the invention, the keeper element 2022 includes a permanent magnet. In other embodiments of the invention, one or both of the stator element 2020 and the keeper element 2022 exhibit negligible permanent magnetism.

In certain embodiments, one or more of the stator element 2020 and the keeper element 2022 will include a respective plurality of laminated sheets of magnetic material. In certain embodiments, the laminated sheets of magnetic material will include iron as an elementary metal and/or as a chemical compound. One of skill in the art will appreciate that, in certain embodiments, the keeper element 2022 will include a further portion (not visible in FIG. 20) such that the keeper element 2022 forms a substantially closed magnetic loop encircling the stator element 2020.

Figure 21:
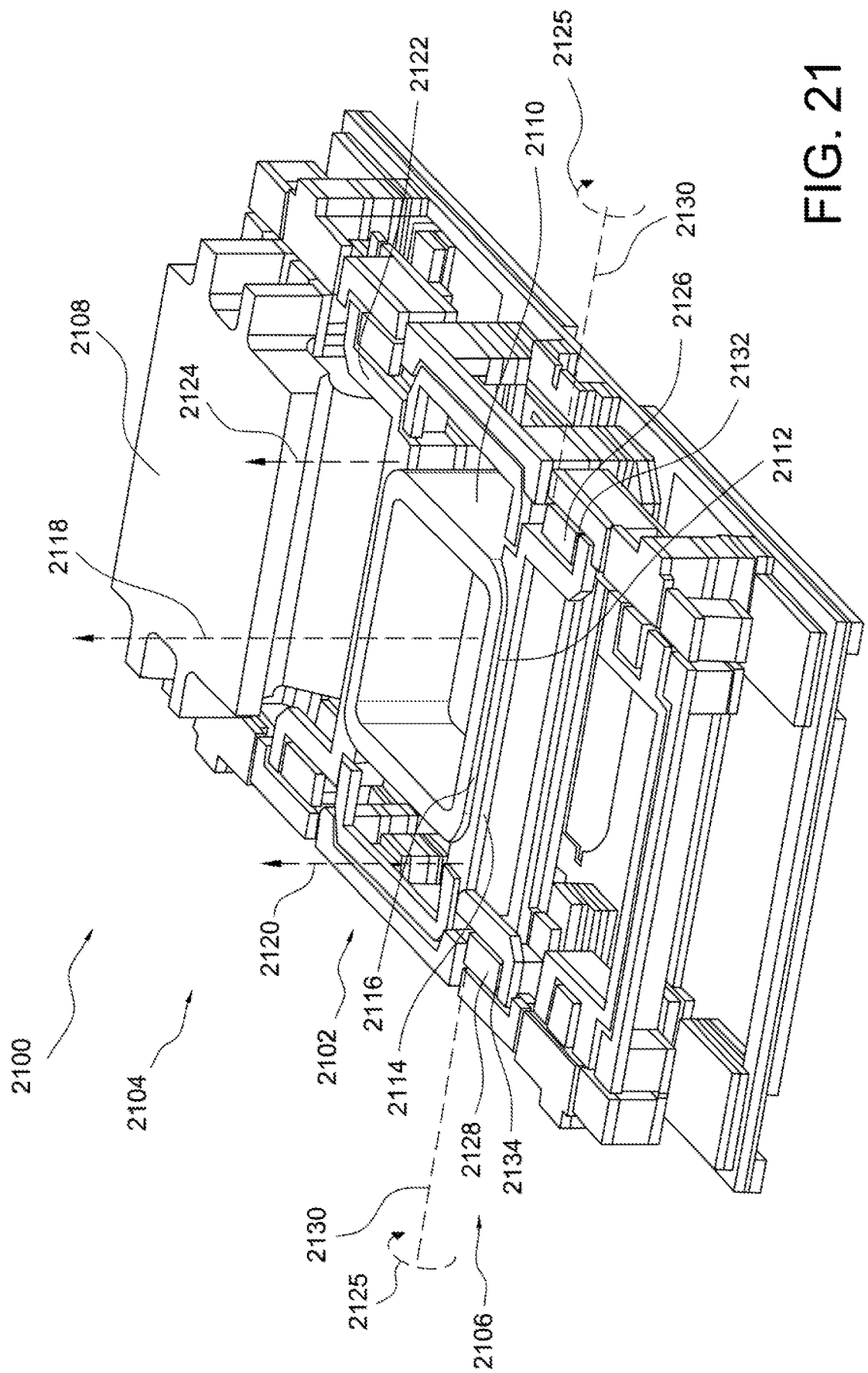
FIG. 21 shows, in perspective view, a portion of a further haptic actuator, prepared according to principles of the invention with elements omitted for clarity of presentation.

FIG. 21 shows a further aspect of a haptic actuator 2100 similar to that of FIG. 20. Like haptic actuator 2000, haptic actuator 2100 includes a motor portion 2102, a first transmission portion 2104 and a second transmission portion 2106. Certain elements of the motor portion are omitted for clarity of presentation: specifically the stator element and keeper element that would be present during operation are not shown. Also omitted is a second inertial mass which would be present in an operative unit. A first inertial mass is shown as element 2108.

An armature coil 2110 is shown. The omission of the second inertial mass allows an interface 2112 to be clearly visible where an input member 2114 of the second transmission portion 2106 is substantially fixedly coupled to an external surface region 2116 of the armature coil 2110.

Consistent with the description above, the armature coil 2110 is arranged and configured such that when an appropriate electrical current is passed through the armature coil 2110, a magnetic relationship between the armature coil 2110 and the stator element urges the armature coil to move substantially linearly along its longitudinal axis 2118.

Because of the mechanical coupling between the armature coil 2110 and the input member 2114 of the second transmission portion 2106 at interface 2112, the input member 2114 is urged through a substantially linear motion 2120 along a direction parallel to longitudinal axis 2118. Because of the symmetry of the assembly across longitudinal axis 2118, a corresponding input member 2122 of the first transmission portion 2104 is also simultaneously urged in a parallel direction 2124.

The substantially linear motion 2120 of input member 2114 is converted into a rotary motion 2125 common to further transmission portions 2126, 2128 about a mutual axis 2130 of portions 2126, 2128. This conversion is accomplished by a rotary coupling of input member 2114 to portions 2126, 2128 at respective flexible joints 2132, 2134. The nature of this linear to rotary conversion will be further clarified by the following description of a further embodiment as presented in FIGS. 22A-22B.

Figure 22A:
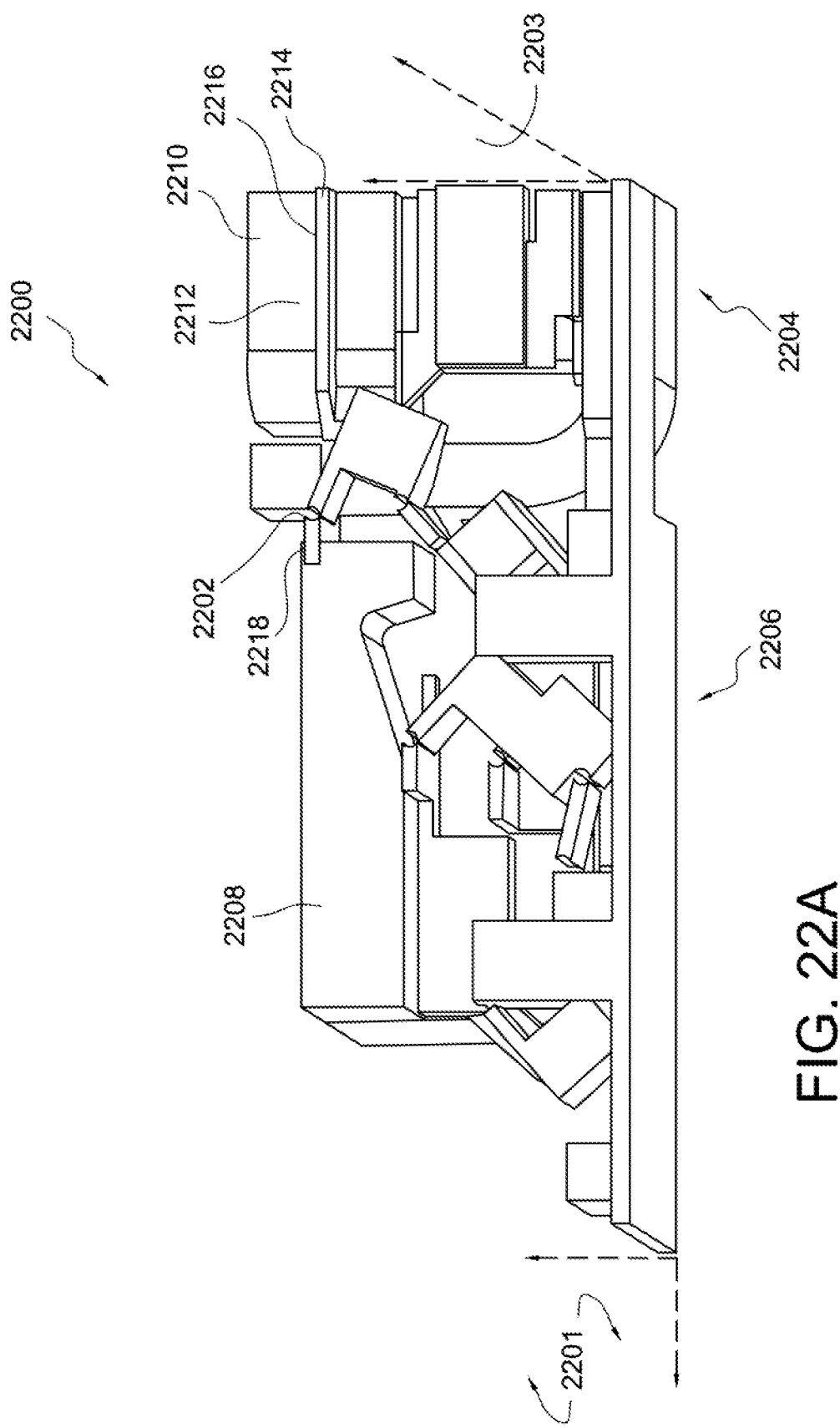
FIG. 22A shows, in perspective view, selected elements of a haptic actuator prepared according to principles of the invention.
Figure 22B:
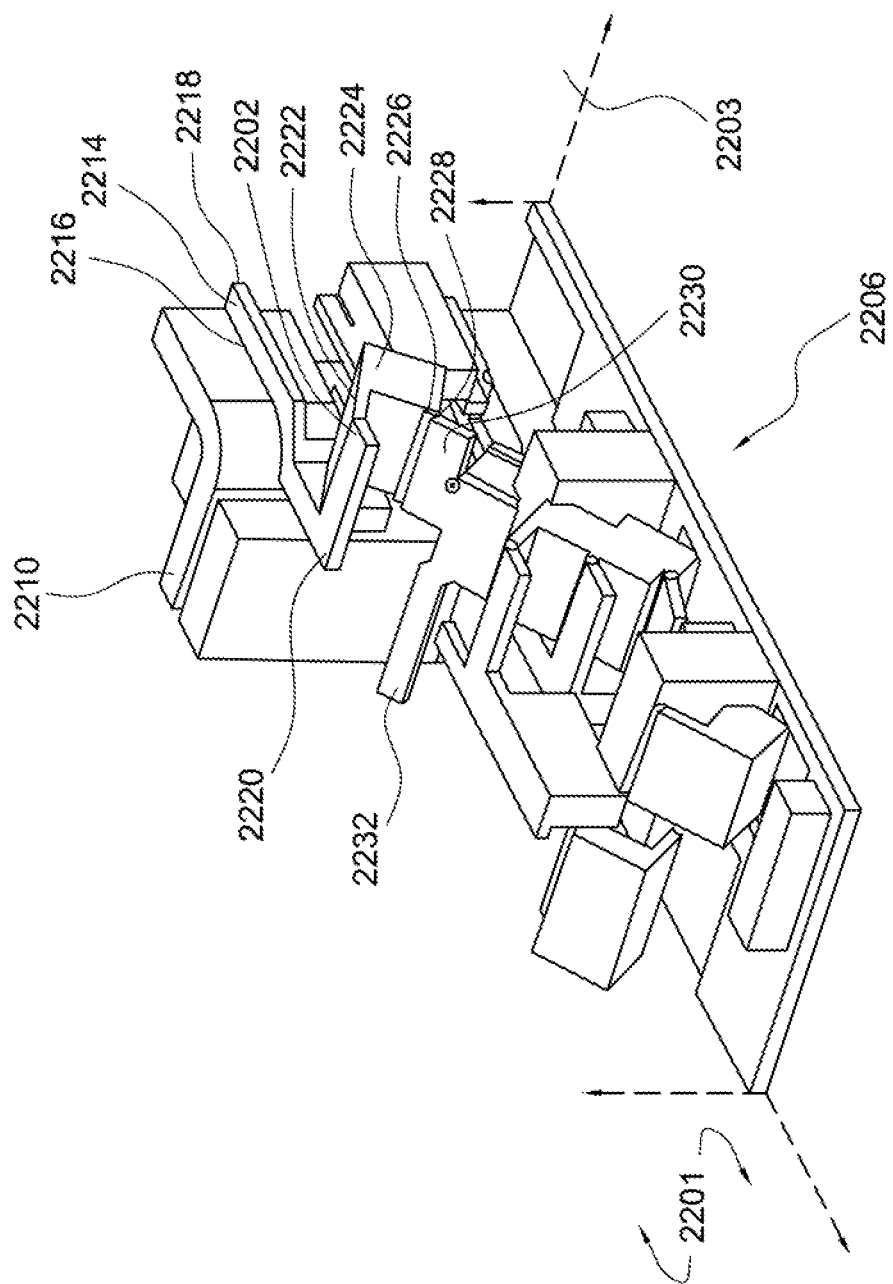
FIG. 22B shows, in perspective view, other aspects of the haptic actuator presented in FIG. 22A.

FIGS. 22A and 22B show alternative aspects of a portion of a further haptic actuator 2200, including a joint 2202 similar to flexible joints 2132 and 2134. Viewed in conjunction, FIGS. 22A and 22B offer a clear view of the structure and operation of the actuator 2200. It should be noted that FIGS. 22A and 22B represent a single quadrant of an apparatus that is mirror symmetric across both a longitudinal plane 2201 and a lateral plane 2203.

Referring first to FIG. 22A, haptic actuator 2200 includes a motor portion 2204, a transmission portion 2206, and an inertial mass 2208. The motor portion 2204 includes an armature coil 2210. An external surface region 2212 of armature coil 2210 is substantially fixedly coupled to a transmission input member 2214 at an interface 2216.

By presenting an elevated perspective of actuator 2200, FIG. 22B allows the reader to see the continuous extent of input member 2214 from interface 2216 at a first end 2218 proximal to the armature coil 2210 to a flexible joint 2202 adjacent a distal end 2220 of member 2214.

At the flexible joint 2202, the distal end 2220 of member 2214 is rotationally coupled to a first end 2222 of an intermediate member 2224 of transmission portion 2206. A further flexible joint 2226 couples a second end 2228 of intermediate member 2224 to a corresponding end 2230 of a further intermediate member 2232.

FIGS. 22C-22K show additional detail of haptic actuator 2200 of FIGS. 22A and 22B, including a further perspective view of the device structure, and a sequence of instantaneous states illustrating operation of the system during an exemplary portion of one cycle.

Figure 22C:
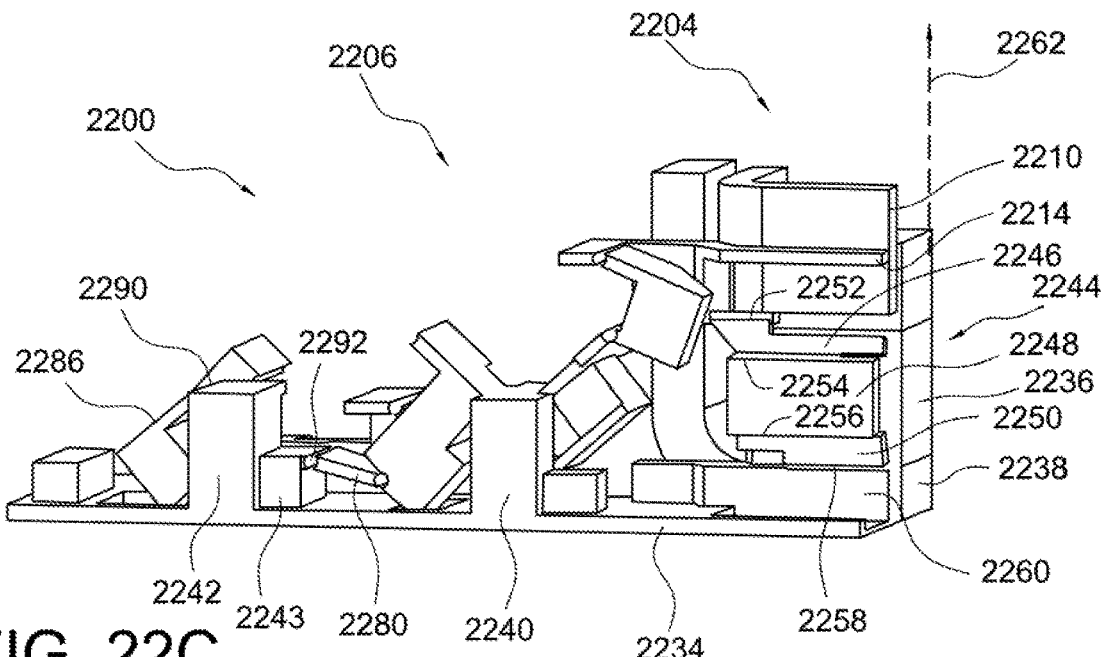
FIG. 22C shows, in perspective view, elements of haptic actuator of FIG. 22A in a respective exemplary instantaneous state of operation identifying the relationship of various components and their mutual interaction so as to illustrate aspects of a method according to principles of the invention.

FIG. 22C shows, in schematic perspective view, a portion of haptic actuator 2200. As discussed above, the actuator includes a motor portion 2204 and a transmission portion 2206. The motor portion includes an armature coil 2210 coupled to an input member 2214 of the transmission portion 2206. A base member, 2234 of the haptic actuator 2200 serves as a mechanical ground (i.e., as a positional reference point, or datum), for motions of the various elements of the actuator 2200.

A stator element 2236 of the motor portion 2204 is mechanically coupled through a keeper element 2238 of the motor portion 2204 to the base member 2234, so as to be substantially fixedly located with respect to the base member 2234.

The base member 2234 includes a first support column portion 2240 and a second support column portion 2242. As will be further discussed below, the support columns 2240, 2242 and 2243 provide mechanical support for certain elements of the transmission portion 2206.

The armature coil 2210 is movably coupled to the base member 2234 through a Sarrus mechanism assembly 2244. The Sarrus mechanism assembly 2244 includes first 2246, second 2248 and third 2250 substantially rigid members disposed between the base member 2234 and the armature coil 2210. The Sarrus mechanism assembly further includes four flexible joints 2252, 2254, 2256, 2258 disposed respectively between the armature coil 2210 the Sarrus mechanism members 2246, 2248, 2250 and a mounting portion 2260 the base member 2234.

The Sarrus mechanism assembly 2244 serves to maintain a substantially constant orientation of the armature coil 2210 with respect to the base member coaxial to a longitudinal axis 2262 of the motor portion 2204, while allowing the armature coil 2210 to oscillate substantially linearly in a direction substantially parallel (and antiparallel) to the longitudinal axis 2262.

Figure 22D:
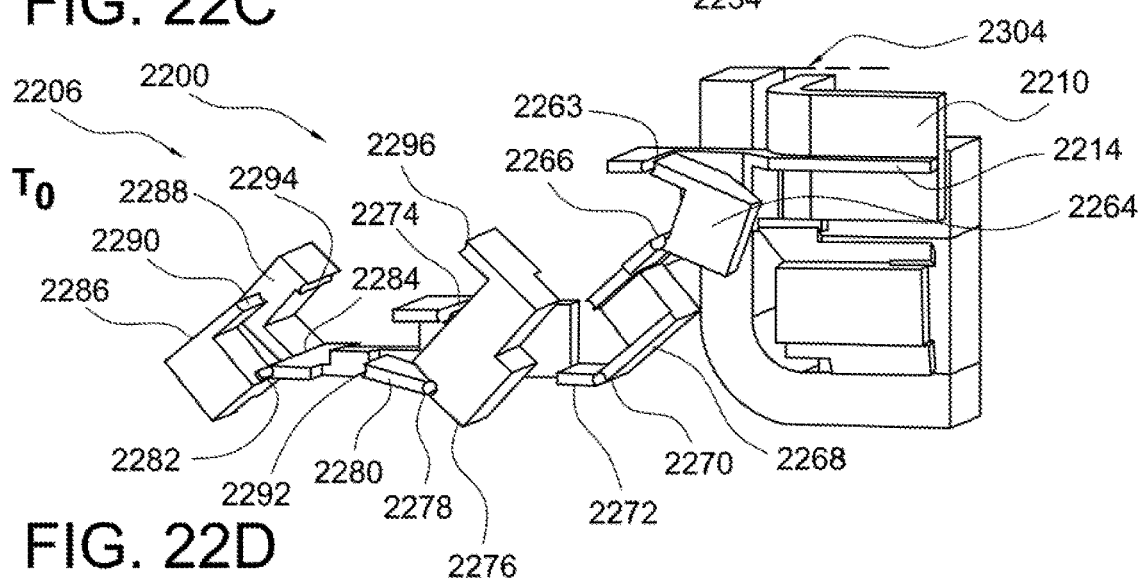
FIG. 22D shows, in perspective view, elements of haptic actuator of FIG. 22A in a further respective exemplary instantaneous state of operation identifying the relationship of various components and their mutual interaction so as to illustrate aspects of a method according to principles of the invention.

FIG. 22D shows, in schematic perspective view, a portion of the haptic actuator 2200 discussed above. For clarity of presentation, FIG. 22D omits the base member 2234. Accordingly, and as follows, selected elements of the transmission portion 2206 of the actuator 2200 are clearly visible. As will be further discussed below, the configuration of elements presented in FIG. 22D corresponds to an instantaneous state of haptic actuator 2200 at a particular time $T_0$ in an operational cycle of the actuator.

Transmission input member 2214 is shown coupled at one edge to an external surface region of armature coil 2210. At a further edge, input member 2214 is coupled through a flexible joints 2263 to a corresponding edge of a further member 2264. At a further edge of member 2264, another flexible joints 2266 is couples member 2264 to member 2268.

Member 2268 is also coupled through flexible joint 2270 to one end of member 2272. Member 2272 is coupled at an intermediate point through flexible joint 2274 to an intermediate point of member 2276. At one of its ends, member 2276 is coupled through flexible joint 2278 to a first end of member 2280.

Member 2272 is also coupled through flexible joints 2282 and 2284 to respective first ends of members 2286 and 2288. Referring again to 22C a second end of member 2286 is coupled through a flexible joint 2290 to support column 2242. Similarly, a second end of member 2280 is coupled through flexible hinge 2292 to support column 2243.

As will be further discussed below, respective ends of members 2276 and 2288 are coupled through hinges 2294, 2296 respectively to an output member of transmission portion 2206. The output member is, in turn, substantially fixedly coupled to a corresponding inertial mass.

Figure 22E:
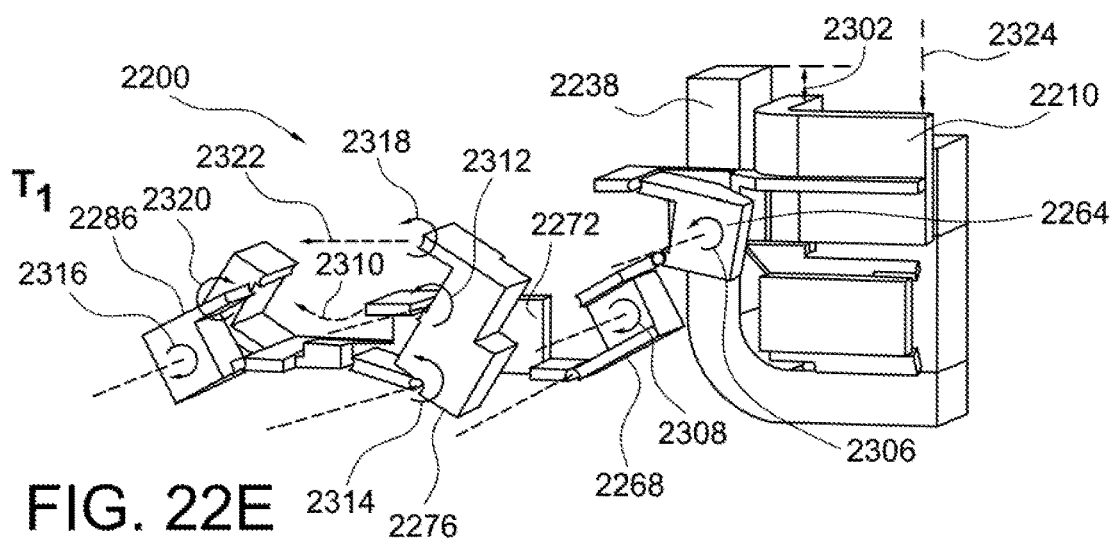
FIG. 22E shows, in perspective view, elements of haptic actuator of FIG. 22A in a further respective exemplary instantaneous state of operation identifying the relationship of various components and their mutual interaction so as to illustrate aspects of a method according to principles of the invention.
Figure 22F:
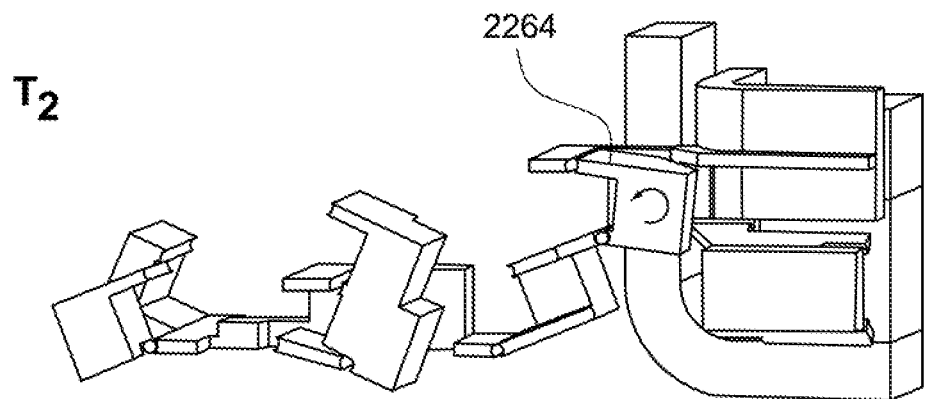
FIG. 22F shows, in perspective view, elements of haptic actuator of FIG. 22A in a further respective exemplary instantaneous state of operation identifying the relationship of various components and their mutual interaction so as to illustrate aspects of a method according to principles of the invention.
Figure 22G:
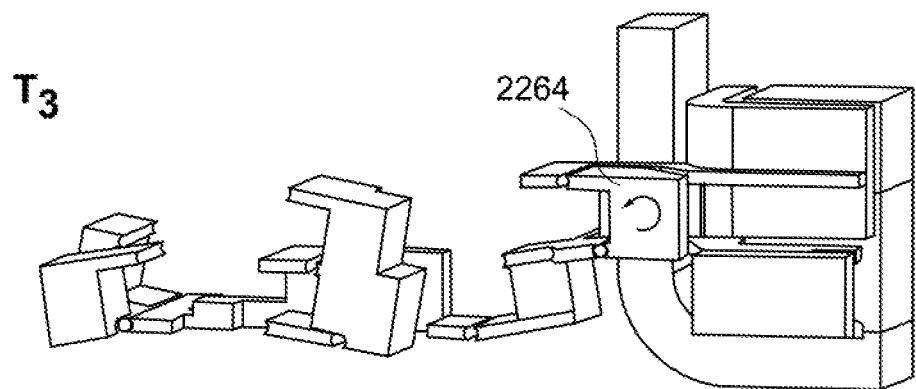
FIG. 22G shows, in perspective view, elements of haptic actuator of FIG. 22A in a further respective exemplary instantaneous state of operation identifying the relationship of various components and their mutual interaction so as to illustrate aspects of a method according to principles of the invention.
Figure 22H:
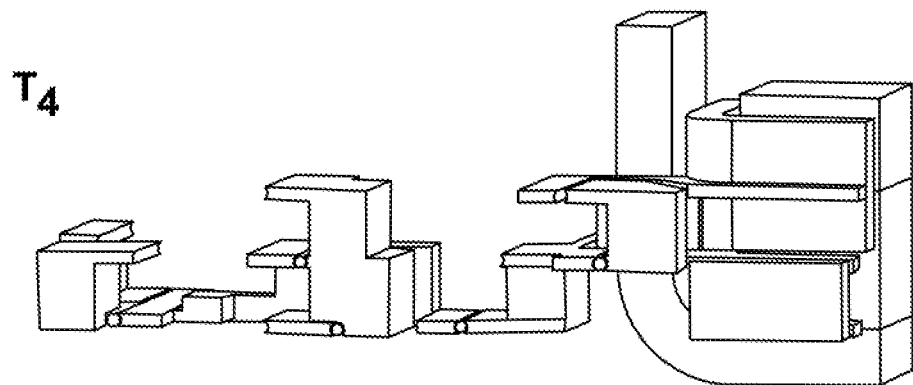
FIG. 22H shows, in perspective view, elements of haptic actuator of FIG. 22A in a further respective exemplary instantaneous state of operation identifying the relationship of various components and their mutual interaction so as to illustrate aspects of a method according to principles of the invention.

FIG. 22E shows haptic actuator 2200 with its elements arranged in a configuration corresponding to an instantaneous state of the actuator at a time $T_1$ of an operational cycle of the actuator 2200. Referring to both FIGS. 22D-22E, one sees that the configuration at time $T_1$ (FIG. 22E) differs slightly from the configuration at time $T_0$ shown in FIG. 22D. Specifically, for example, at time $T_1$ a distance 2302 corresponding to a spatial location of Armature coil 2210 with respect to keeper element 2238 is larger than a corresponding distance 2304 evident in FIG. 22D at time $T_0$. Likewise, member 2264 has rotated counterclockwise 2306 slightly. Correspondingly, member 2268 has rotated clockwise 2308 a small amount. Member 2272 has begun to traverse an upwardly concave arc 2310 while maintaining a substantially unchanged angular orientation. Member 2276 concurrently rotates counterclockwise 2312, 2314 about two flexible joints 2274 and 2278 respectively to produce an overall counterclockwise rotation of the member 2276. Meanwhile, member 2286 rotates clockwise 2316.

Notably, and as will be further discussed below, flexible joints 2296 of member 2276 and 2290 of member 2286 rotates counterclockwise 2318 and clockwise 2320 respectively. However, these rotations cancel in the member (not visible) mutually coupled between flexible joints 2294 and 2296 so that that member maintains a substantially unchanged angular orientation between times $T_0$ and $T_1$. However, and again as will be discussed below, the member moves horizontally to the left 2322 during the subject time interval $T_0$ and It is also worth noting that, whereas during the portion of the cycle when the armature coil 2310 is moving downward 2324, members 2268, 2276, and 2286 continue to rotate clockwise 2308, counterclockwise 2312, 2314, and clockwise 2316 respectively, member 2264 changes its direction of rotation during the downward half cycle from counterclockwise 2306 to clockwise. This behavior will be evident from inspection of FIGS. 22F-22K which shows a balance of the half cycle during which the armature coil 2210 is moving downward 2324. Specifically, in FIGS. 22J-22K, clockwise rotation 2326 of member 2264 is clearly visible.

Figure 22I:
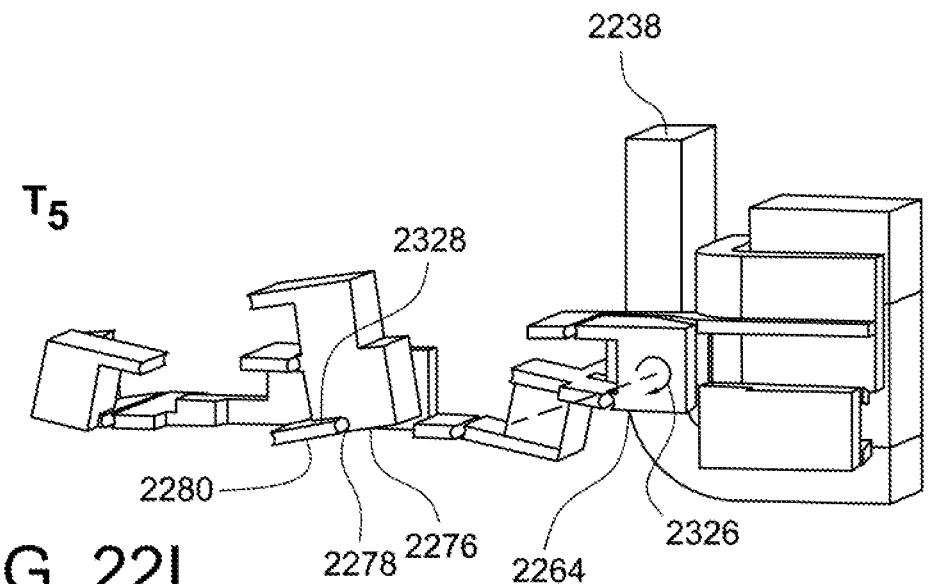
FIG. 22I shows, in perspective view, elements of haptic actuator of FIG. 22A in a further respective exemplary instantaneous state of operation identifying the relationship of various components and their mutual interaction so as to illustrate aspects of a method according to principles of the invention.
Figure 22J:
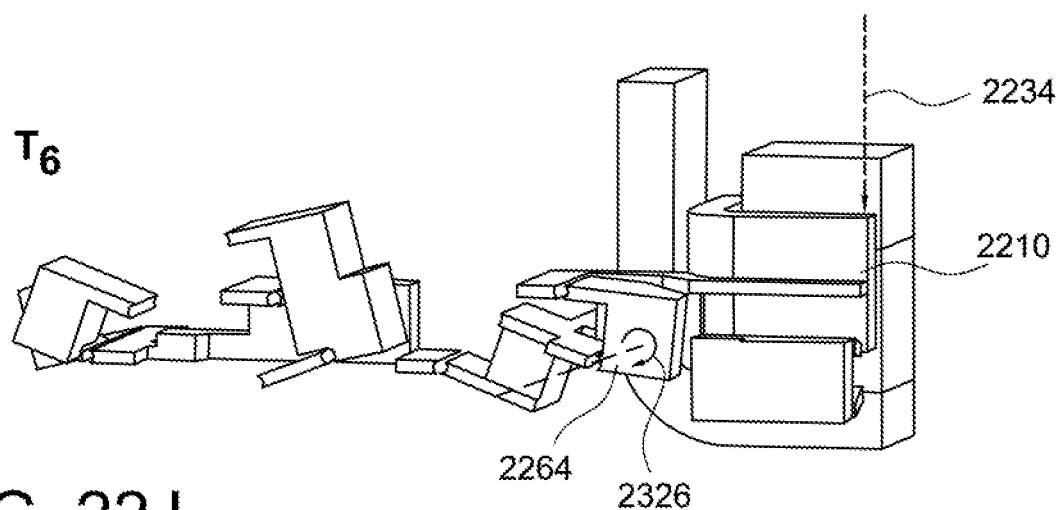
FIG. 22J shows, in perspective view, elements of haptic actuator of FIG. 22A in a further respective exemplary instantaneous state of operation identifying the relationship of various components and their mutual interaction so as to illustrate aspects of a method according to principles of the invention.
Figure 22K:
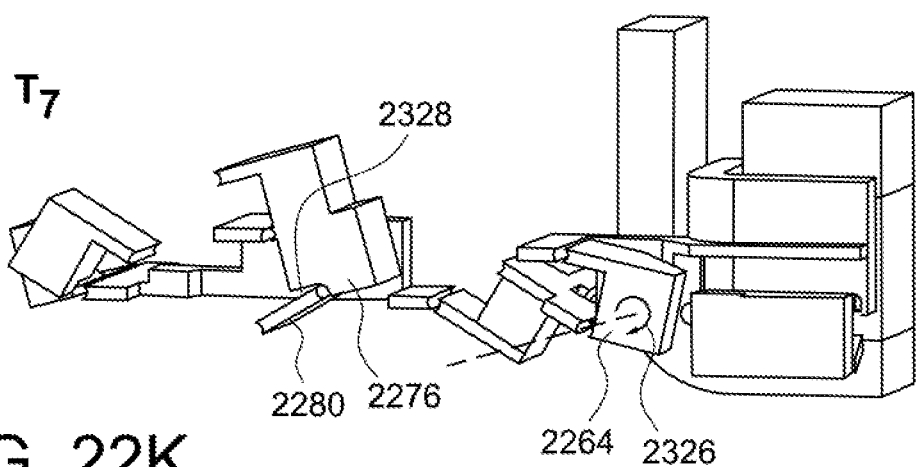
FIG. 22K shows, in perspective view, elements of haptic actuator of FIG. 22A in a further respective exemplary instantaneous state of operation identifying the relationship of various components and their mutual interaction so as to illustrate aspects of a method according to principles of the invention.

Referring to FIG. 22I, a further notable feature of the haptic actuator is the motion of member 2276 which executes an overall counterclockwise rotation (with respect to the frame of reference established by, e.g., base member 2234 (FIG. 22C) and/or keeper element 2238) during the entire downward half cycle of the armature coil 2210 (from $T_0$ to $T_7$). Notwithstanding this overall rotation, member 2276 begins the half cycle with a counterclockwise rotation about hinge 2278 with respect to that hinge. After closing the gap 2328 between member 2276 and member 2280, member 2276 begins to rotate clockwise with respect to hinge 2278 so that the gap 2328 reopens (as shown in, e.g., FIG. 22K).

It will be understood that the further half cycle during which the armature coil 2210 proceeds in an upward direction results in the reversal of all motions of the members within the transmission portion 2206 of the actuator 2200. It should also be noted that the actuator 2200 will not, in every case, complete a full cycle to move the armature coil 2210 fully between its extremes. Rather, in many cases and modes of operation, the armature coil 2210 will move over a portion of its available range of motion to produce desirable operation of the apparatus as a whole.

Figure 23A:
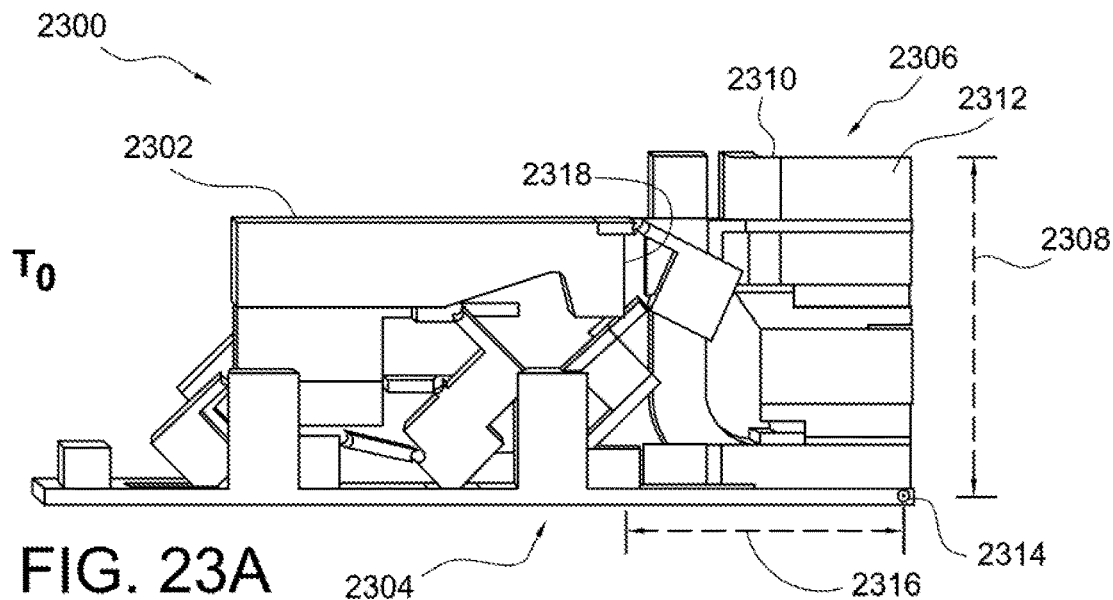
FIG. 23A shows, in perspective view, further elements of a haptic actuator prepared according to principles of the invention in a respective exemplary instantaneous state of operation identifying the relationship of various components and their mutual interaction so as to further illustrate the actuator and aspects of a method according to principles of the invention.
Figure 23B:
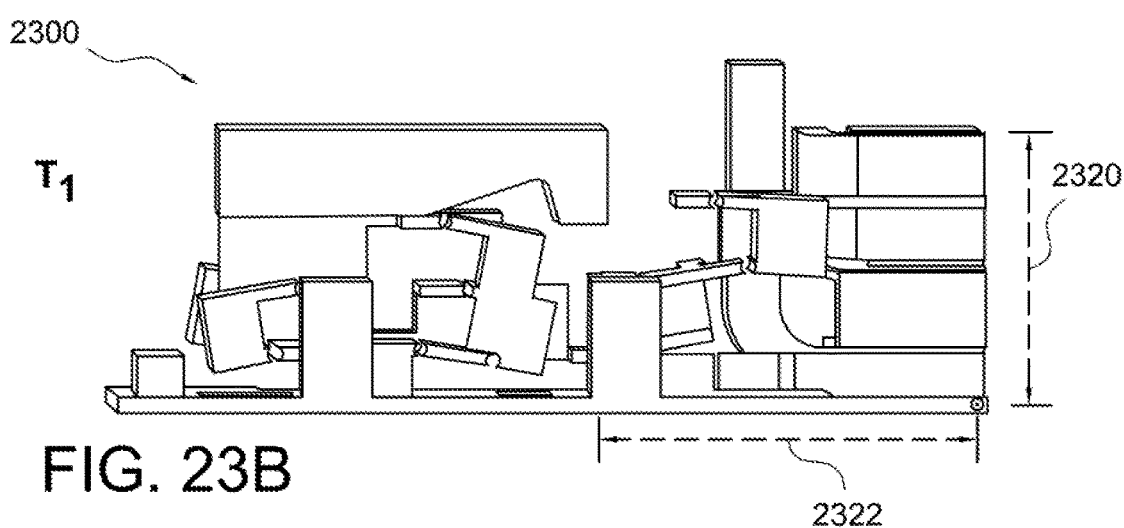
FIG. 23B shows, in perspective view, further elements of a haptic actuator prepared according to principles of the invention in a further respective exemplary instantaneous state of operation identifying the relationship of various components and their mutual interaction so as to further illustrate the actuator and aspects of a method according to principles of the invention.
Figure 23C:
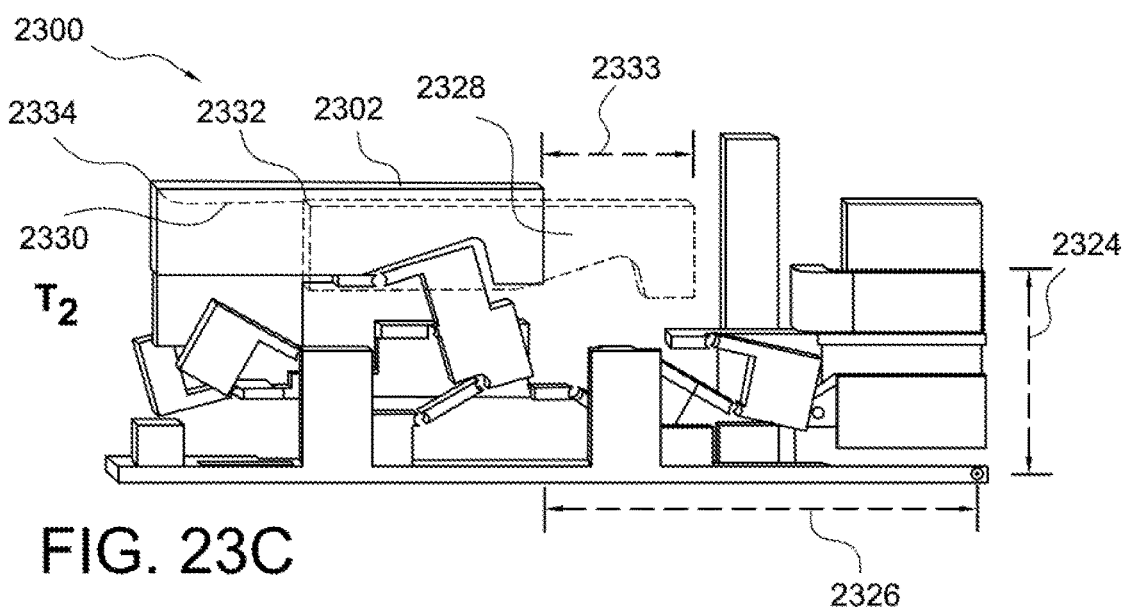
FIG. 23C shows, in perspective view, further elements of a haptic actuator prepared according to principles of the invention in a further respective exemplary instantaneous state of operation identifying the relationship of various components and their mutual interaction so as to further illustrate the actuator and aspects of a method according to principles of the invention.

FIGS. 23A-23C show, in schematic perspective view, further aspects of a portion of a haptic actuator 2300 like actuator 2200 described above. In contrast to the presentation in FIGS. 22A-22K, the illustrated haptic actuator 2300 in FIGS. 23A-23C expressly show an inertial mass 2302 coupled through a transmission portion 2304 to a motor portion 2306. In FIG. 23A the actuator 2300 is shown in an instantaneous state at a time $T_0$ of an operational cycle, like that described above for actuator 2200. The instantaneous state at time $T_0$ of the operational cycle can be characterized, in part, by a distance 2308 of a generally horizontal surface region 2310 of an armature coil 2312 from a datum point 2314 of the actuator 2200, and by a distance 2316 of a generally vertical surface region 2318 of inertial mass 2302 with respect to datum point 2314.

FIG. 23B shows the haptic actuator 2300 of FIG. 23A in an instantaneous state corresponding to a time $T_1$ of the operational cycle. The instantaneous state at time $T_1$ is characterized by a distance 2320 which corresponds to, but is shorter than, distance 2308, and by distance 2322 which corresponds to, but is longer than, distance 2316.

FIG. 23C shows the haptic actuator 2300 of FIG. 23A at an instantaneous state corresponding to a time $T_2$ of the operational cycle. The instantaneous state at time $T_2$ is characterized by a distance 2324 which corresponds to, but is shorter than, both distances 2320 and 2308, and by distance 2322 which corresponds to, but is longer than, distances 2316 and 2322. It should be noted that times $T_0$, $T_1$ and $T_2$ defined for purposes of this discussion of actuator 2300 are not necessarily related to times $T_0$, $T_1$ and $T_2$ as discussed above in relation to actuator 2200.

In FIG. 23C the initial (i.e., To) position of inertial mass 2302 is shown 2328 in dashed lines to clarify the dynamic relationship embodied in the motion of the inertial mass 2302 during the illustrated half of the operational cycle. In addition, the path of motion 2330 followed by the inertial mass is illustrated, which corresponds to the path of an exemplary point of the inertial mass 2302 over a distance 2333 between an initial location 2332 at $T_0$ and a final location 2334 at later time $T_2$ in the illustrated half cycle.

Figure 24A:
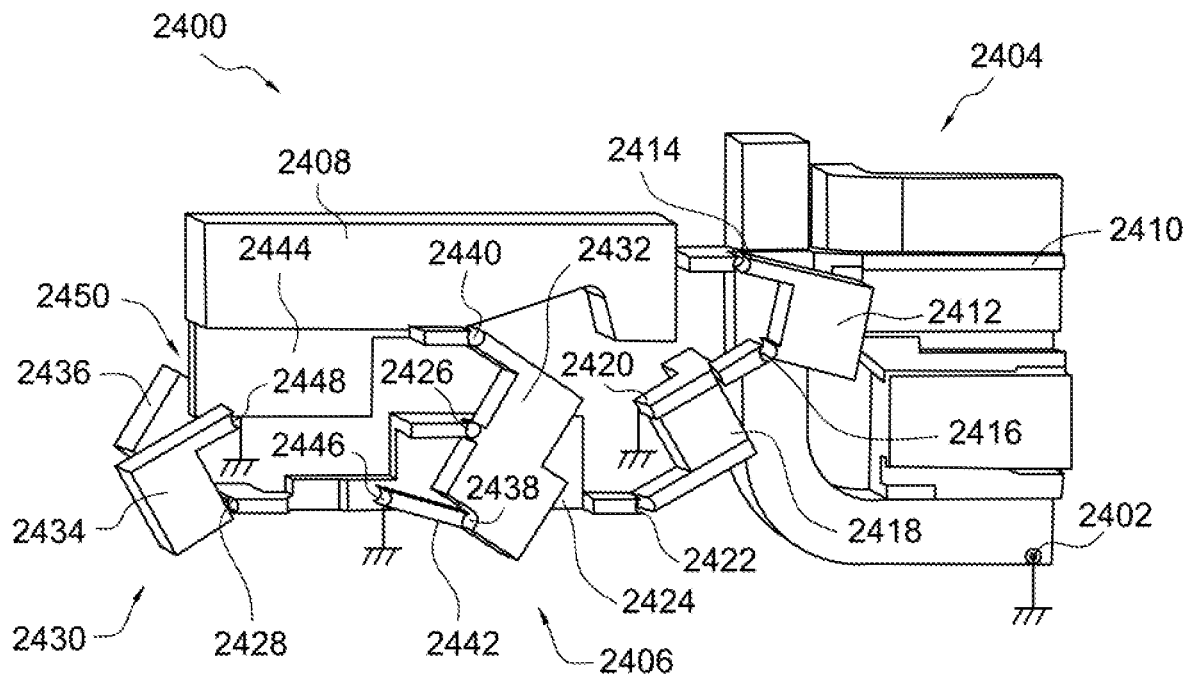
FIG. 24A illustrates elements of a haptic actuator according to the invention in perspective view.
Figure 24B:
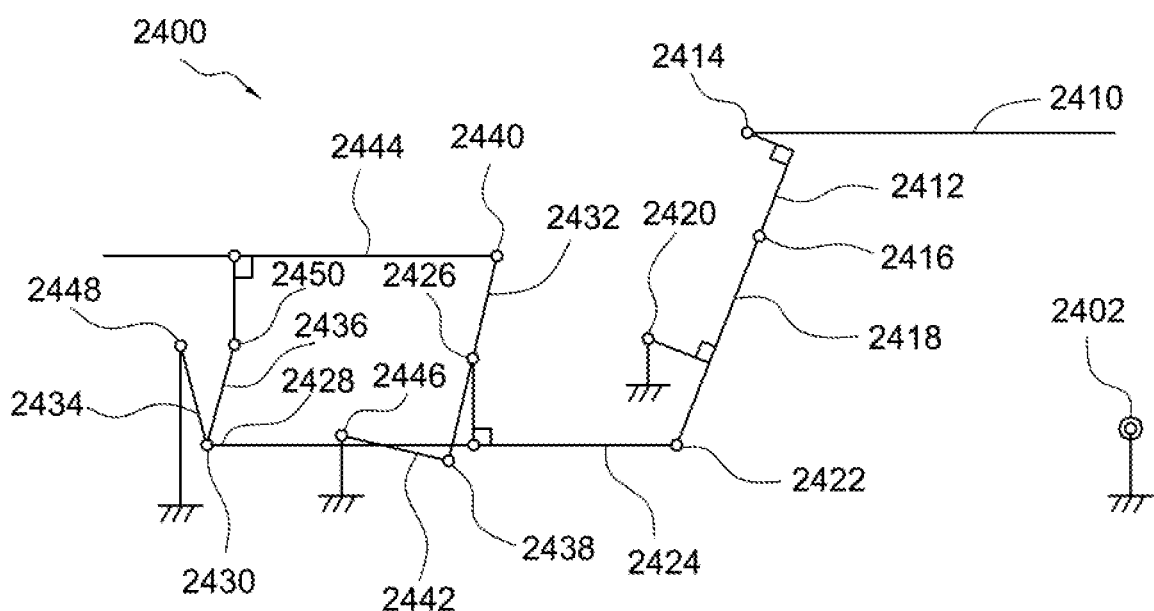
FIG. 24B illustrates elements of a haptic actuator according to the invention in schematic link view.
Figure 25A:
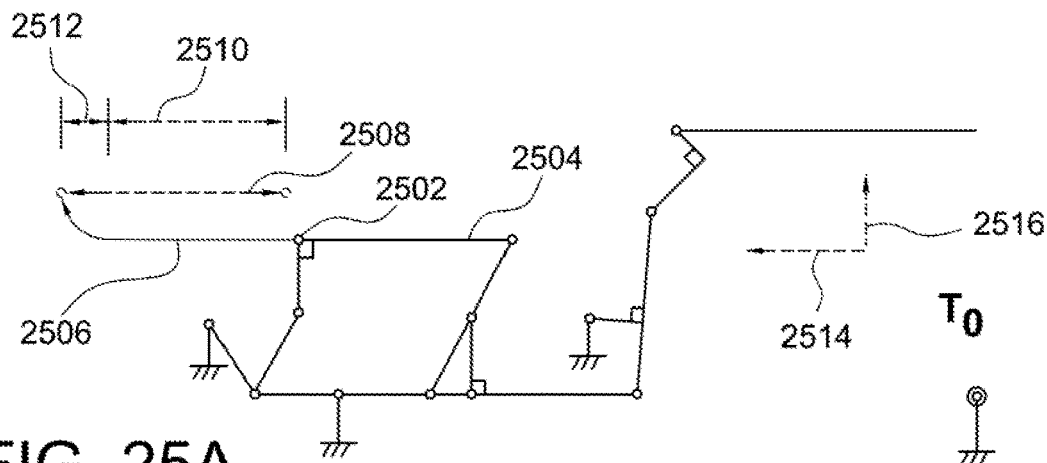
FIG. 25A illustrates, in schematic link view, further elements of a haptic actuator prepared according to principles of the invention in a respective exemplary instantaneous state of operation identifying the relationship of various components and their mutual interaction so as to further illustrate the actuator and aspects of a method according to principles of the invention.
Figure 25B:
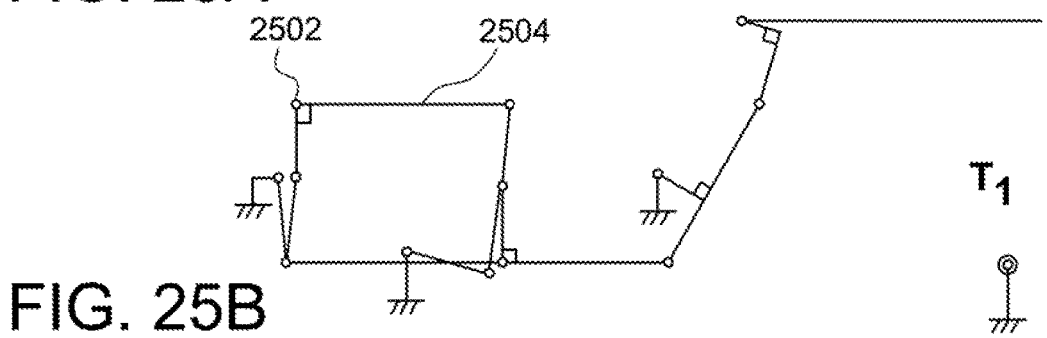
FIG. 25B illustrates, in schematic link view, further elements of a haptic actuator prepared according to principles of the invention in a respective exemplary instantaneous state of operation identifying the relationship of various components and their mutual interaction so as to further illustrate the actuator and aspects of a method according to principles of the invention.
Figure 25C:
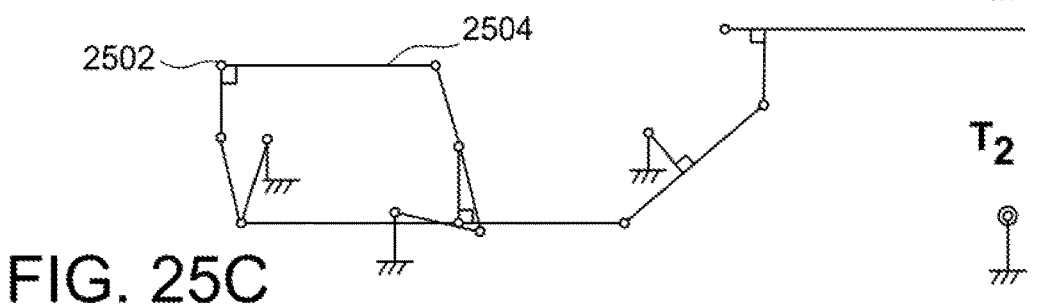
FIG. 25C illustrates, in schematic link view, further elements of a haptic actuator prepared according to principles of the invention in a respective exemplary instantaneous state of operation identifying the relationship of various components and their mutual interaction so as to further illustrate the actuator and aspects of a method according to principles of the invention.
Figure 25D:
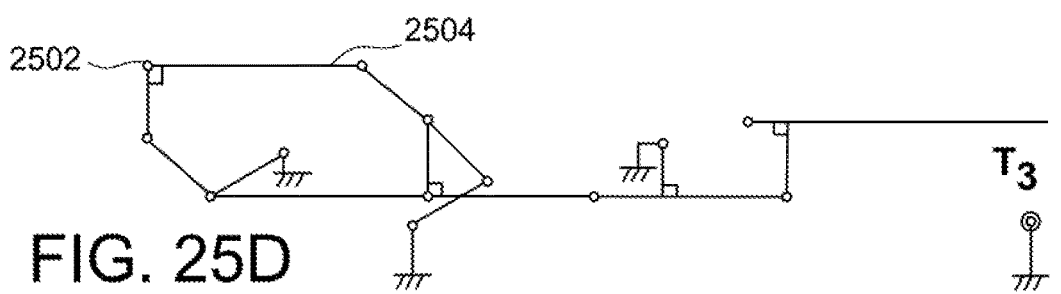
FIG. 25D illustrates, in schematic link view, further elements of a haptic actuator prepared according to principles of the invention in a respective exemplary instantaneous state of operation identifying the relationship of various components and their mutual interaction so as to further illustrate the actuator and aspects of a method according to principles of the invention.
Figure 25E:
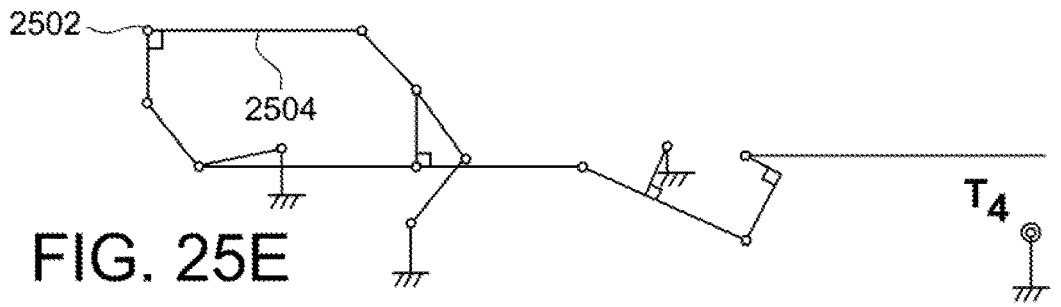
FIG. 25E illustrates, in schematic link view, further elements of a haptic actuator prepared according to principles of the invention in a respective exemplary instantaneous state of operation identifying the relationship of various components and their mutual interaction so as to further illustrate the actuator and aspects of a method according to principles of the invention.

FIGS. 24A and 24B, taken together, show the relationship between a portion of a haptic actuator 2400 (shown in schematic perspective view as FIG. 24A) and a schematic link diagram 24B of the same actuator. A datum point 2402 is identified in each drawing and labeled as a mechanical ground. Like haptic actuators discussed above, actuator 2400 includes a motor portion 2404, a transmission portion 2406, and an inertial mass 2408 operatively coupled to one another. A schematic link 2410 corresponds to an input member of the transmission portion 2406. Schematic link 2412 corresponds to a further transmission member, and schematic joint 2414 is pivotally coupled between links 2410 and 2412. Likewise, schematic joint 2416 is pivotally coupled between links 2412 and 2418. Link 2418 is pivotally coupled at two further joints 2420 and 2422 to a mechanical ground (i.e., a point on a ground member, not shown) and link 2424 respectively.

It should be noted that joint 2420 is disposed in a substantially fixed offset relationship with respect to a line defined by joints 2416 and 2422. Link 2424 is pivotally coupled at three further joints 2426, 2428 and 2430 to links 2432, 2434 and 2436 respectively. It will also be noted that joint 2426 is disposed in a substantially fixed offset relationship with respect to a line defined by joints 2422 and 2428. In addition, joints 2428 and 2430 are disposed coaxially with respect to one another such that, as represented in FIG. 24B, looking into the paper, joint 2430 is disposed behind joint 2428.

Link 2432 is pivotally coupled at two further joints 2438 and 2440 to links 2442 and 2444 respectively. A second end of link 2442 is pivotally coupled through a further joint 2446 to a mechanical ground (again, a point on a ground member, not shown). Link 2434 is also pivotally coupled at joint 2448 to a mechanical ground (on the ground member, not shown). Link 2436 is pivotally coupled at a second end through joint 2450 to link 2444 at a location spatially separated from joint 2440. Link 2444 corresponds to an output member of transmission portion 2406, and is substantially fixedly coupled to inertial mass 2408.

FIGS. 25A-25E show a sequence of images of a schematic link diagram 2500 representing a portion of a haptic actuator prepared according to principles of the invention. The sequence of images corresponds to a respective plurality of instantaneous states of the actuator (at respective times $T_0$, $T_1$, $T_2$, $T_3$, $T_4$) over the course of one half cycle of a typical operation. Upon examination, one of skill in the art will immediately observe that a selected point, e.g., 2502 of an output link 2504 of the link diagram 2500 follows a J-shaped trajectory 2506 over the course of the half cycle. As the reader will appreciate that the designation of instantaneous states as $T_0$ is made arbitrarily and merely for convenience. That is, while the illustrated states are properly sequential, a physical embodiment of an actuator device prepared according to principles of the invention will have an initial point of a cycle at any convenient physical location within the pathway of the cycle. This initial point will be determined according to the various design considerations of a particular application. Moreover, as previously noted, various intermediate stopping and starting points and partial and/or varied cycles of operation are anticipated as being features of respective embodiments of the invention.

The J shaped trajectory 2506 has an overall length 2508 which can be regarded in terms of a first portion 2510 over which the selected point 2502 traverses a substantially linear path, and a second portion 2512 over which the selected point 2502 traverses a generally arcuate path. Consequently, while the point begins the path moving in a first direction 2514, by the end of the path, it has changed direction so as to be moving in a second direction 2516, generally normal to the first direction 2514.

Figure 26:
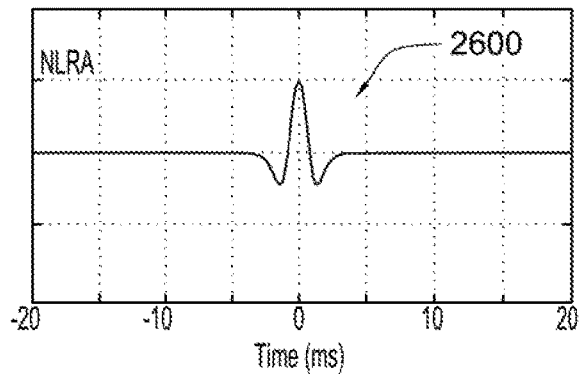
FIG. 26 shows, in graphical form, an output pulse of an exemplary actuator prepared according to principles of the invention.

FIG. 26 shows a graphical representation with respect to time of an exemplary output signal 2600 such as might be produced by, for example, actuator 2400 (as discussed above in relation to FIG. 24). In light of, for example, the discussion of FIG. 5B above, the reader will appreciate that one or more inertial weight of an actuator will, in some circumstances, traverse multiple cycles along a linear path prior to transitioning through an arcuate portion of a path to produce the illustrated output signal 2600.

Figure 27:
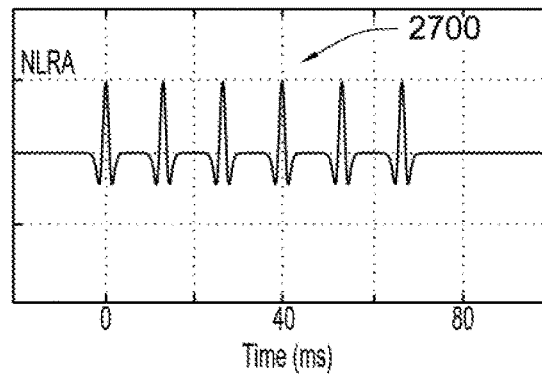
FIG. 27 shows, in graphical form, an output pulse train of an exemplary actuator prepared according to principles of the invention.

The illustrated output signal allows for the production of at least two haptic sensations for communication. One of these is the illustrated a single pulse as in signal 2600 (referred to below as "Pulse"). A second signal readily produced by the haptic actuator is a sequence of pulses 2700 as illustrated, for example, in FIG. 27 (referred to below as "Vibe"). In addition, it will be appreciated that either of these signals can be produced repeatedly over time and/or in any desired duration or amplitude, along with intervening quiescent periods of any programmed duration and in any combination, according to the design of a particular device application. One of skill in the art will appreciate that the resulting range of signal combinations results in a rich haptic language for communication. It will also be noted that various embodiments of the invention can be prepared that do not require high peak currents and that are compatible with standard haptic drive electronics. In addition, certain devices prepared according to the invention can be prepared that inherently damp vibrations, reducing or eliminating the need for electrical braking typical of other resonant technologies.

In certain embodiments, an actuator prepared according to principles of the invention will produce extremely short vibration rise and stop times of, for example at least about 14 ms and at least about 10 ms respectively, enabling crisp signaling effects. In certain embodiments, it is possible to produce pulses of approximately 1.1 g with a 100 g reference mass. One of skill in the art will understand that this is a desirable characteristic for many wearable and handheld applications. In certain embodiments, an actuator according to the invention will serve as a 'drop-in replacement' for designs incorporating other common haptic components.

Table 1, below, provides typical characteristics for one exemplary embodiment of an actuator produced according to principles of the invention.

TABLE 1

| Parameter | Notes | Value | Tol. | Unit |
|---|---|---|---|---|
| Package Length | | 16.76 | ±0.13 | mm |
| Package Width | | 15.24 | ±0.13 | mm |
| Package Height | | 5.31 | ±0.13 | mm |
| II. TYPICAL PERFORMANCE SPECIFICATIONS | | | | |
| Terminal Resistance | | 22 | +2 | Sl |
| Terminal | | 115 | | ttH |
| Resonant | | 70 | ±5 | Hz |
| Drive Voltage | Vibe, RMS | 2.40 | | V |
| Operating Current | Vibe | 109 | | mA |
| Amplitude | Vibe, Peak-to-peak, 100 g reference mass | 0.9 | | |
| Drive Voltage | Pulse, RMS | 2.60 | | G |
| Operating Current | Pulse | 118 | | mA |
| Amplitude | Pulse, Peak-to-peak, 100 g reference mass | 1.1 | | G |
| Energy Use | Pulse, Single | 8.8 | | mJ |
| Resonant Gain | Pulse | | | |
| III. TYPICAL HAPTIC SPECIFICATIONS | | | | |
| Lag Time | Pulse | 29 | | ms |
| Pulse Width | Pulse | 3.5 | | ms |
| Lag Time | Vibe | 29 | | ms |
| Rise Time | Vibe | 14 | | ms |
| Stop Time | Vibe | 10 | | ms |

Table 2, below, provides typical characteristics for another exemplary embodiment of an actuator produced according to principles of the invention.

TABLE 2

| Parameter | Notes | Value | Tol. | Unit |
|---|---|---|---|---|
| Package Length | | 18.0 | +0.13 | mm |
| Package Width | | 9.0 | +0.13 | mm |
| Package Height | | 4.0 | +0.13 | mm |
| II. TYPICAL PERFORMANCE SPECIFICATIONS | | | | |
| Terminal Resistance | | 22 | ±2 | SZ |
| Terminal Inductance | | 115 | | /LH |
| Resonant Frequency | | 75 | ±5 | Hz |
| Drive Voltage | Vibe, RMS | 2.25 | | V |
| Operating Current | Vibe | 102 | | mA |
| Amplitude | Vibe, Peak-to-peak, 100 g reference mass | 0.6 | | G |
| Drive Voltage | Pulse, RMS | 2.75 | | V |
| Operating Current | Pulse | 125 | | mA |
| Amplitude | Pulse, Peak-to-peak, 100 g reference mass | 1.0 | | |
| Energy Use | Pulse, Single | 9.5 | | mJ |
| Resonant Gain | Pulse | | | |
| III. TYPICAL HAPTIC | | | | |
| Lag Time | Pulse | 29 | | MS |
| Pulse Width | Pulse | 3.5 | | MS |
| Lag Time | Vibe | 29 | | MS |
| Rise Time | Vibe | 14 | | MS |
| Stop Time | Vibe | 10 | | MS |

Figure 28:
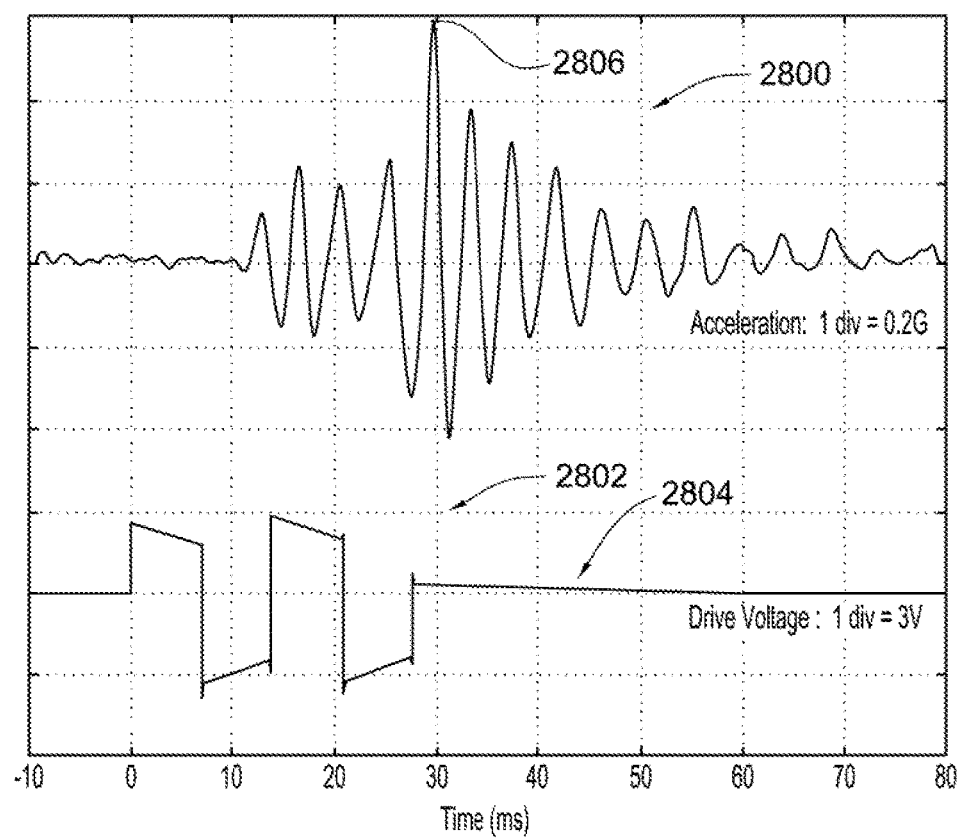
FIG. 28 shows, in graphical form, comparative signal images representing art output signal and an input signal of an exemplary actuator prepared according to principles of the invention.

FIG. 28 shows, in a graphical time-based representation, the resultant acceleration 2800 of an exemplary linear actuator according to principles of the invention in response to an input drive signal 2802. The acceleration signal is represented on a vertical scale of one division=0.2 g. The voltage signal is represented on a vertical scale of one division=3 V. It will be noted that a quiescent input signal is applied 2804 once the desired single pulse output has been achieved 2806, and no active braking input is necessary to produce the illustrated output signal 2800.

Figure 29A:
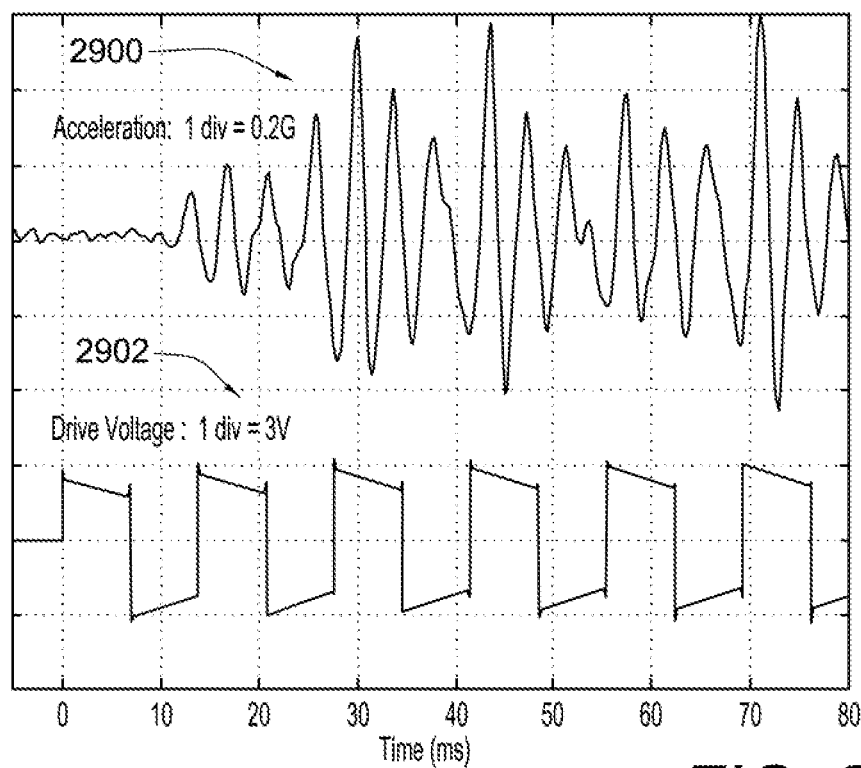
FIG. 29A shows, in graphical form, signal images representing the initiation of an output pulse train signal and initiation of the corresponding input signal of an exemplary actuator prepared according to principles of the invention.
Figure 29B:
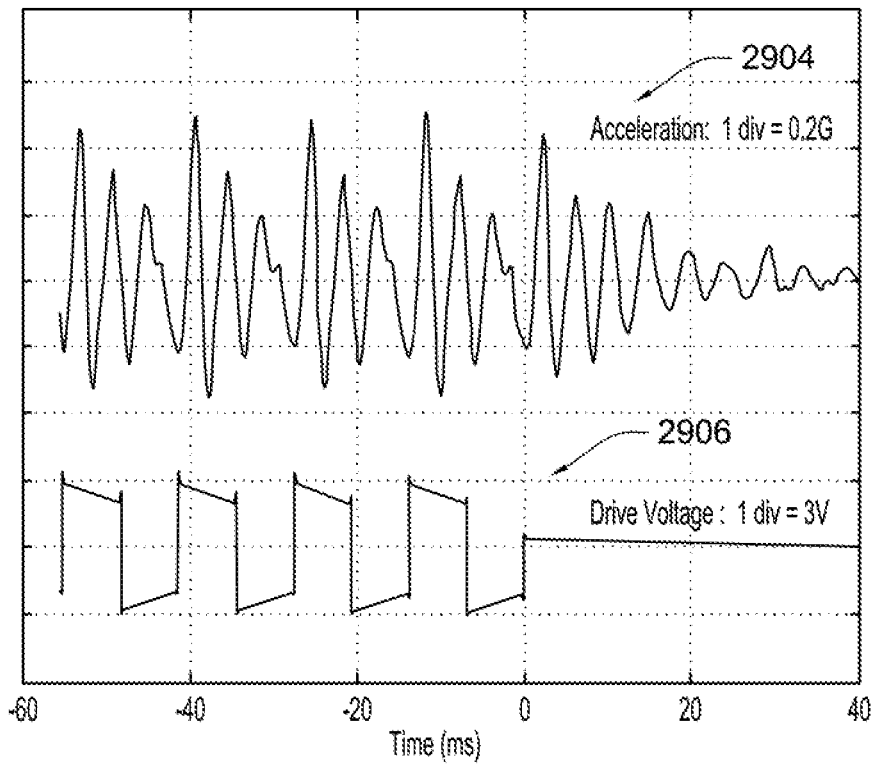
FIG. 29B shows, in graphical form, signal images representing the termination of an output pulse train signal and termination of the corresponding input signal of an exemplary actuator prepared according to principles of the invention.

FIG. 29A shows, in graphical timebase representation, the beginning of a multi-pulse "Vibe" signal 2900 and the corresponding electrical input signal 2902. FIG. 29B shows, in graphical timebase representation, the conclusion of a multi-pulse "Vibe" signal 2904 and the corresponding electrical input signal 2906.

Figure 30:
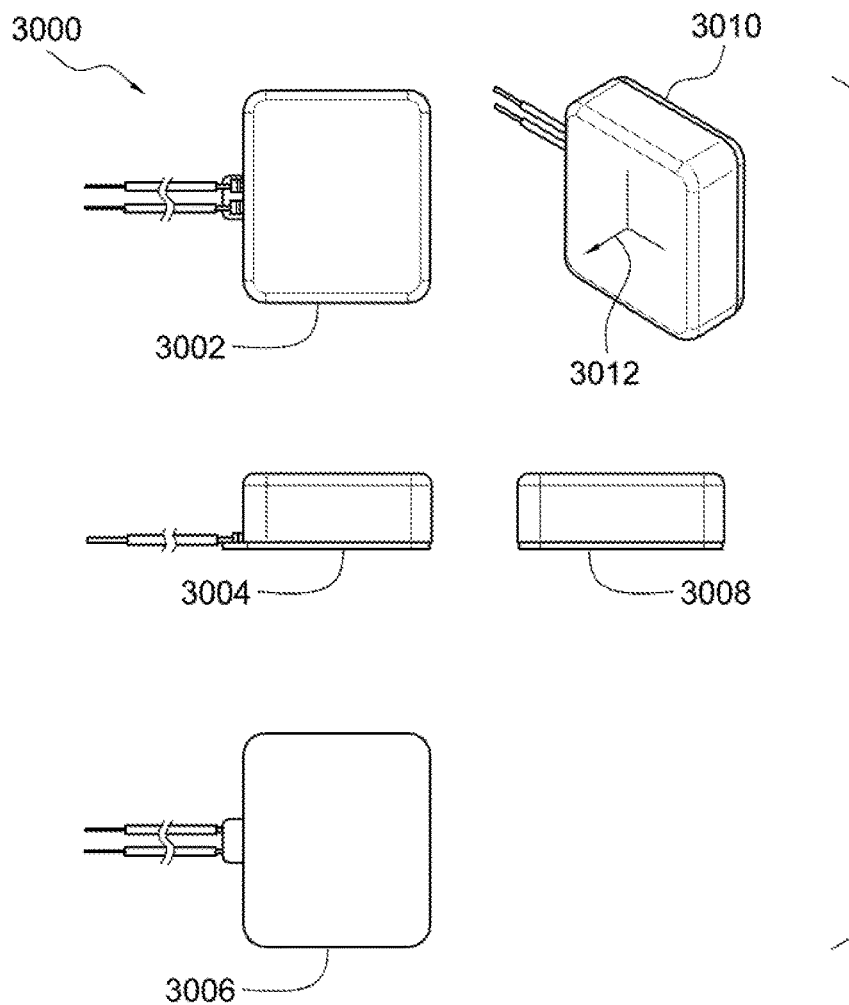
FIG. 30 shows various aspects of a device package for an actuator prepared according to principles of the invention.

FIG. 30 shows various views of an exemplary device package 3000 for a haptic actuator according to principles of the invention. One of skill in the art will understand that the illustrated package is only one of many that might be prepared according to the requirements of a particular application. Shown are a top view 3002, a side view, 3004, bottom view, 3006, end view, 3008, and a perspective view 3010 indicating the principal signal direction 3012.

Figure 31:
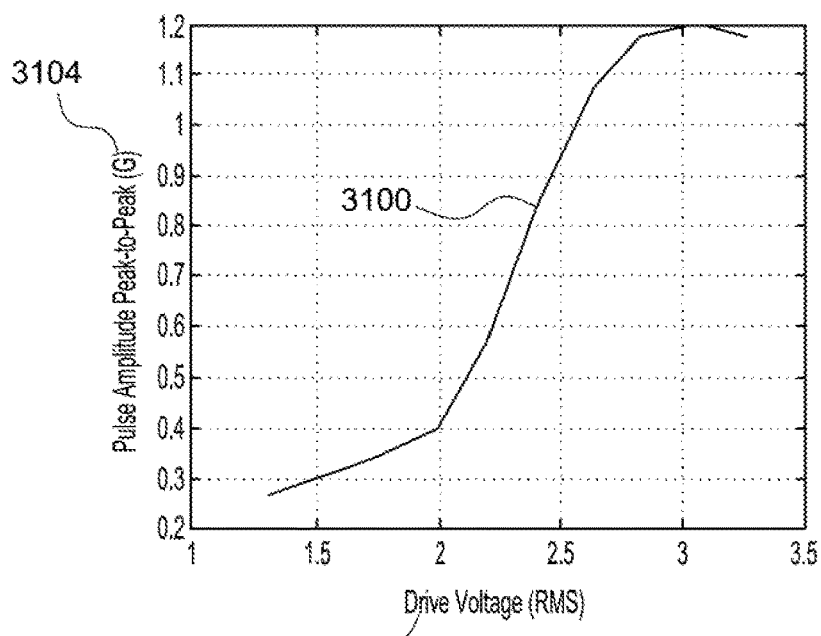
FIG. 31 shows, in graphical form, a relationship between input and output characteristics of an exemplary actuator prepared according to principles of the invention.

FIG. 31 shows, in graphical form, a relationship 3100 between RMS Drive voltage 3102 and pulse peak-to-peak amplitude in grams 3104. It will be appreciated that this relationship corresponds to an exemplary device and will differ for other devices respectively.

Figure 32A:
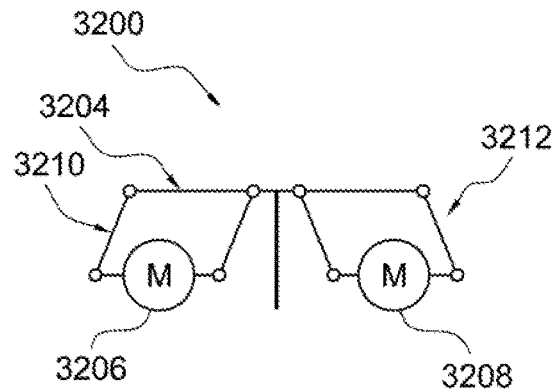
FIG. 32A shows, in schematic link form, a respective instantaneous operational state of a further exemplary haptic actuator prepared according to principles of the invention.
Figure 32B:
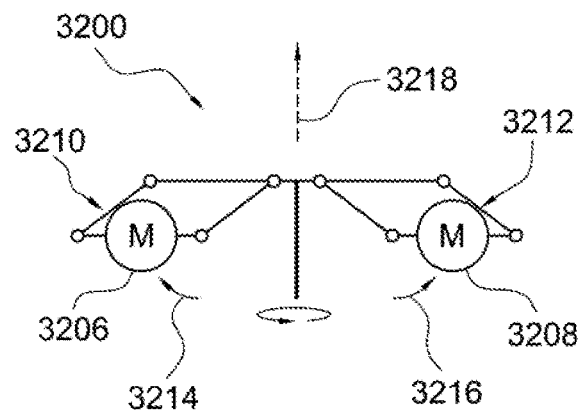
FIG. 32B shows, in schematic link form, a further respective instantaneous operational states of a further exemplary haptic actuator prepared according to principles of the invention.

FIGS. 32A and 32B show, in schematic link form, a further haptic actuator 3200 prepared according to principles of the invention. Actuator 3200 includes a rotational haptic component 3204 capable of storing kinetic energy in a rotating mass and releasing it in a single impulse. Existing rotational haptic components rely on a non-symmetric mass attached to the drive shaft of an electric motor to generate vibrations. Because the motor needs time to accelerate and slow down, such components can only generate haptic effects with substantial rise and fall times. The ability to build up energy gradually and release it quickly within a haptic component enables crisp, high-amplitude haptic effects for more effective haptic communication.

In the illustrated embodiment, a two-part mass 3206, 3208 is coupled to a rotating drive shaft via a simple four-bar parallelogram linkage 3210, 3212. If the motion of the linkage 3210, 3212 (hereafter called the primary linkage) is constrained during rotation, it is possible to store rotational kinetic energy in the masses. Freeing the primary linkage allows the masses to travel outward and upward 3214, 3216 due to centrifugal force, generating an inertial impulse along the axis of rotation 3218. A number of other linkages that result in alternative mass trajectories may also be used (e.g. the Evans linkage).

The primary linkage may be constrained in several ways, including but not limited to: a secondary actuator (e.g. electromagnetic latch), a passive latching mechanism that is released once a sufficient amount of energy is stored in the mass (e.g. permanent magnet or bistable mechanism latch), or a secondary mechanical linkage coupled to the main actuator (the electric motor) that inhibits the primary linkage when the drive signal to the motor is altered (e.g. from acceleration to braking).

Figure 33A:
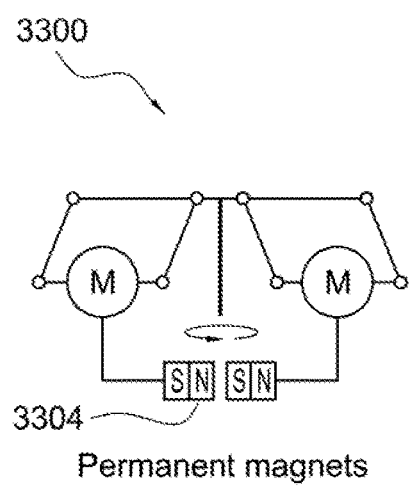
FIG. 33A shows, in schematic link form, respective further exemplary embodiments of a haptic actuator prepared according to principles of the invention.
Figure 33B:
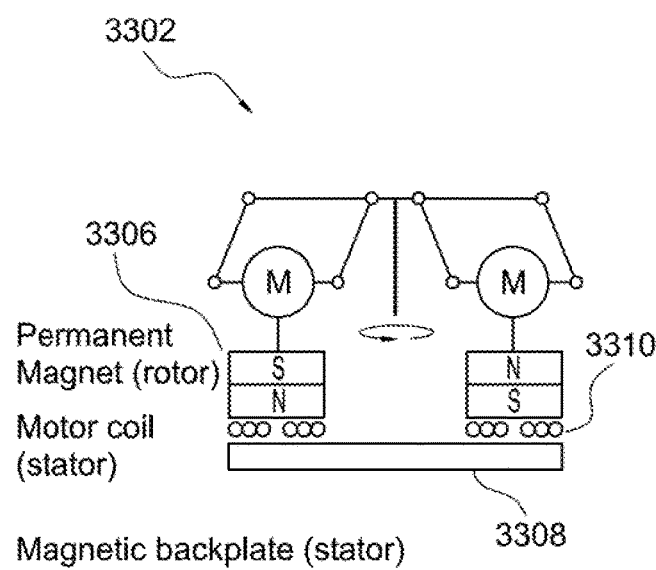
FIG. 33B shows, in schematic link form, respective still further exemplary embodiments of a haptic actuator prepared according to principles of the invention.

FIGS. 33A and 33B show respectively two 3300, 3302 embodiments of a passive latching mechanism 3304, 3306 based on permanent magnets. In the first embodiment, two permanent magnets are used to create an attractive force between the two masses. When the centrifugal forces on the masses exceed the magnetic force (which may be precisely configured by selecting the size, strength, geometry, and distance between the permanent magnets), the masses will separate and generate a haptic impulse. In the second embodiment, the masses are coupled directly to the permanent magnets in the rotor of the electric motor; here, the attractive magnetic force is between the magnets 3306 and a backplate or yoke 3308 made of magnetic material. One potential advantage of this approach is that the motion of the masses (and consequent generation of the haptic effect) results in a significant reduction in motor torque due to the magnets 3306 moving further away from the backplate 3308 and coils 3310. This may allow the component to slow down more quickly and reduce the time before the next haptic impulse can be generated.

FIGS. 34A-34D show one embodiment 3400 of a secondary mechanical linkage 3402 used to inhibit the motion of a primary linkage 3404. Here, a spherical four-bar linkage 3406 is used to couple the motor drive shaft 3408 to the primary linkage 3404 through a coupling member 3405. When the motor is accelerating FIG. 34C, the spherical linkage is in tension 3410, 3412, which simultaneously keeps the primary 3414 and secondary 3416 rotors turning synchronously and constrains the motion of the primary linkage. When the motor brakes FIG. 34D, the inertia of the masses coupled to the secondary rotor 3416 changes 3418 the rotation of the secondary rotor 3416 with respect to the primary rotor 3414, compressing the spherical linkage 3406 and allowing the primary linkage 3404 to move 3409.

In addition to generating individual haptic impulses, it is possible to use the rotational haptic component described above to create the more familiar "buzz" or pulse-train style effects. One approach involves applying a periodic drive signal to the motor (e.g. a sequence of rapid acceleration and braking cycles), resulting in a series of impulses. Another approach involves introducing an asymmetry to the primary linkage (e.g. by changing the stiffness on one side, or by introducing different mechanical stops for the two masses). This effectively turns the component into an eccentric mass motor when the primary linkage is free to move.

Figures 34A, 34B:
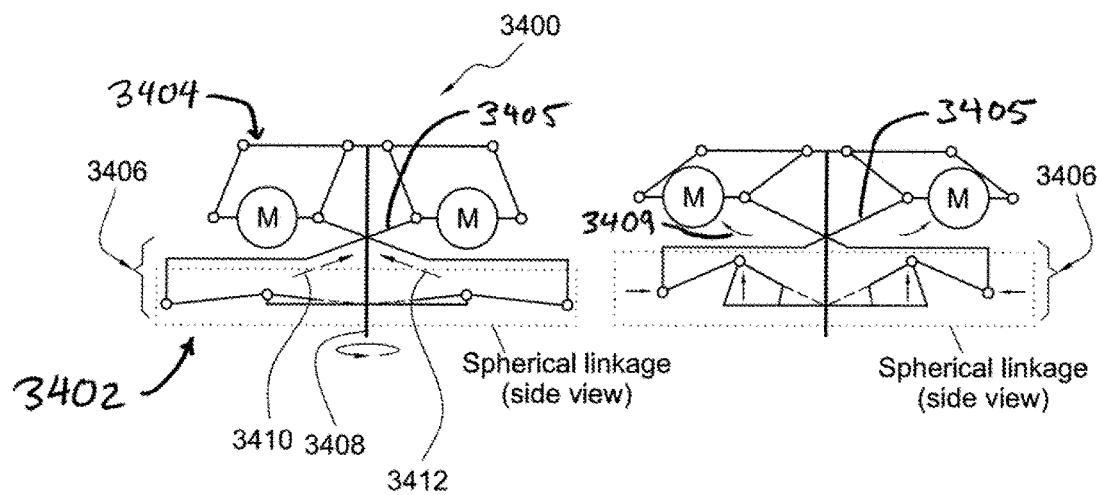
FIG. 34A shows, in schematic link form, an instantaneous operational state of a further exemplary haptic actuator prepared according to principles of the invention.
FIG. 34B shows, in schematic link form, a further instantaneous operational state of an exemplary haptic actuator prepared according to principles of the invention.
Figures 34C, 34D:
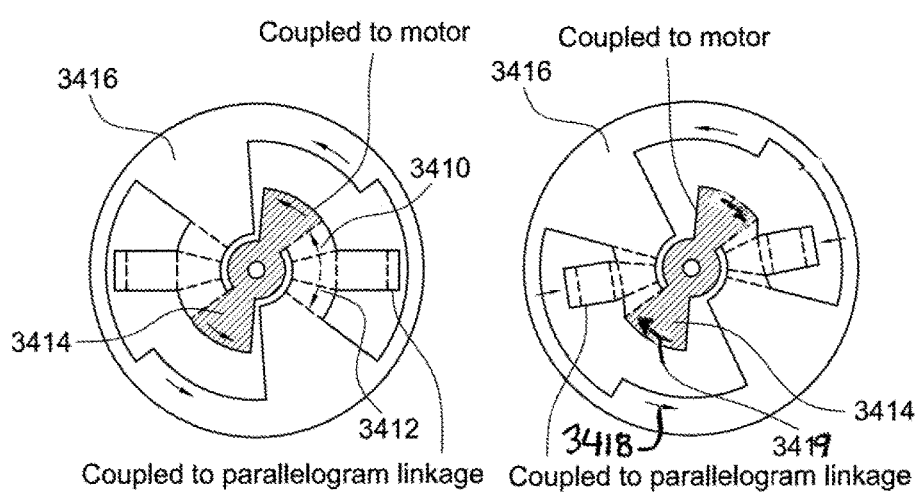
FIG. 34C shows, in schematic top view, an instantaneous operational state of the exemplary actuator of FIGS. 34A-34B.
FIG. 34D shows, in schematic top view, a further instantaneous operational state of the exemplary actuator of FIGS. 34A-34B.
Figure 34E:
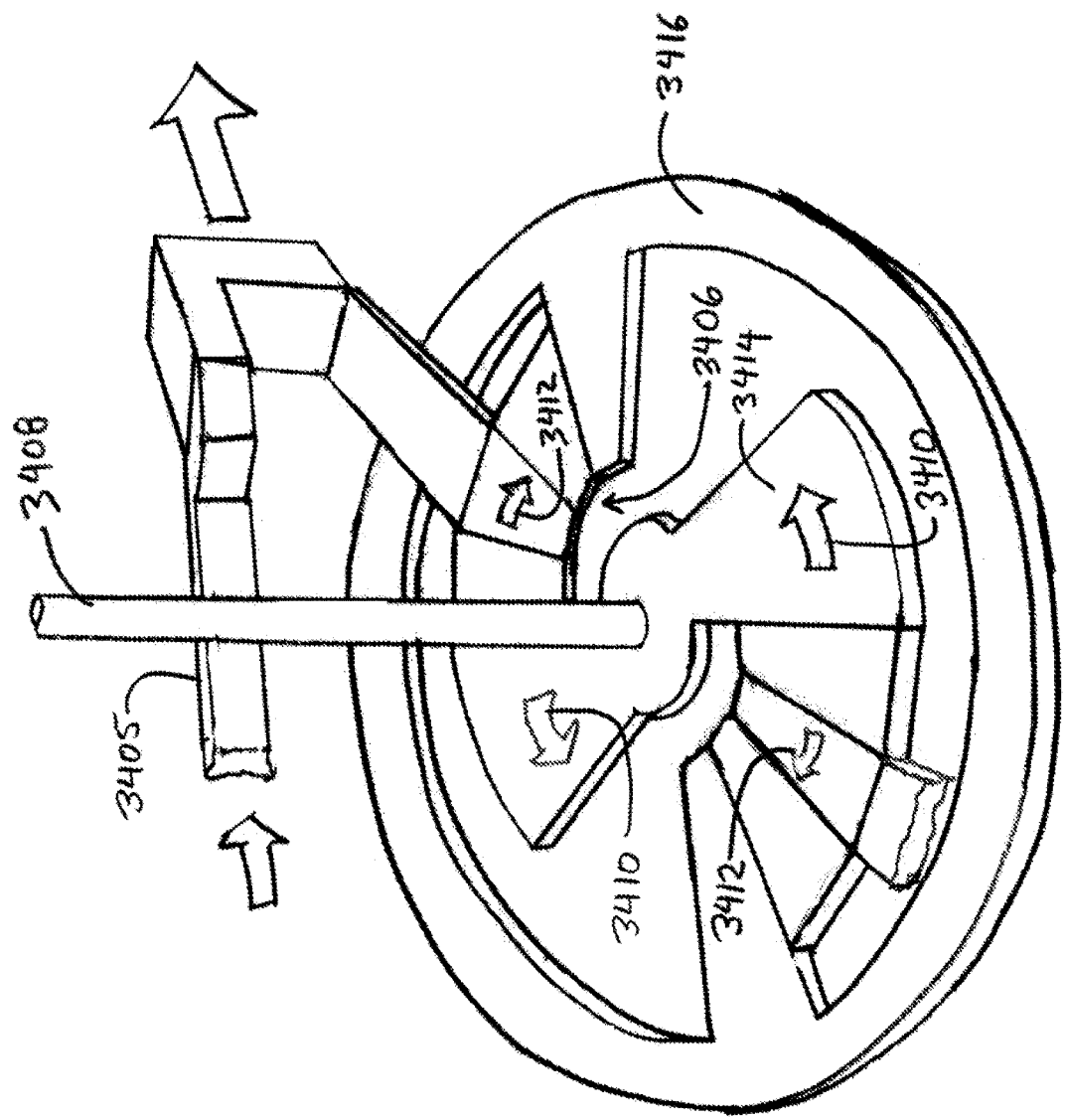
FIG. 34E shows, in schematic perspective view, an instantaneous operational state of the exemplary actuator of FIGS. 34A-34B.

FIGS. 34E and 34F further illustrate, in schematic perspective view, portions of a secondary mechanical linkage as shown in FIGS. 34C and 34D. As previously noted a spherical four-bar linkage 3406 is used to couple the motor drive shaft 3408 to the primary linkage (not shown) through a coupling member 3405. When the motor is accelerating FIG. 34E, the spherical linkage 3406 is in tension 3410, 3412, which simultaneously keeps the primary 3414 and secondary 3416 rotors turning synchronously and constrains the motion of the primary linkage through the coupling member 3405. When the motor brakes FIG. 34F, the inertia of the masses (not shown) coupled to the secondary rotor 3416 (through the primary linkage and the coupling member 3405) changes the respective rotation 3418, 3419 of the secondary rotor 3416 with respect to the primary rotor 3414, compressing the spherical linkage 3406 and retracting 3420 the coupling member 3405, thereby allowing the primary linkage to move.

While the exemplary embodiments described above have been chosen primarily from the field of consumer electronic device user interfaces, one of skill in the art will appreciate that the principles of the invention are equally well applied, and that the benefits of the present invention are equally well realized in a wide variety of other systems including, for example, robotic systems, among others. Further, while the invention has been described in detail in connection with the presently preferred embodiments, it should be readily understood that the invention is not limited to such disclosed embodiments. Rather, the invention can be modified to incorporate any number of variations, alterations, substitutions, or equivalent arrangements not heretofore described, but which are commensurate with the spirit and scope of the invention. Accordingly, the invention is not to be seen as limited by the foregoing description, but is only limited by the scope of the appended claims.

The invention claimed is:

1. A haptic actuator comprising:
   a shaft, said shaft being supported for rotation about a longitudinal axis thereof;
   a pivotal linkage coupled, at a first proximal end thereof, to said shaft and, at a second distal end thereof, to an energy storage mass, such that a rotational acceleration of said shaft about said longitudinal axis is configured to add rotational kinetic energy to said energy storage mass; and
   a latch mechanism, said latch mechanism having a first operational state in which said latch mechanism retains said pivotal linkage and said energy storage mass in a first configuration, in which said first configuration said energy storage mass is disposed in relative proximity to said shaft, said latch mechanism having a second operational state in which said latch mechanism releases said pivotal linkage, whereby said pivotal linkage and said energy storage mass transitions to a second configuration, in which said second configuration said energy storage mass is disposed relatively distal to said shaft, said pivotal linkage being adapted and configured to control a motion of said energy storage mass during said transition so as to convert a portion of said rotational kinetic energy to a linear impulse, said linear impulse being oriented generally parallel to said longitudinal axis.

2. A haptic actuator comprising:
   a shaft, said shaft being supported for rotation about a longitudinal axis thereof;
   a pivotal linkage, said pivotal linkage being supported, at a first proximal end thereof, for rotation about said longitudinal axis, said pivotal linkage being coupled, at a second distal end thereof, to an energy storage mass, such that a rotational acceleration of said pivotal linkage about said longitudinal axis is configured to add rotational kinetic energy to said energy storage mass; and
   a latch mechanism, said latch mechanism having a first operational state in which said latch mechanism retains said pivotal linkage and said energy storage mass in a first configuration, in which said first configuration said energy storage mass is disposed in relative proximity to said longitudinal axis, said latch mechanism having a second operational state in which said latch mechanism releases said pivotal linkage, whereby said pivotal linkage and said energy storage mass transitions to a second configuration, in which said second configuration said energy storage mass is disposed relatively distal to said longitudinal axis, said linkage being adapted and configured to control a motion of said energy storage mass during said transition so as to convert a portion of said rotational kinetic energy to a linear impulse, said linear impulse being oriented generally parallel to said longitudinal axis.

3. A haptic actuator as defined in claim 2 wherein said rotational kinetic energy added to said energy storage mass is received through said latch mechanism.

4. A haptic actuator as defined in claim 2 wherein said release of said latch mechanism includes a folding of a spherical joint in response to a rotational deceleration of said shaft.

5. A haptic actuator as defined in claim 2 wherein said latch mechanism includes a magnet.

6. A haptic actuator as defined in claim 5 wherein said latch mechanism releases said pivotal linkage when a force produced by said rotational acceleration exceeds an attractive force of said magnet.

7. A haptic actuator as defined in claim 2 wherein said latch mechanism includes a permanent magnet.

8. A haptic actuator as defined in claim 2 wherein said latch mechanism includes a permanent magnet and a stator coil of a motor, said motor being operatively coupled to said shaft.

9. A haptic actuator as defined in claim 2 wherein said first proximal end of said pivotal linkage is substantially fixedly coupled to an external circumferential surface region of said shaft.

10. A haptic actuator as defined in claim 2 wherein said latch mechanism is substantially fixedly coupled to an external circumferential surface region of said shaft.

11. A haptic actuator as defined in claim 2 wherein said latch mechanism comprises a passive latch mechanism.

12. A haptic actuator as defined in claim 2 wherein said latch mechanism comprises an active latch mechanism.

13. A method of generating a haptic impulse comprising:
providing an energy storage mass, said energy storage mass being coupled to a first end of a pivotal linkage, said pivotal linkage being supported for rotational motion of said energy storage mass about a center of rotation;
applying an angular acceleration to said energy storage mass so as to store a quantity of rotational kinetic energy in said energy storage mass;
constraining said energy storage mass in a first configuration in relative proximity to said center of rotation;
abruptly releasing said energy storage mass, thereby allowing said energy storage mass to move to a second configuration, relatively distal to said center of rotation; and
conveying said energy storage mass between said first configuration and said second configuration with said pivotal linkage so as to divert a portion of said quantity of rotational kinetic energy into a linear impulse.

* * * * *

UNITED STATES PATENT AND TRADEMARK OFFICE
CERTIFICATE OF CORRECTION

| | | |
|---|---|---|
| PATENT NO. | : 10,710,118 B2 | Page 1 of 1 |
| APPLICATION NO. | : 16/173922 | |
| DATED | : July 14, 2020 | |
| INVENTOR(S) | : Pratheeve Sabaratnam Sreetharan and Michael Karpelson | |

It is certified that error appears in the above-identified patent and that said Letters Patent is hereby corrected as shown below:

In the Specification

Column 1, Line 7 should read:
The present application is a continuation of PCT International patent application number PCT/US2017/029975, filed on April 27, 2017 which in turn claims the benefit of United States provisional patent application number 62/328,524, filed on April 27, 2016 the disclosures of all of which are herewith incorporated by reference in their entirety. The present application is a continuation-in-part of co-pending United States nonprovisional patent application number 15/242,508 filed on August 20, 2016 which in turn is a continuation-in-part of PCT International patent application number PCT/US2015/015509 filed on February 11, 2015 which in turn claims benefit of United States provisional patent application number 62/051,358 filed on September 17, 2014 and claims benefit of United States provisional patent application number 61/938,613 filed on February 11, 2014, the disclosures of all of which are herewith incorporated by reference in their entirety. The present application is a continuation-in-part of co-pending United States nonprovisional patent application number 15/242,508 filed on August 20, 2016 which in turn is a continuation-in-part of PCT International patent application number PCT/US2016/028185 filed on April 18, 2016 which in turn claims benefit of United States provisional patent application number 62/148,732 filed on April 16, 2015 and claims benefit of United States provisional patent application number 62/180,974 filed on June 17, 2015, and claims benefit of United States provisional patent application number 62/289,147 filed on January 29, 2016, the disclosures of all of which are herewith incorporated by reference in their entirety. The present application is a continuation-in-part of co-pending United States nonprovisional patent application number 15/242,508 filed on August 20, 2016 which in turn claims benefit of United States provisional patent application number 62/328,524 filed on April 27, 2016, the disclosures of all of which are herewith incorporated by reference in their entirety.

Signed and Sealed this
Eighth Day of September, 2020

Andrei Iancu
*Director of the United States Patent and Trademark Office*